US009916600B2

(12) United States Patent
Takata et al.

(10) Patent No.: US 9,916,600 B2
(45) Date of Patent: Mar. 13, 2018

(54) AUCTION APPARATUS AND AUCTION METHOD

(71) Applicant: YAHOO JAPAN CORPORATION, Tokyo (JP)

(72) Inventors: Toru Takata, Tokyo (JP); Nobuyuki Akashi, Tokyo (JP); Akira Tajima, Tokyo (JP); Koji Tsukamoto, Tokyo (JP); Nari Woo, Tokyo (JP); Akihiro Tanabe, Tokyo (JP); Shinichiro Sega, Tokyo (JP); Rin Katou, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 688 days.

(21) Appl. No.: 14/020,127

(22) Filed: Sep. 6, 2013

(65) Prior Publication Data
US 2014/0379492 A1 Dec. 25, 2014

(30) Foreign Application Priority Data
Jun. 20, 2013 (JP) .................................. 2013-129650

(51) Int. Cl.
G06Q 30/00 (2012.01)
G06Q 30/02 (2012.01)

(52) U.S. Cl.
CPC ................................ G06Q 30/0275 (2013.01)

(58) Field of Classification Search
None
See application file for complete search history.

(56) References Cited

U.S. PATENT DOCUMENTS

| 7,587,309 | B1 * | 9/2009 | Rohrs | G06F 17/30864 |
| | | | | 704/10 |
| 8,473,347 | B1 | 6/2013 | Koningstein | |
| 2002/0046187 | A1 | 4/2002 | Vargas et al. | |
| 2002/0077954 | A1 | 6/2002 | Slaight et al. | |
| 2002/0120552 | A1 | 8/2002 | Grey et al. | |
| 2003/0036975 | A1 * | 2/2003 | Martin | G06Q 30/08 |
| | | | | 705/26.3 |

(Continued)

FOREIGN PATENT DOCUMENTS

JP A-2001-256418 9/2001
JP A-2001-312619 11/2001
(Continued)

OTHER PUBLICATIONS

Office Action issued in Japanese Patent Application No. 2013-129582 dated Jul. 16, 2013 (with translation).
(Continued)

*Primary Examiner* — Matthew T Sittner
*Assistant Examiner* — Allan Woodworth, II
(74) *Attorney, Agent, or Firm* — Oliff PLC

(57) ABSTRACT

An auction apparatus according to the application includes a plan receiving unit and a providing unit. The plan receiving unit gradually receives plan information indicating a plan of content from a content creator who creates the content a plurality of times. The providing unit additionally presents the plan information which is gradually received by the plan receiving unit and provides an auction service in which a bid target is a right to display an advertisement in an advertising space set to the content.

19 Claims, 35 Drawing Sheets

(56) References Cited

U.S. PATENT DOCUMENTS

| | | | |
|---|---|---|---|
| 2003/0149618 A1 | 8/2003 | Sender et al. | |
| 2006/0184443 A1 | 8/2006 | Erez et al. | |
| 2006/0294538 A1* | 12/2006 | Li | H04N 7/17318 725/24 |
| 2007/0100740 A1* | 5/2007 | Penagulur | G06Q 30/08 705/37 |
| 2008/0015949 A1* | 1/2008 | Walker | G06Q 20/00 705/26.1 |
| 2008/0071594 A1* | 3/2008 | Morin | G06Q 30/02 705/14.71 |
| 2008/0250449 A1* | 10/2008 | Torkos | G06Q 30/02 725/34 |
| 2012/0109711 A1 | 5/2012 | Boe et al. | |
| 2012/0192226 A1 | 7/2012 | Zimmerman et al. | |
| 2013/0185168 A1* | 7/2013 | Lee | G06Q 30/08 705/26.3 |
| 2013/0343726 A1* | 12/2013 | Shackleton | H04N 21/4532 386/282 |

FOREIGN PATENT DOCUMENTS

| | | |
|---|---|---|
| JP | A-2001-350891 | 12/2001 |
| JP | 2002-026844 A | 1/2002 |
| JP | A-2002-32590 | 1/2002 |
| JP | 2002-074209 A | 3/2002 |
| JP | 2002-109256 A | 4/2002 |
| JP | A-2002-197295 | 7/2002 |
| JP | A-2002-245287 | 8/2002 |
| JP | A-2002-251541 | 9/2002 |
| JP | A-2003-85407 | 3/2003 |
| JP | A-2003-87825 | 3/2003 |
| JP | 2003-242372 A | 8/2003 |
| JP | 2004-005012 A | 1/2004 |
| JP | 2005-128478 A | 5/2005 |
| JP | 2006-048312 A | 2/2006 |
| JP | A-2006-222620 | 8/2006 |
| JP | A-2007-505393 | 3/2007 |
| JP | A-2007-257294 | 10/2007 |
| JP | A-2008-15711 | 1/2008 |
| JP | A-2010-147737 | 7/2010 |
| JP | A-2011-253522 | 12/2011 |
| JP | 2015-018535 A | 1/2015 |
| WO | WO 2005/036258 A1 | 4/2005 |

OTHER PUBLICATIONS

U.S. Appl. No. 14/020,118, filed Sep. 6, 2013.
U.S. Appl. No. 14/021,410, filed Sep. 9, 2013.
U.S. Appl. No. 14/020,215, filed Sep. 6, 2013.
Jan. 27, 2015 Office Action issued in Japanese Application No. 2013-129514.
Office Action issued in Japanese Patent Application No. 2013-129514 dated Jun. 17, 2014 (with translation).
Office Action issued in Japanese Patent Application No. 2013-129611 dated Jun. 17, 2014 (with translation).
Office Action issued in Japanese Patent Application No. 2013-129650 dated Jun. 17, 2014 (with translation).
Apr. 30, 2014 Office Action issued in Japanese Application No. 2014-002011.
Sep. 9, 2014 Office Action issued in Japanese Application No. 2014-002011.
Apr. 30, 2014 Office Action issued in Japanese Application No. 2014-002012.
Sep. 9, 2014 Office Action issued in Japanese Application No. 2014-002012.
Jan. 27, 2015 Office Action issued in Japanese Application No. 2013-129611.
Feb. 5, 2016 Office Action issued in U.S. Appl. No. 14/020,215.
Mar. 24, 2016 Office Action issued in U.S. Appl. No. 14/020,118.
Apr. 4, 2016 Office Action issued in U.S. Appl. No. 14/021,410.
Aug. 25, 2016 Office Action issued in U.S. Appl. No. 14/020,215.
Oct. 4, 2016 Office Action issued in U.S. Appl. No. 14/020,118.
Oct. 14, 2016 Office Action issued in U.S. Appl. No. 14/021,410.
Nov. 8, 2016 Office Action issued in Japanese Patent Application No. 2014-002010.
Mar. 8, 2017 Advisory Action issued in U.S. Appl. No. 14/021,410.
Aug. 25, 2017 Office Action Issued in U.S. Appl. No. 14/020,215.
Nov. 30, 2017 Office Action Issued in U.S. Appl. No. 14/021,410.

* cited by examiner

FIG.4

| PLAN ID | CONTENT-PLAN | AUCTION ID | ADVERTISING SPACE INFORMATION | AUCTION PERIOD | BUYOUT PRICE | RESERVE PRICE | CURRENT PRICE | BIDDER ID | END DATE AND TIME |
|---|---|---|---|---|---|---|---|---|---|
| P11 | CONTENT: MOVING IMAGE DIRECTOR:X1 TIME:20 MINUTES | AU11 | ADVERTISING SPACE A (0 TO 15 SECONDS FROM BEGINNING) | 2013/05/15 TO 2013/05/31 | 20000 | 10000 | 15000 | C11 | 2013/05/31 |
| | | AU12 | ADVERTISING SPACE B (15 TO 30 SECONDS FROM BEGINNING) | 2013/06/01 TO 2013/06/15 | 21000 | 10000 | 18000 | C12 | - |
| | | AU13 | ADVERTISING SPACE C (30 TO 45 SECONDS FROM BEGINNING) | 2013/06/16 TO 2013/06/30 | 50000 | 20000 | - | - | - |
| | | AU14 | ADVERTISING SPACE D (SMART PHONE SCENE) | 2013/07/01 TO 2013/07/15 | 500000 | 200000 | - | - | - |
| | | AU15 | ADVERTISING SPACE E (CAFÉ SCENE) | 2013/07/16 TO 2013/07/31 | 500000 | 200000 | - | - | - |
| ⋮ | ⋮ | ⋮ | ⋮ | ⋮ | ⋮ | ⋮ | ⋮ | ⋮ | ⋮ |

| PLAN ID | CONTENT-PLAN | AUCTION ID | ADVERTISING SPACE INFORMATION | AVAILABLE OR UNAVAILABLE REPLACEMENT | AUCTION PERIOD | CURRENT PRICE | BIDDER ID | END DATE AND TIME |
|---|---|---|---|---|---|---|---|---|
| P11 | CONTENT: MOVING IMAGE DIRECTOR:X1 ACTORS:Y1, Y2, Y3 TIME: 10 MINUTES SUMMARY: VIVID MELODRAMA… | AU11 | ADVERTISING SPACE A (0 TO 15 SECONDS FROM BEGINNING) | AVAILABLE | | 15000 | C11 | - |
| | | AU12 | ADVERTISING SPACE B (15 TO 30 SECONDS FROM BEGINNING) | AVAILABLE | 2013/05/15 TO 2013/06/15 | 21000 | C12 | - |
| | | AU13 | ADVERTISING SPACE C (30 TO 45 SECONDS FROM BEGINNING) | AVAILABLE | | 35000 | C11 | - |
| | | AU14 | ADVERTISING SPACE D (SMART PHONE SCENE) | UNAVAILABLE | | 350000 | C13 | - |
| | | AU15 | ADVERTISING SPACE E (CAFÉ SCENE) | UNAVAILABLE | | 180000 | C14 | - |
| … | | … | … | … | … | … | … | … |

| PLAN ID | CONTENT-PLAN | OPEN ITEM | AUCTION ID | ADVERTISING SPACE INFORMATION | AUCTION PERIOD | CURRENT PRICE | CURRENT BIDDER ID | END DATE AND TIME |
|---|---|---|---|---|---|---|---|---|
| P11 | CONTENT: MOVING IMAGE DIRECTOR:X1 ACTORS:Y1, Y2, Y3 TIME:10 MINUTES SUMMARY: VIVID MELODRAMA··· | TYPE OF CONTENT DIRECTOR | AU11 | ADVERTISING SPACE A (0 TO 15 SECONDS FROM BEGINNING) | | 15000 | C11 | – |
| | | | AU12 | ADVERTISING SPACE B (15 TO 30 SECONDS FROM BEGINNING) | | 21000 | C12 | – |
| | | | AU13 | ADVERTISING SPACE C (30 TO 45 SECONDS FROM BEGINNING) | 2013/05/15 TO 2013/06/15 | 35000 | C11 | – |
| | | | AU14 | ADVERTISING SPACE D (SMART PHONE SCENE) | | 350000 | C13 | – |
| | | | AU15 | ADVERTISING SPACE E (CAFÉ SCENE) | | 180000 | C14 | – |
| ⋮ | ⋮ | ⋮ | ⋮ | ⋮ | ⋮ | ⋮ | ⋮ | ⋮ |

521

AUCTION APPARATUS AND AUCTION METHOD

CROSS-REFERENCE TO RELATED APPLICATIONS

The present application claims priority to and incorporates by reference the entire contents of Japanese Patent Application No. 2013-129650 filed in Japan on Jun. 20, 2013.

BACKGROUND OF THE INVENTION

1. Field of the Invention

The present invention relates to an auction apparatus and an auction method.

2. Description of the Related Art

A distribution service has been known which distributes various kinds of content to a terminal apparatus of the user through the Internet. As an example of the distribution service, a moving image distribution service has been known which distributes moving image content and advertising content which is displayed in a display area of the moving image content.

In regard to the moving image distribution service, a technique which is called a program auction has been proposed. Specifically, in the program auction, after a program production company makes a presentation on a program, sponsors bid for a given amount of investment money and only the sponsor who bids against the other sponsors has a broadcast right to a CM space for broadcasting hours. This program auction is used to make a definite promise to ensure funds beforehand.

However, in the technique according to the related art, it is difficult to implement a practical auction for the content creator who plans to create content. Specifically, the program auction is used to ensure funds in advance, but is held after the program production company makes a presentation on the program. Therefore, the program production company needs to sufficiently review the content of the program before the auction is held, in order to raise funds. However, when the program production company does not raise funds at an auction, it is difficult to produce the program and the effort to review the content of the program is in vain. For this reason, the program auction is not practical for the content creator.

SUMMARY OF THE INVENTION

According to one aspect of an embodiment, an auction apparatus includes a plan receiving unit configured to gradually receive plan information indicating a plan of content from a content creator who creates the content a plurality of times; and a providing unit configured to additionally present the plan information which is gradually received by the plan receiving unit and configured to provide an auction service in which a bid target is a right to display an advertisement in an advertising space set to the content.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a diagram illustrating an example of an auction storage unit according to the first embodiment;

FIG. 17 is a diagram illustrating an example of an auction storage unit according to the third embodiment;

FIG. 25 is a diagram illustrating an example of an auction storage unit according to the fourth embodiment;

DETAILED DESCRIPTION OF THE PREFERRED EMBODIMENTS

Figure 1:
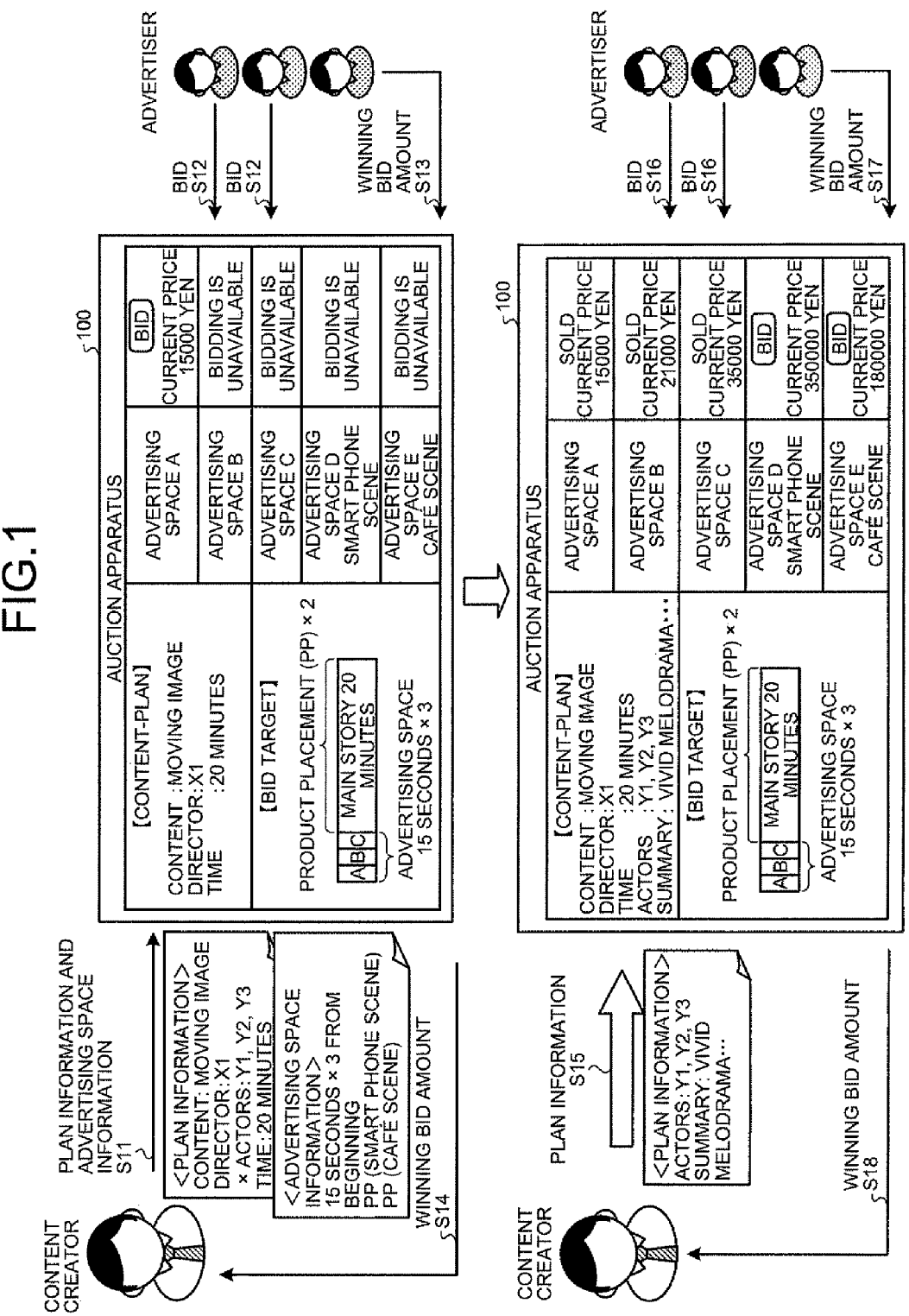
FIG. 1 is a diagram illustrating an example of an auction process according to a first embodiment.

Hereinafter, an auction apparatus, an auction method, and an auction program according to exemplary embodiments (hereinafter, referred to as "embodiments") of the invention will be described in detail with reference to the accompanying drawings. The auction apparatus, the auction method, and the auction program according to the invention are not limited by the embodiments. In the following embodiments, the same components are denoted by the same reference numerals and the description thereof will not be repeated.

First Embodiment

1. Auction Process

First, an example of an auction process according to a first embodiment will be described with reference to FIG. 1. FIG. 1 is a diagram illustrating an example of the auction process according to the first embodiment. The auction process performed by an auction apparatus 100 illustrated in FIG. 1 implements a practical auction for the content creator who plans to create content. Hereinafter, a moving image will be described as an example of content.

As illustrated in the upper part of FIG. 1, the auction apparatus 100 receives plan information indicating a plan of a moving image and advertising space information relating to an advertising space which is set to the moving image by the content creator, from the content creator who plans to create the moving image (Step S11). In the following description, in some cases, the plan of content (for example, the moving image) is referred to as a "content-plan". The auction apparatus 100 may receive the plan information and the advertising space information at the same time or at different times.

In the example illustrated in the upper part of FIG. 1, the plan information transmitted by the content creator includes information indicating that the type of content is a moving image, the director of the moving image is "X1", and the reproduction time of the content is 20 minutes. In this case, the details of the content are not sufficiently reviewed by the content creator at that time but the creation of moving image content by the director "X1" is just determined. However, even when the details of the content are not sufficiently reviewed, the auction apparatus 100 according to the first embodiment receives the plan information.

In addition, in the example illustrated in the upper part of FIG. 1, the advertising space information transmitted by the content creator includes information relating to three advertising spaces which are set to the beginning of the moving image, an advertising space which is set to a scene in which a smart phone is used among various kinds of scenes included in the moving image, and an advertising space which is set to a café scene. A method which displays advertisements in the main story of the moving image so as to be associated with a specific scene or a specific actor is referred to as, for example, product placement.

Then, the auction apparatus 100 presents the plan information received from the content creator to advertisers and provides an auction service in which a bid target is a right to display advertisements in the advertising space set to the moving image. That is, the auction apparatus 100 holds an auction in which a bid target, that is an item to be auctioned off, is a right to incorporate advertisements into a moving image in the stage in which the content creator plans to create the moving image.

Specifically, the auction apparatus 100 opens the type of content or the director on the basis of the plan information and opens information in which five advertising spaces A to E are set to the content on the basis of the advertising space information. In this example, the auction apparatus 100 holds an auction related to the advertising spaces A to E among the auctions related to the advertising spaces A to E. A process of determining the auction to be held will be described below.

Then, the auction apparatus 100 receives bids from the advertisers in the auction related to the advertising space A (Step S12). Then, the auction apparatus 100 determines the advertiser who bids the highest price to be a winning bidder during the period for which the auction is being held and receives the winning bid amount from the winning bidder (Step S13). Then, the auction apparatus 100 sends the winning bid amount received from the winning bidder to the content creator (Step S14).

Then, as illustrated in the lower part of FIG. 1, the auction apparatus 100 receives the plan information from the content creator again (Step S15). In the example illustrated in the lower part of FIG. 1, the plan information includes information indicating that the actors of the moving image are "Y1", "Y2", and "Y3" and the summary of the moving image is a "vivid melodrama . . . ". Then, the auction apparatus 100 additionally presents the plan information which is newly received from the content creator.

In this way, the auction apparatus 100 gradually receives the plan information from the content creator a plurality of times and opens the plan information while adding the plan information. Then, the auction apparatus 100 sequentially holds the auctions related to the advertising spaces A to E and determines the winning bidders. In the example illustrated in the lower part of FIG. 1, the auction apparatus 100 receives bids in the auctions related to the advertising space D or E (Step S16). Then, the auction apparatus 100 receives the winning bid amount from the winning bidder of each auction (Step S17) and sends the received winning bid amount to the content creator (Step S18).

The subsequent process will be described in detail below, in which the auction apparatus 100 generates a moving image to be distributed by incorporating advertising data received from the winning bidder into the moving image created by the content creator.

As such, the auction apparatus 100 according to the first embodiment holds an auction in the stage in which the content creator plans to create the moving image and sends the winning bid amount of the auction to the content creator. Therefore, the auction apparatus 100 can enable the content creator who plans to create the content to raise funds for creation. That is, the auction apparatus 100 enables the content creator who is short of funds to raise funds for creation. Therefore, it is possible to support a production activity of the content.

In addition, the auction apparatus 100 according to the first embodiment gradually receives the plan information from the content creator a plurality of times, opens the received plan information while adding the plan information, and holds the auction in which the bid target is a right to display advertisements. Therefore, the auction apparatus 100 can implement a practical auction for the content creator who plans to create content.

Specifically, even when it is difficult for the content creator to sufficiently review the content-plan, the content creator can transmit a brief version of the content-plan to the auction apparatus 100 such that the auction apparatus 100 holds an auction, as in the example of Step S12. Then, the content creator can raise funds for creation at that time and create content. When the content-plan is sufficiently reviewed, the content creator can add content to the plan and transmit the plan to the auction apparatus 100, as in the example of Step S15. That is, the auction apparatus 100 according to the first embodiment can achieve a practical auction for the content creator since it is not necessary to sufficiently review the details of content before the auction is held.

In Step S12, only items, such as the type of content and the director, in the content-plan are opened and the content-plan is not substantial. Therefore, at that time, many bids are less likely to be made and the bid price is less likely to increase. However, some advertisers can determine the quality of content on the basis of only the limited information, such as the director. When the advertisers make a bid in Step S12, they have the risk that desired content will not be created, but are likely to buy the right to display advertisements at a low price at an auction. As such, the auction which is held in the state in which the content-plan is not sufficiently reviewed is advantageous to the advertiser of foresight.

2. Structure of Auction System

Figure 2:
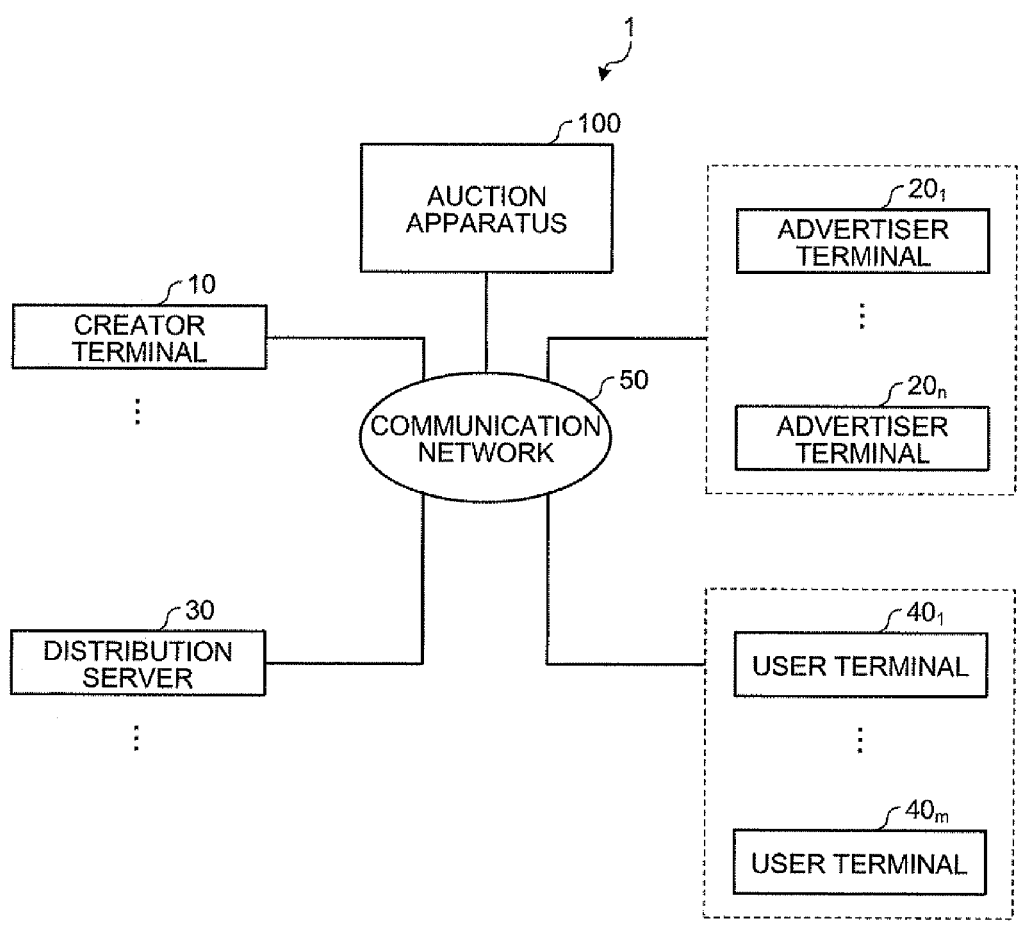
FIG. 2 is a diagram illustrating an example of the structure of an auction system according to the first embodiment.

Next, the structure of the auction system according to the first embodiment will be described with reference to FIG. 2. FIG. 2 is a diagram illustrating an example of the structure of the auction system according to the first embodiment. As illustrated in FIG. 2, an auction system 1 includes a creator terminal 10, advertiser terminals $20_1$ to $20_n$, a distribution server 30, user terminals $40_1$ to $40_m$, and the auction apparatus 100. The creator terminal 10, the advertiser terminals $20_1$ to $20_n$, the distribution server 30, the user terminals $40_1$ to $40_m$, and the auction apparatus 100 are connected through a communication network 50 so as to communicate with each other wirelessly or by wire. The auction system 1 illustrated in FIG. 2 may include a plurality of creator terminals 10, a plurality of distribution servers 30, or a plurality of auction apparatuses 100.

The creator terminal 10 is an information processing apparatus which is used by the content creator. For example, the creator terminal 10 is operated by the content creator to transmit the plan information, the advertising space information, or content, such as a moving image created by the content creator, to the auction apparatus 100. In the following description, in some cases, the creator terminal 10 is referred to as a content creator. That is, in the following description, the content creator may be replaced with the creator terminal 10.

In some cases, the content creator requests an agent to transmit the plan information. In this case, the agent uses the auction service provided by the auction apparatus 100. Hereinafter, it is assumed that the term "content creator" includes the agent in addition to the content creator and the term "creator terminal" includes an agent terminal used by the agent in addition to the advertiser terminal.

The advertiser terminals $20_1$ to $20_n$ are information processing apparatuses used by the advertisers. For example, the advertiser terminals $20_1$ to $20_n$ are operated by the advertisers to acquire a web page (hereinafter, in some cases, referred to as an "auction page") related to the auction service from the auction apparatus 100 or to transmit bid information or advertising data to the auction apparatus 100. In the following description, in some cases, when it is not necessary to distinguish the advertiser terminals $20_1$ to $20_n$, the advertiser terminals $20_1$ to $20_n$ are generically referred to as an "advertiser terminal 20". In addition, in the following description, in some cases, the advertiser terminal 20 is referred to as an advertiser, a bidder, or a winning bidder. That is, in the following description, the advertiser, the bidder, or the winning bidder may be replaced with the advertiser terminal 20.

In some cases, the advertiser requests the agent to perform a bid operation. In this case, the agent uses the auction service provided by the auction apparatus 100. In the following description, it is assumed that the term "advertiser" includes the agent in addition to the advertiser and the term "advertiser terminal" includes the agent terminal used by the agent in addition to the advertiser terminal.

The distribution server 30 is, for example, a web server. The distribution server 30 receives distribution target content from the auction apparatus 100. In addition, the distribution server 30 distributes the content received from the auction apparatus 100 in response to requests from the user terminals $40_1$ to $40_m$.

The user terminals $40_1$ to $40_m$ are information processing apparatuses used by the users who browse content. For example, the user terminals $40_1$ to $40_m$ are operated by the users to acquire content, such as a moving image, from the distribution server 30 and to display the acquired content on a display device (for example, a liquid crystal display). In the following description, when it is not necessary to distinguish the user terminals $40_1$ to $40_m$, the user terminals $40_1$ to $40_m$ are generically referred to as a "user terminal 40". In the following description, in some cases, the user terminal 40 is referred to as a user or a viewer. That is, in the following description, the user or the viewer may be replaced with the user terminal 40.

The auction apparatus 100 is, for example, a web server. As described with reference to FIG. 1, the auction apparatus 100 provides the auction service related to the advertising space which is incorporated into content in the planning stage.

The creator terminal 10, the advertiser terminal 20, or the user terminal 40 is implemented by, for example, a desktop personal computer (PC), a notebook PC, a tablet terminal, a mobile telephone, or a personal digital assistant (PDA).

3. Structure of Auction Apparatus

Figure 3:
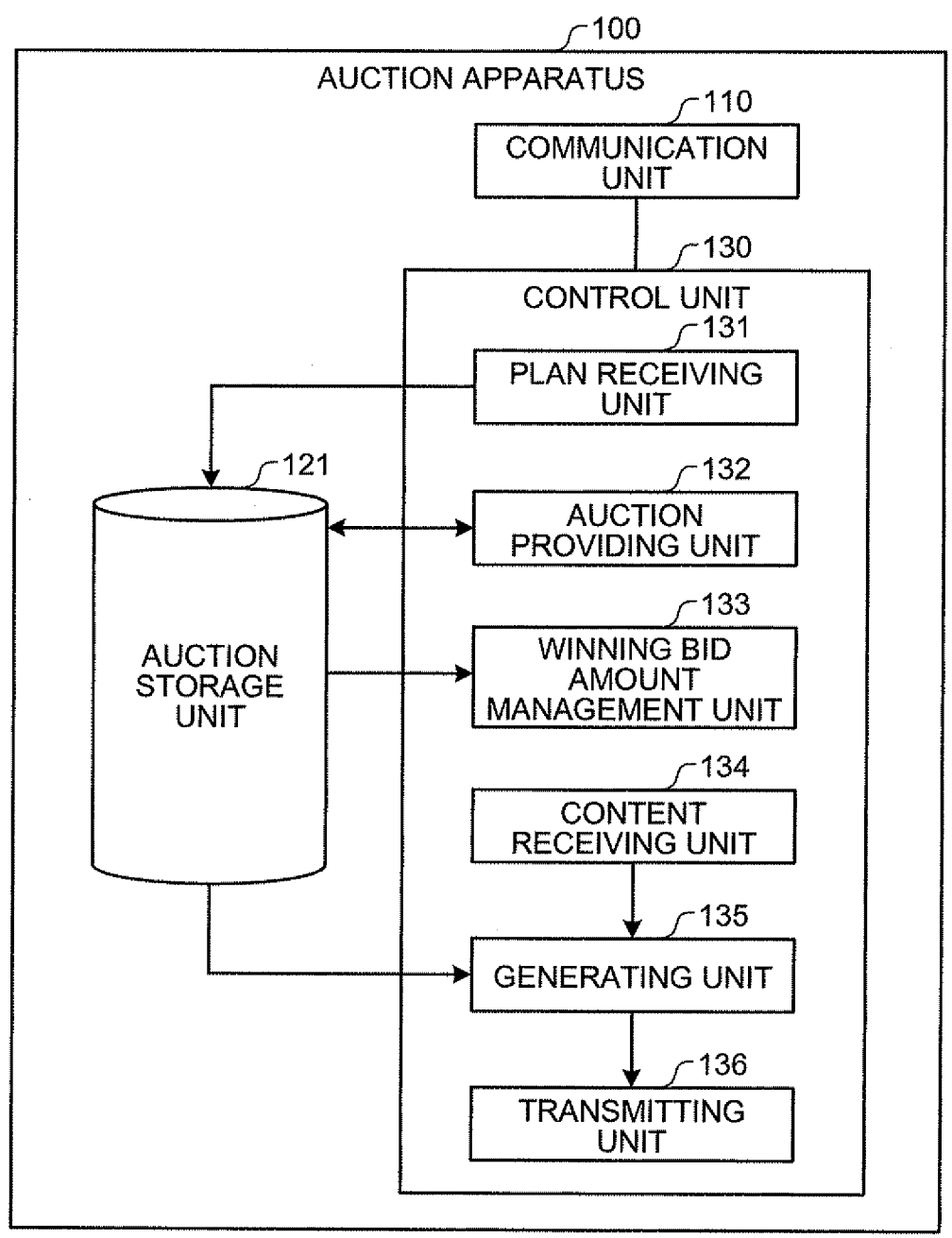
FIG. 3 is a diagram illustrating an example of the structure of an auction apparatus according to the first embodiment.

Next, the structure of the auction apparatus 100 according to the first embodiment will be described with reference to FIG. 3. FIG. 3 is a diagram illustrating an example of the structure of the auction apparatus 100 according to the first embodiment. As illustrated in FIG. 3, the auction apparatus 100 includes a communication unit 110, an auction storage unit 121, and a control unit 130. The auction apparatus 100 may include an input unit (for example, a keyboard or a mouse) which receives various types of operations from the administrator of the auction apparatus 100 or a display unit (for example, a liquid crystal display) which displays various kinds of information.

The communication unit 110 is implemented by, for example, a network interface card (NIC). The communication unit 110 is connected to the communication network 50 wirelessly or by wire. The communication unit 110 transmits and receives information to and from the creator terminal 10, the advertiser terminal 20, or the distribution server 30 through the communication network 50.

The auction storage unit 121 is implemented by a semiconductor memory element, such as random access memory (RAM) or flash memory, or a storage device, such as a hard disk or an optical disk. The auction storage unit 121 according to the first embodiment stores various kinds of information used in the auction service.

FIG. 4 illustrates an example of the auction storage unit 121 according to the first embodiment. In the example illustrated in FIG. 4, the auction storage unit 121 includes items, such as a "plan. ID", "content-plan", an "auction ID", "advertising space information", an "auction period", a "buyout price", a "reserve price", a "current price", a "bidder ID", and an "end date and time".

The "plan ID" indicates identification information for identifying content which is planned to be created by the content creator. The "content-plan" indicates, for example, skeleton, details or the like of the content. The "auction ID" indicates identification information for identifying the auction related to each advertising space. In other words, the "auction ID" indicates identification information for identifying the advertising space. The "advertising space information" indicates information about the advertising space incorporated into content. The "auction period" indicates the period for which the auction related to each advertising space is held. The "buyout price" indicates a price at which a bid target (that is, a right to display advertisements in the advertising space) can be instantly knocked down. The "reserve price" indicates the minimum price at which a bid target can be knocked down. The "current price" indicates the highest bid price of the current auction. The "bidder ID" indicates identification information for identifying the bidder (that is, the advertiser) who bids the highest price at the present time. The "end date and time" indicates the date and time when the auction ends.

FIG. 4 illustrates an example in which an auction in which the date and time is not stored in the "end date and time" is being held or is not held and an auction in which the date and time is stored in the "end date and time" has ended. When the date and time is stored in the "end date and time", the current price corresponds to the winning bid price and the bidder corresponds to the winning bidder. In addition, the information stored in the auction storage unit 121 is not limited to the example illustrated in FIG. 4. For example, the auction storage unit 121 may store information, such as a "creator ID" for identifying the content creator.

That is, FIG. 4 illustrates an example in which the content creator plans to create content identified by a plan ID "P11" and the planned content is, for example, a moving image. In addition, in the example illustrated in FIG. 4, five advertising spaces A to E are incorporated into the content. In the example illustrated in FIG. 4, the auction related to the advertising space A is identified by an auction ID "AU11" and the auctions related to the advertising spaces B to E are identified by auction. IDs "AU12", "AU13", "AU14", and "AU15", respectively in the same manner. As such, the auction storage unit 121 stores the auction IDs corresponding to the advertising spaces incorporated into the content so as to be associated with one plan ID (that is, content in the planning stage). In addition, in the example illustrated in FIG. 4, the auction related to the advertising space A is held from "5/15/2013" to "5/31/2013". In the example illustrated in FIG. 4, the buyout price of the auction related to the advertising space A is "20000 yen" and the reserve price is "10000 yen". In the example illustrated in FIG. 4, the auction related to the advertising space B is held from "6/1/2013" to "6/15/2013", the auction related to the advertising space C is held from "6/16/2013" to "6/30/2013", the auction related to the advertising space D is held from "7/1/2013" to "7/15/2013", and the auction related to the advertising space E is held from "7/16/2013" to "7/31/2013". As such, in the example illustrated in FIG. 4, the auctions related to the advertising spaces A to E are held for different periods.

In the example illustrated in FIG. 4, since date and time information is stored in the end date and time corresponding to the advertising space A, the auction related to the advertising space A has ended. In this example, the winning bid price of the auction related to the advertising space A is "15000 yen" and the winning bidder of the auction is the advertiser identified by a bidder ID "C11". In the example illustrated in FIG. 4, since no date and time information is stored in the end date and time corresponding to the advertising spaces B to E, the auctions corresponding to the advertising spaces B to E have not ended. In the example, the present date is any one of "6/1/2013" to "6/15/2013" and the auction corresponding to the advertising space B is being held.

For example, a central processing unit (CPU) or a micro processing unit (MPU) executes various programs (an example of an auction program) stored in a storage device of the auction apparatus 100, using the RAM as a work area, to implement the functions of the control unit 130. In addition, the control unit 130 is implemented by an integrated circuit, such as an application specific integrated circuit (ASIC) or a field programmable gate array (FPGA).

As illustrated in FIG. 3, the control unit 130 includes a plan receiving unit 131, an auction providing unit 132, a winning bid amount management unit 133, a content receiving unit 134, a generating unit 135, and a transmitting unit 136 and performs or implements the following information processing function or operation. The internal structure of the control unit 130 is not limited to that illustrated in FIG. 3, but the control unit 130 may have any structure as long as it can perform the following information processing. In addition, the connection relation between the processing units of the control unit 130 is not limited to that illustrated in FIG. 3, but other connection relations may be established between the processing units.

The plan receiving unit 131 receives the plan information indicating the content-plan and the advertising space information about the advertising space which is set to the content by the content creator from the content creator who plans to create the content.

Specifically, the plan receiving unit 131 gradually receives the plan information a plurality of times. For example, it is assumed that the plan information of the moving image content includes the "type of content", a "director", a "main actor", a "reproduction time", a "summary", and a "use scene". In this case, the plan receiving unit 131 sequentially receives the plan information including the "type of content" and the "director", the plan information including the "main actor", the plan information including the "reproduction time" and the "summary", and the plan information including the "use scene". As such, the plan receiving unit 131 sequentially receives the plan information items including new items. The plan receiving unit 131 may sequentially receive the plan information items including only new items or the plan information items to which new items are added.

The plan receiving unit 131 receives the advertising space information including the auction period of each auction related to each advertising space. That is, the auction period of each auction is set by the content creator.

Then, whenever the plan information or the advertising space information is received, the plan receiving unit 131 stores the received various kinds of information in the auction storage unit 121. For example, when the first plan information or advertising space information corresponding to given content is received, the plan receiving unit 131 outputs a new plan ID and also outputs an auction ID for each advertising space set to the content. Then, the plan receiving unit 131 stores the plan information in the "content-plan" of the auction storage unit 121 so as to be associated with the new plan ID. In addition, the plan receiving unit 131 stores the auction ID for each advertising space in the auction storage unit 121 so as to be associated with the plan ID and stores the advertising space information in the "advertising space information" of the auction storage unit 121 so as to be associated with each auction ID. In this case, the plan receiving unit 131 may store the creator ID corresponding to the content creator, who is a transmission source of the plan information and the advertising space information, in the auction storage unit 121. The creator ID is transmitted together with, for example, the plan information and the advertising space information by the content creator. Alternatively, when a login is required to use various types of services provided by the auction apparatus 100, the login ID of the content creator may be used as the creator ID. In addition, when new plan information corresponding to one content item is received, the plan receiving unit 131 updates the content-plan in the auction storage unit 121.

The plan receiving unit 131 analyzes, for example, the plan information to extract information corresponding to items, such as the type, director, and actors of content. For example, when the plan information is described by a markup language such as an extensible markup language (XML), the plan receiving unit 131 can easily extract information corresponding to each item from the plan information. When the format of the plan information is predetermined, the plan receiving unit 131 can easily extract various kinds of information from the plan information on the basis of the predetermined format. Similarly, when the advertising space information is described by the markup language or when the format of the advertising space information is predetermined, the plan receiving unit 131 can easily extract various kinds of information from the advertising space information.

The plan receiving unit 131 may provide an input site for inputting the plan information or the advertising space information to the content creator. For example, the plan receiving unit 131 provides an input site for inputting the type of content or the content-plan. In addition, for example, the plan receiving unit 131 provides an input site for inputting a temporal position (hereinafter, in some cases, referred to as a reproduction position) where the advertising space is reproduced, the reproduction time of the advertising space, the display size of the advertising space, or the auction period of each advertising space. In this case, the plan receiving unit 131 receives various kinds of information input to the input site as the plan information and the advertising space information.

The auction providing unit 132 presents the plan information received by the plan receiving unit 131 and provides the auction service in which the bid target is the right to display advertisements in the advertising space set to content. Specifically, the auction providing unit 132 provides the auction service while additionally presenting the plan information which is gradually received by the plan receiving unit 131.

For example, when an auction page acquisition request is received from the advertiser terminal 20, the auction providing unit 132 provides an auction page to the advertiser terminal 20. In this case, the auction providing unit 132 provides an auction page including the content-plan and information about the auction related to each advertising space, on the basis of the plan information and the advertising space information stored in the auction storage unit 121.

For example, the auction providing unit 132 transmits a list of the content-plan stored in the auction storage unit 121 to the advertiser terminal 20. The auction providing unit 132 receives an acquisition request including the plan ID which corresponds to the content-plan selected from the list from the advertiser terminal 20. In this case, the auction providing unit 132 acquires various kinds of information corresponding to the plan ID in the acquisition request from the auction storage unit 121. In the example illustrated in FIG. 4, the auction providing unit 132 acquires, from the auction storage unit 121, the content-plan corresponding to the plan ID, and the advertising space information, the auction period, the buyout price, the reserve price, the current price, the bidder ID, and the end date and time for each auction ID corresponding to the plan ID. Then, the auction providing unit 132 generates an auction page including, for example, the content-plan using the acquired information and provides the generated auction page to the advertiser terminal 20. As described above, whenever the plan information is gradually received from the content creator, the plan receiving unit 131 sequentially updates the content-plan in the auction storage unit 121. Therefore, the auction providing unit 132 provides the sequentially updated content-plan to the advertiser.

The auction providing unit 132 receives bid information including the bid price from the advertiser terminal 20 through the auction page. In this case, the auction providing unit 132 stores the bid price included in the bid information in the auction storage unit 121 so as to be associated with the auction ID indicating the auction to be held. In this case, the auction providing unit 132 also stores the bidder ID corresponding to the bidder, who is the transmission source of the bid information, in the auction storage unit 121. The auction providing unit 132 may receive the bidder ID together with the bid information or it may use, for example, the login ID of the bidder as the bidder ID.

Figure 5:
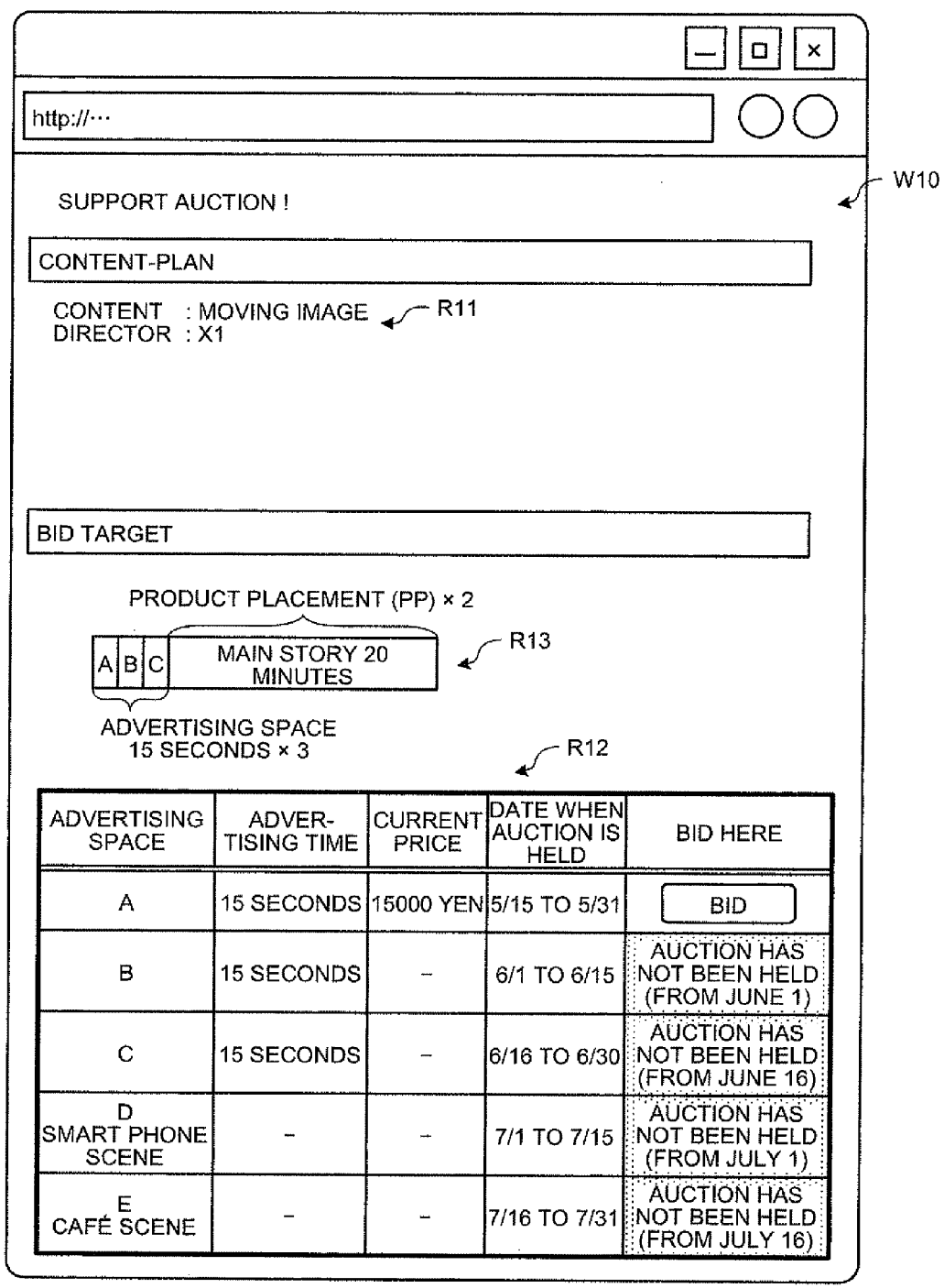
FIG. 5 is a diagram illustrating an example of an auction page generated by an auction providing unit according to the first embodiment.
Figure 6:
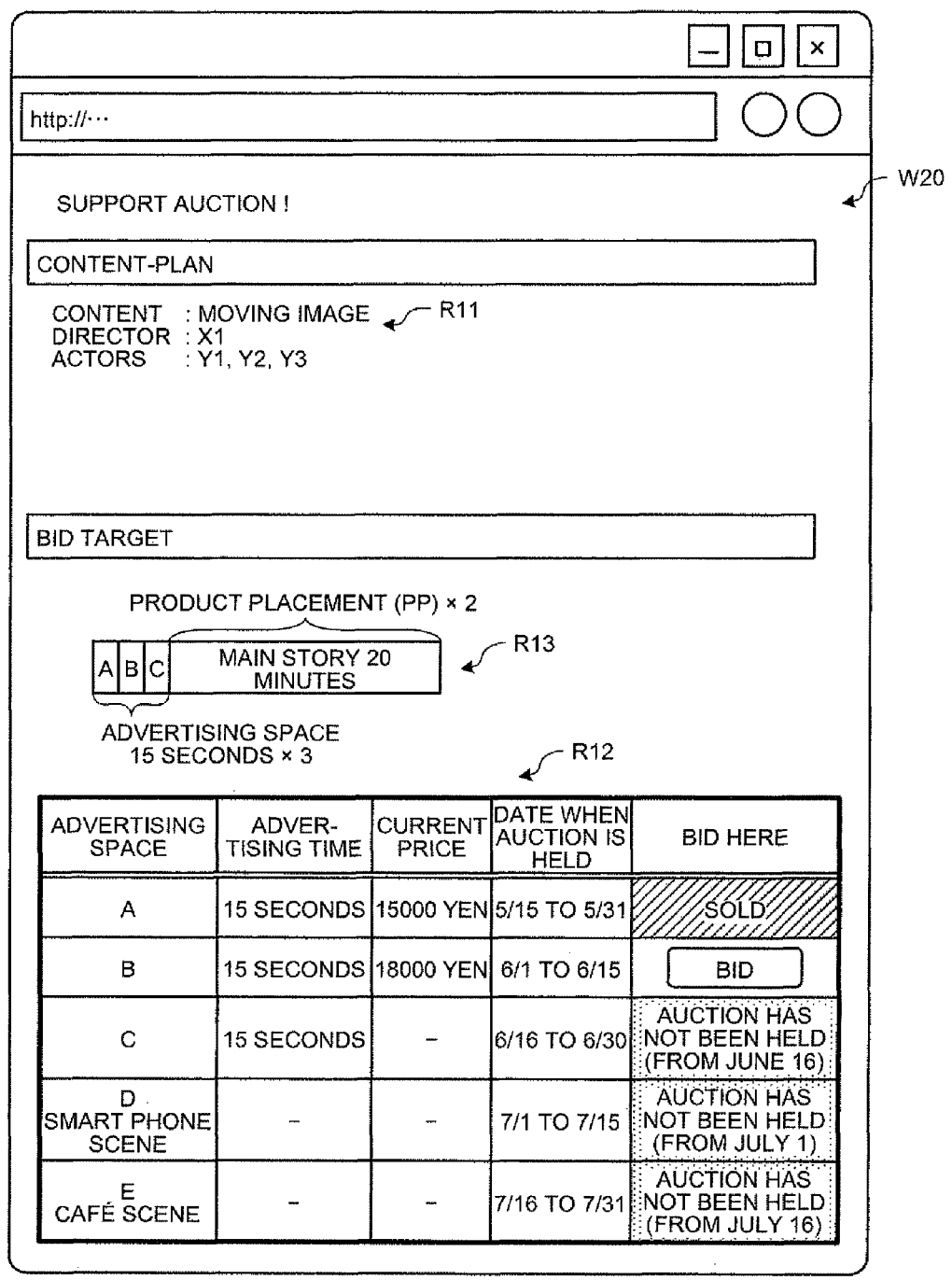
FIG. 6 is a diagram illustrating an example of the auction page generated by the auction providing unit according to the first embodiment.

FIGS. 5 and 6 illustrate examples of the auction page generated by the auction providing unit 132 according to the first embodiment. As illustrated in the example of FIG. 5, the auction providing unit 132 inserts the content-plan stored in the auction storage unit 121 into a plan display field R11 of an auction page W10. In the example, only information, such as the type of content "moving image" and the director "X1", is stored in the content-plan of the auction storage unit 121. The auction providing unit 132 inserts, for example, the advertising space information for each auction ID which is stored in the auction storage unit 121 so as to be associated with the plan ID "P11" into a bid display field R12 of the auction page W10. The auction providing unit 132 inserts an image diagram in which the reproduction position of the advertising space is visible into an image display field R13 of the auction page W10. As such, when the advertising space information includes information about a plurality of advertising spaces, the auction providing unit 132 inserts all advertising space information into the auction page W10 and individually holds the auctions related to each advertising space. In the example, the present date is any one of "5/5/2013" to "5/31/2013" and the auction providing unit 132 holds only the auction related to the advertising space A among the auctions related to the advertising spaces A to E.

Although not illustrated in the drawings, when a bid button displayed in the bid display field R12 is pressed, the auction providing unit 132 provides a bid page for inputting the bid price to the advertiser terminal 20. Then, the auction providing unit 132 receives the bid information including the bid price from the advertiser terminal 20 through the bid page.

In the example illustrated in FIG. 6, the auction providing unit 132 newly inserts an item, such as an actor, into a plan display field R11 of an auction page W20, as compared to the example illustrated in FIG. 5. This illustrates that the plan receiving unit 131 newly receives plan information including the actor and the actor is added to the content-plan in the auction storage unit 121. In the example, the present date is any one of "6/1/2013" to "6/15/2013" and the auction providing unit 132 holds only the auction related to the advertising space B among the auctions related to the advertising spaces A to E.

As such, whenever the plan information is gradually received from the content creator, the auction providing unit 132 additionally inserts the received plan information into the auction page. On the other hand, when any one of the auctions related to the advertising spaces A to E is held, the auction providing unit 132 inserts information about all of the advertising spaces A to E and does not update the information about the advertising spaces A to E. Therefore, the auction providing unit 132 enables the advertiser to check all advertising spaces when the auctions are held and to select a bid target advertising space.

The auction pages W10 and W20 are not limited to the examples illustrated in FIGS. 5 and 6. For example, the auction providing unit 132 may insert the name of the content creator into the plan display field R11. For example, the content creator may set the target amount of the winning bid price as an estimated cost required to create content to the plan information. In this case, the auction providing unit 132 may insert the target amount of the winning bid price into the plan display field R11. For example, the auction providing unit 132 may insert the buyout price or the reserve price into the bid display field R12. The auction providing unit 132 may insert bid increment into the bid display field R12 when the bid increment indicating the amount of money to be added to the current bid price is determined. The bid increment may vary depending on the auction related to each advertising space or it may be the same in all auctions. In addition, the bid increment may be set by the content creator or it may be predetermined in the auction apparatus 100. For example, the auction providing unit 132 may not insert the image diagram into the image display field R13.

The winning bid amount management unit 133 manages the winning bid amount received from the winning bidder who has successfully bid the right to display advertisements. Specifically, even when the winning bid amount is received from the winning bidder, the winning bid amount management unit 133 instantly stores the entire winning bid amount, without sending the winning bid amount to the content creator. Whenever the content creator charges for the creation of content, the winning bid amount management unit 133 sends the amount of money corresponding to the charge from the stored reserve price to the content creator. For example, the winning bid amount management unit 133 receives, from the creator terminal 10, charge data, such as clothing expenses, filming expenses, or food expenses which have been actually used to create content, or charge data, such as clothing expenses, filming expenses, or food expenses which will be used to create content immediately. Then, the winning bid amount management unit 133 sends the amount of money corresponding to the received charge data to the content creator. The winning bid amount management unit 133 manages the winning bid amount using the current price (that is, the highest bid price) stored in the auction storage unit 121.

As such, the winning bid amount management unit 133 does not instantly send the winning bid amount received from the winning bidder to the content creator, but gradually sends the winning bid amount in response to a request from the content creator. Therefore, the winning bid amount management unit 133 can prevent the winning bid amount from being sent to the content creator who does not create the content. As a result, the winning bid amount management unit 133 can prevent the abuse of the auction service provided by the auction apparatus 100.

When the total amount of money charged by the content creator is less than the winning bid amount, the winning bid amount managed by the winning bid amount management unit 133 is left. In this case, the winning bid amount management unit 133 may send the surplus money to the content creator after the content creator creates content. Therefore, the winning bid amount management unit 133 pays the content creator for the creation of the content, which makes it possible to improve the creative will of the content creator.

The content receiving unit 134 receives the content corresponding to the plan information from the content creator. For example, when the content creator which has transmitted the plan information completes content, the content receiving unit 134 receives the completed content. In addition, the content receiving unit 134 receives advertising data which is incorporated into the advertising space from the winning bidder who has successfully bid for the right to display advertisements.

The winning bidder has the right to display the advertisements. However, the winning bidder may transfer the right to other advertisers. In this case, the content receiving unit 134 receives advertising data from the advertiser who has the right to display advertisements, in addition to the winning bidder. It is assumed that the term 'winning bidder' includes the advertiser to which the right to display advertisements is transferred.

The generating unit 135 combines the content and the advertising data received from the content receiving unit 134 to generate composite content. Specifically, the generating unit 135 incorporates advertising data corresponding to the advertiser who has the right to display advertisements in the advertising space which is set to the content created by the content creator into the advertising space on the basis of the advertising space information, thereby generating the composite content.

The transmitting unit 136 transmits the composite content generated by the generating unit 135 to the distribution server 30. Then, the distribution server 30 distributes the composite content having the advertising data incorporated thereinto to the user terminal 40 in response to a request from the user terminal 40.

4. Procedure of Auction Process

Figure 7:
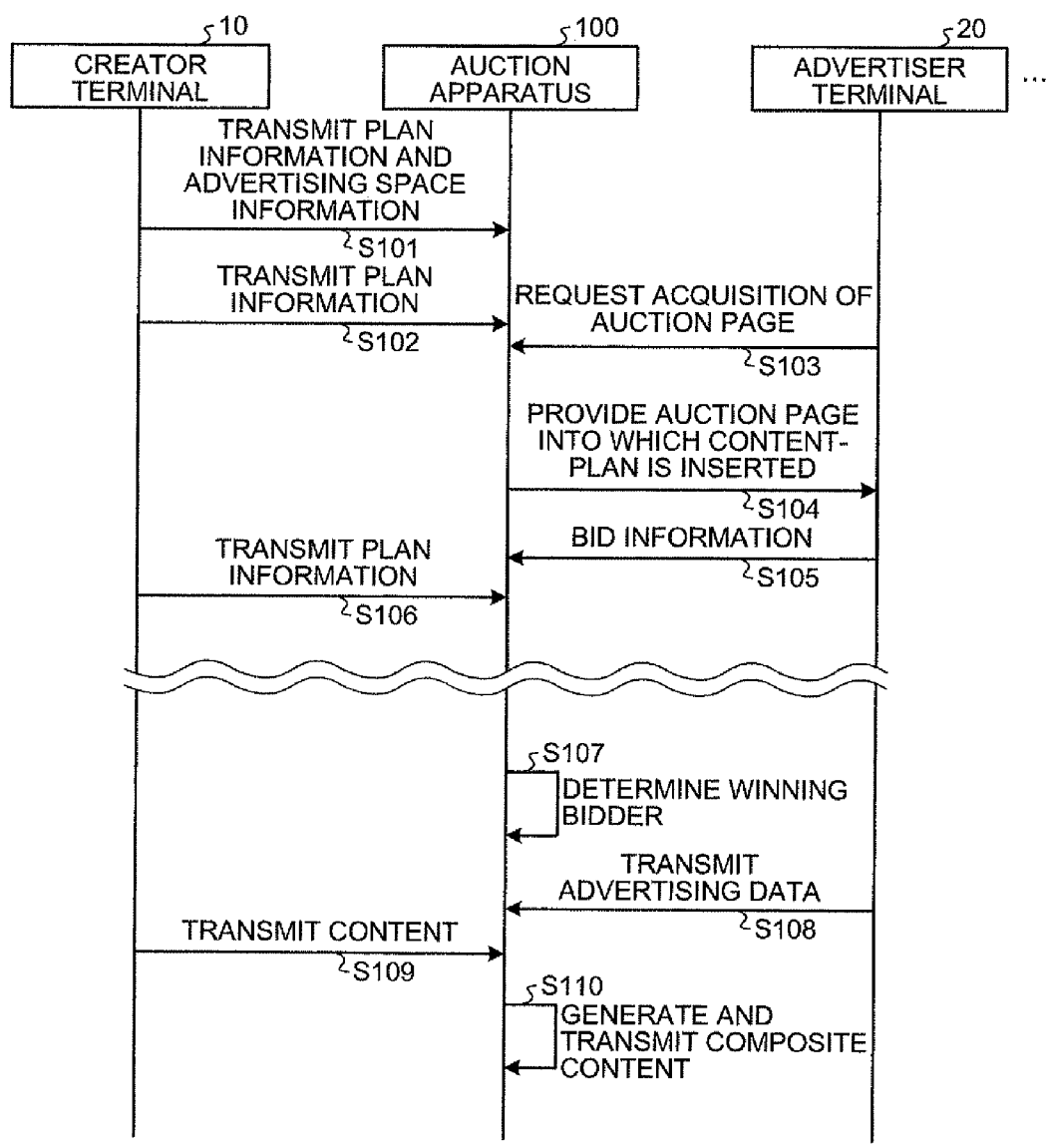
FIG. 7 is a sequence diagram illustrating the procedure of the auction process performed by the auction system according to the first embodiment.

Next, the procedure of the auction process performed by the auction system 1 according to the first embodiment will be described with reference to FIG. 7. FIG. 7 is a sequence diagram illustrating the procedure of the process performed by the auction system 1 according to the first embodiment. FIG. 7 illustrates only one advertiser terminal 20. However, in practice, there are a plurality of advertiser terminals 20.

As illustrated in FIG. 7, the content creator transmits the plan information and the advertising space information to the auction apparatus 100 using the creator terminal 10 (Step S101). In this case, the auction apparatus 100 stores the plan information and the advertising space information in the auction storage unit 121.

In the example illustrated in FIG. 7, the content creator transmits the plan information and the advertising space information at the same time. However, the content creator may transmit the plan information and the advertising space information at different times. For example, the content creator may transmit the advertising space information to the auction apparatus 100 after transmitting the plan information. In addition, for example, the content creator may input various kinds of information to the input site to transmit the plan information and the advertising space information to the auction apparatus 100. In this case, the content creator may input the plan information to the input site and input the advertising space information another day.

After transmitting the plan information once, the content creator can transmit new plan information (Step S102). That is, the content creator gradually transmits the plan information to the auction apparatus 100 in a supplementary manner.

Then, when an auction page acquisition request is received from the advertiser terminal 20 (Step S103), the auction apparatus 100 provides an auction page into which the content-plan are inserted to the advertiser terminal 20 (Step S104). Then, the auction apparatus 100 receives bid information including the bid price from the advertiser terminal 20 through the auction page (Step S105). In this way, the auction apparatus 100 receives the bid information from a plurality of advertiser terminals 20. In the example illustrated in FIG. 7, the content creator can transmit new plan information even after the auction is held (Step S106).

Then, the auction apparatus 100 determines the winning bidder on the basis of the bid information received from the advertiser terminals 20 (Step S107). For example, the auction apparatus 100 determines the advertiser who bids the highest price at the date and time when the auction has ended to be the winning bidder. Then, the auction apparatus 100 manages the winning bid amount received from the winning bidder. Then, when the content creator charges for the cost of production, the auction apparatus 100 subtracts the cost from the winning bid amount and sends the cost to the content creator.

The winning bidder transmits advertising data to the auction apparatus 100 using the advertiser terminal 20 (Step S108). When the content has been created, the content creator transmits the content to the auction apparatus 100 using the creator terminal 10 (Step S109).

The auction apparatus 100 incorporates the advertising data received from the advertiser into the content received from the content creator to generate composite content and transmits the generated composite content to the distribution server 30 (Step S110).

The time when the content creator transmits the plan information is not limited to the example illustrated in FIG. 7. Specifically, the content creator can gradually transmit new plan information until the winning bids of all auctions are determined in Step S107.

5. Modifications

The first embodiment is not limited to the above-mentioned structure, but various other structures can be configured. Next, the modifications of the first embodiment will be described.

5-1. Time when Auction is Held

In the first embodiment, when a plurality of advertising spaces are set to one content item, the auctions related to each advertising space are held for the auction periods set by the content creator. However, the auction providing unit 132 may determine whether to hold a new auction whenever new plan information is received.

Figure 8:
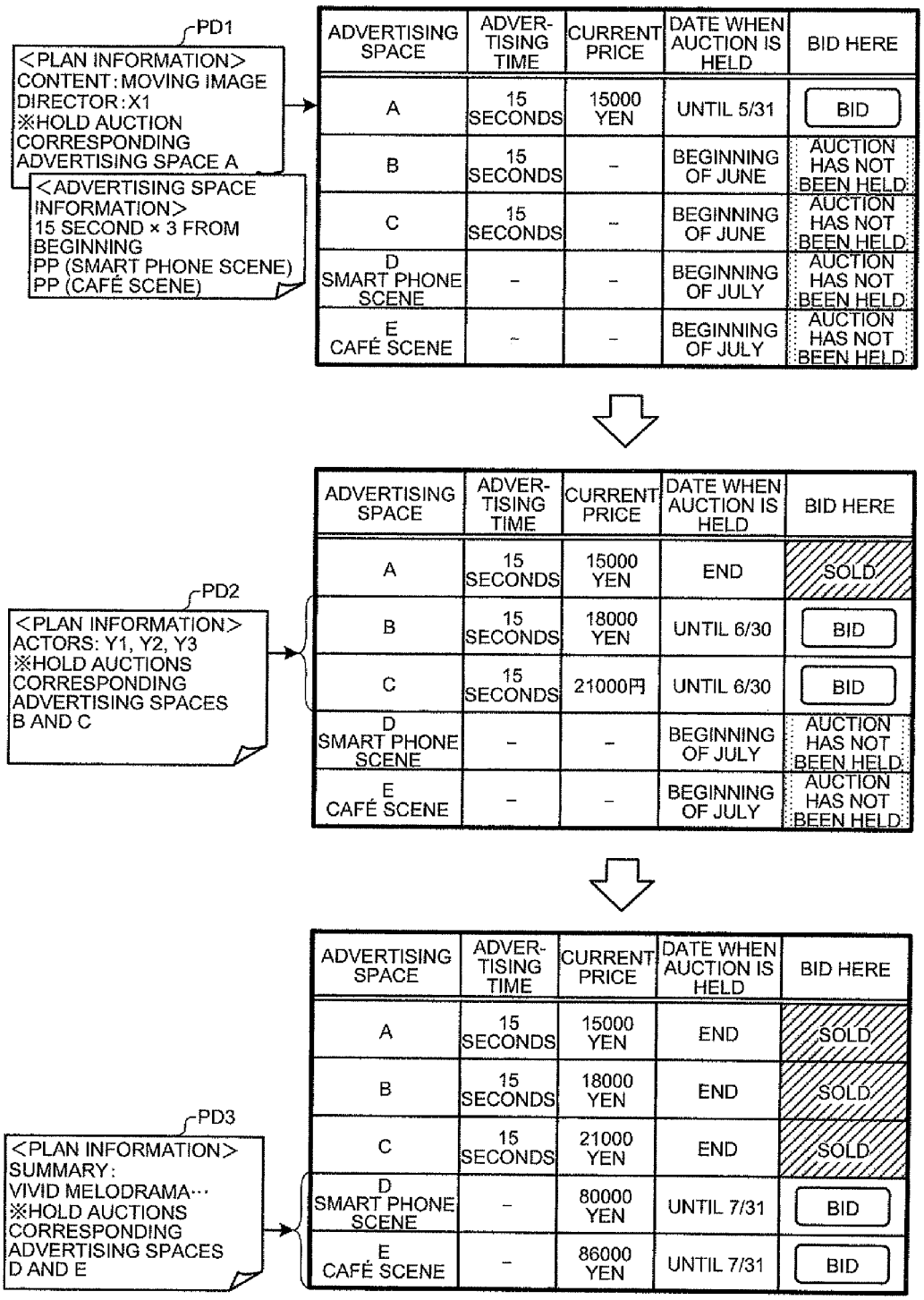
FIG. 8 is a diagram illustrating an example of an auction process according to a modification of the first embodiment.

This will be described with reference to FIG. 8. FIG. 8 is a diagram illustrating an example of an auction process according to a modification of the first embodiment. In the example illustrated in FIG. 8, the plan receiving unit 131 receives plan information including information indicating the auction to be held.

As illustrated in the upper part of FIG. 8, the plan receiving unit 131 receives plan information PD1 indicating that the auction related to the advertising space A is to be held. The plan information PD1 includes information indicating that the type of content is a "moving image" and the director is "X1". In this case, the auction providing unit 132 opens the type of content "moving image" and the director "X1" to the public and holds the auction related to the advertising space A which is designated by the plan information.

As illustrated in the middle of FIG. 8, the plan receiving unit 131 receives plan information PD2 indicating that the auctions related to the advertising spaces B and C are to be held. In addition, the plan information PD2 includes information indicating that the actors of the content are "Y1", "Y2", and "Y3". In this case, the auction providing unit 132 opens the actors "Y1", "Y2", and "Y3" to the public in addition to the type of content "moving image" and the director "X1" and holds the auctions related to the advertising spaces B and C.

As illustrated in the lower part of FIG. 8, the plan receiving unit 131 receives plan information PD3 indicating that the auctions related to the advertising spaces D and E are to be held. In this case, the auction providing unit 132 further opens a content summary "vivid melodrama . . . " included in the plan information PD3 to the public and holds the auctions related to the advertising spaces D and E.

As such, the auction apparatus 100 can gradually hold new auctions at the time when the plan information is received to differentiate the auctions. For example, when the auction is held with an insufficient amount of plan information opened to the public, the advertiser of foresight is likely to successfully bid the item at a low price. When the auction is held with a sufficient amount of plan information opened to the public, the advertiser can display advertisements in desired content. When the auction apparatus 100 gradually holds the auctions, more substantial plan information is provided as the auction is held later, which makes it possible to increase the winning bid price. In other words, the content creator gradually transmits substantial plan information to the auction apparatus 100 to increase the winning bid price and to raise desired funds for creation. In addition, the content creator can determine whether to raise target funds for creation, with reference to the winning bid price of the auction in which the winning bidder has been determined. In this case, when it is unlikely to raise desired funds for creation, the content creator transmits substantial plan information to the auction apparatus 100 to increase the winning bid price of the auction which is being held or the auction which has not been held. Thus the content creator can raise desired funds to creation.

FIG. 8 illustrates an example in which the content creator sets information indicating the auction to be held to the plan information. That is, in the example illustrated in FIG. 8, the content creator determines whether to hold a new auction. However, the auction providing unit 132, not the content creator, may determine whether to hold a new auction. For example, whenever new plan information is received from the plan receiving unit 131, the auction providing unit 132 may hold a predetermined number of (for example, one or two) new auctions.

Alternatively, when new plan information is received, the plan receiving unit 131 may determine whether the new plan information includes information which supplements the current plan information (that is, the content-plan stored in the auction storage unit 121). When the new plan information includes the information which supplements the current plan information, the auction providing unit 132 may hold a predetermined number of new auctions. Examples of the information which supplements the current plan information include new items (for example, the type of content, a director, actors, and a summary) which are not included in the current plan information. However, the invention is not limited to this example. When a summary "melodrama" is included in the current plan information, a summary "high school student's vivid melodrama" included in the new plan information is the information which supplements the current plan information.

In the first embodiment, the auction period does not need to be set to the auctions related to all of the advertising spaces. For example, the content creator may set information, such as "not set", as the advertising space information to some or all of the auction periods of the advertising spaces set to the content. In this case, the auction providing unit 132 inserts information, such as "not set", into the date of the auction related to the advertising space whose auction period is not set among the dates of the auctions in the auction page W10 or W20. Therefore, the auction apparatus 100 enables the advertisers to know that the date of the auction is not set. In this example, the plan receiving unit 131 receives the advertising space information in which the auction period is not set and then receives the advertising space information in which the detailed range of the date and time is set to the auction period at a given time. That is, first, the content creator does not set the auction period and then sets the detailed range of the date and time to the auction period. Therefore, the content creator can set the period for which the value of the advertising space which varies depending on, for example, the reputation of the content-plan is high as the auction period. As a result, it is possible to raise desired funds.

5-2. Securing of Transparency

As described in the first embodiment, the auction system 1 provides the auction service related to the advertising space which is scheduled to be incorporated into content in the planning stage before the content is completed. That is, in the above-mentioned auction service, the auction conditions (for example, type of content, the director, the actors, the reproduction time, and the summary) which are determined when the auction service is provided are not necessarily fixed, but include obscure elements. However, when the auction conditions are changed after the auction service is provided, the advertiser is likely to be disadvantaged. For example, when the type of content is changed from a moving image to a still image while the auction is being held or after the auction ends, the bidder who wants to display advertisements in the moving image is likely to be disadvantaged. Therefore, the auction apparatus 100 may ensure the transparency of the auction conditions which are determined during auction.

First, the auction conditions are, for example, information about content which is determined at the time when the auction service is provided. For example, the auction conditions include the type of content, the content-plan, the reproduction time, and the distribution period. In addition, the content-plan may be divided into, for example, the type of content, a director, actors, and a summary.

The plan receiving unit 131 of the auction apparatus 100 verifies whether the auction conditions described in the above-mentioned example are changed whenever new plan information is received. Specifically, the plan receiving unit 131 compares the newly received plan information with various kinds of information stored in the auction storage unit 121 to determine whether the auction conditions are changed. When the auction conditions are not changed, the plan receiving unit 131 updates the auction storage unit 121 using the newly received plan information. On the other hand, when the auction conditions are changed, the plan receiving unit 131 notifies the content creator that it is difficult to receive the newly received plan information, without updating the auction storage unit 121, and ends the process.

As such, the auction apparatus 100 can ensure that the plan information is not changed and prevent the advertiser from being disadvantaged.

In addition, the auction conditions include advertisement display conditions, an advertisement display environment, and various kinds of information about the auction, which are determined when the auction service is provided. For example, the auction conditions include the number of advertising spaces set in the same content, the reproduction position, display time, and size (display size) of the advertising space in moving image content, an auction period, and bid increment.

For this point, the plan receiving unit 131 according to the first embodiment does not gradually receive the advertising space information, but receives the advertising space information only once. Therefore, it is possible to prevent a change in information about the advertisement display conditions or the advertisement display environment. Specifically, when receiving the advertising space information corresponding to the same content a plurality of times, the plan receiving unit 131 validates only the initially received advertising space information and discards the second or subsequent advertising space information. Alternatively, the plan receiving unit 131 may validate the advertising space information which is received until the first bid is made in the auction. This is because the advertiser is likely to be disadvantaged when the auction conditions are changed after bidding, but is not necessarily to be disadvantaged when the auction conditions are changed before bidding.

5-3. Change in Auction Conditions

The invention is not limited to the above-mentioned example, but the auction apparatus 100 may gradually receive the advertising space information. When the desired conditions are satisfied after the bid is made in the auction, the auction apparatus 100 may permit to change the auction conditions for the advertising space. For example, when new advertising space information is received after the auction is held, the plan receiving unit 131 notifies the bidders and the winning bidder of the auction conditions which are changed by the new advertising space information. In this way, the plan receiving unit 131 inquires whether to change the auction conditions. When the bidders and the winning bidder permits the change, the plan receiving unit 131 updates the auction storage unit 121 on the basis of the new advertising space information. On the other hand, when the bidders and the winning bidder do not permit the change, the plan receiving unit 131 discards the new advertising space information, without receiving the new advertising space information. For example, it is assumed that the plan receiving unit 131 receives new advertising space information for adding the advertising space. In this case, the plan receiving unit 131 inquires the bidders and the winning bidder whether to add the advertising space. When the bidders and the winning bidder permit to add the advertising space, the plan receiving unit 131 updates the auction storage unit 121 to add the advertising space incorporated into the content.

When the number of advertising spaces set to the content is increased, there is a concern that the impression of each advertisement on the user will be damaged. That is, the addition of the advertising space is not preferable to the advertiser who is the bidder or the winning bidder. However, when the advertising space is added, funds for creation which can be obtained by the content creator increase and the quality of content created by the content creator is likely to be improved. When content quality is improved, the number of viewers increases, which results in improvement in the advertising effect of the advertisements of the winning bidder. Therefore, some advertisers permit the addition of the advertising space.

The auction apparatus 100 may gradually receive both the plan information and the advertising space information. When receiving the new plan information and the advertising space information, the auction apparatus 100 inquires the bidders and the winning bidder whether to change the auction conditions. For example, when it is determined that a large number of viewers view the content on the basis of new plan information, the advertiser, such as the winning bidder, can permit the addition of the advertising space. In this way, since the cost of creating content can be increased, the advertiser, such as the winning bidder, can support the quality of the content.

When the content creator sets the target amount of the cost for creation in the plan information, the auction apparatus 100 displays the target amount of the cost for creation in the auction page. Therefore, the winning bidder or the bidder can check whether the total of the winning bid prices reaches the target amount of the cost for creation. In this case, when the total of the winning bid prices reaches the target amount of the cost for creation, the auction apparatus 100 may inquire the winning bidder or the bidder whether to change the auction conditions. Specifically, when the total of the winning bid prices can reach the target amount of the cost for creation, the content creator can expand the content-plan (for example, increase the reproduction time of the content) and add the advertising space. Then, the winning bidder or the bidder can check whether the total of the winning bid prices reaches the target amount of the cost for creation. Therefore, the winning bidder or the bidder can presume the possibility of the content being expanded and determine whether to permit the addition of the advertising space.

Contrary to the above-mentioned example, when the total of the winning bid prices does not reach the target amount of the cost for creation, the auction apparatus 100 may inquire the winning bidder or the bidder whether to change the auction conditions. Specifically, when it is difficult for the total of the winning bid prices to reach the target amount of the cost for creation, the content creator is likely to stop creating the content. Since it is possible to check whether the total of the winning bid prices reaches the target amount of the cost for creation, the winning bidder or the bidder can presume the possibility of the creation of content being stopped and determine whether to permit the addition of the advertising space.

5-4. Target Amount of Winning Bid Price

In the first embodiment, the plan receiving unit 131 may receive advertising space information including the target amount of the winning bid price from the content creator. The auction providing unit 132 may adjust the buyout price of the subsequent auction on the basis of the winning bid price of the auction which has ended among the auctions corresponding to a plurality of advertising spaces and the target amount received by the plan receiving unit 131.

Figure 9:
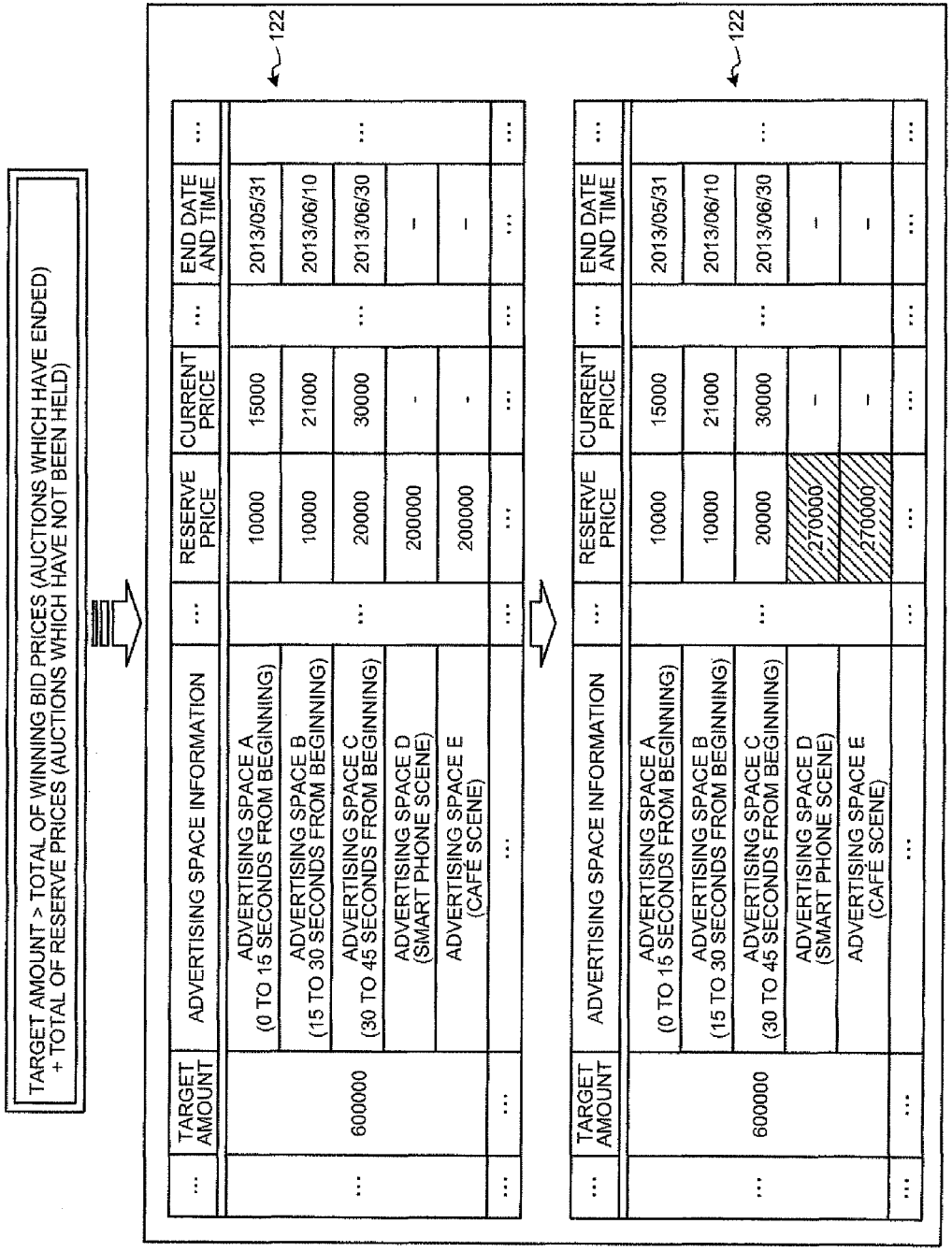
FIG. 9 is a diagram illustrating an example of an auction process according to a modification of the first embodiment.

This will be described with reference to FIG. 9. FIG. 9 is a diagram illustrating an example of an auction process according to a modification of the first embodiment. An auction storage unit 122 illustrated in the upper part of FIG. 9 includes the auction storage unit 122 illustrated in FIG. 9, instead of the auction storage unit 121 illustrated in FIG. 4. The auction storage unit 122 further stores the target amount received by the plan receiving unit 131, as compared to the example illustrated in FIG. 4. Although not illustrated in the drawings, the auction storage unit 122 illustrated in FIG. 9 also stores items, such as the "plan ID" and the "content-plan" illustrated in FIG. 4.

FIG. 9 illustrates an example in which the plan receiving unit 131 receives the target price corresponding to the total of the winning bid prices in each auction. In this example, the content creator desires the total of the winning bid prices in the auctions related to the advertising spaces A to E to reach a target price of "600000 yen".

When any one of a plurality of auctions which are held for different periods ends, the auction providing unit 132 determines whether the total of the winning bid prices in the auctions reaches the target price. For example, the auction providing unit 132 adds "the total of the winning bid prices in the auctions which have ended at the present time" and "the total of the reserve prices in the auctions which have not been held" and determines whether the addition result is less than the target price. When the addition result is less than the target price, the auction providing unit 132 raises the reserve price in the auctions which have not been held.

For example, in the auction storage unit 122 illustrated on the upper side of FIG. 9, "the total of the winning bid prices in the auctions which have ended at the present time" is "66000 yen" and "the total of the reserve prices in the auctions which have not been held" is "400000 yen". That is, the addition result of the totals is "466000 yen" and is less than the target price "600000 yen". Therefore, the auction providing unit 132 raises the reserve prices in the auctions which have not been held, as illustrated on the lower side of FIG. 9. In this case, the auction providing unit 132 raises the reserve price corresponding to the advertising space D from "200000 yen" to "270000 yen" and raises the reserve price corresponding to the advertising space E from "200000 yen" to "270000 yen". In this way, "the total of the reserve prices in the auctions which have not been held" is "540000 yen". That is, the addition result is "606000 yen" and is more than the target price "600000 yen".

As such, the auction apparatus 100 can adjust the reserve prices in the auctions which have not been held, depending on the winning bid prices in the auctions which have ended, to increase the possibility of the winning bid price reaching the target price. As a result, the auction apparatus 100 can increase the possibility of the content creator raising desired funds.

In the example illustrated in FIG. 9, the auction providing unit 132 raises the reserve price. However, the auction providing unit 132 may reduce the reserve price. For example, when the addition result of "the total of the winning bid prices in the auctions which have ended at the present time" and "the total of the reserve prices in the auctions which have not been held" is more than the target price, the auction providing unit 132 may reduce the reserve prices in the auctions which have not been held in the range in which the addition result reaches the target price. In this case, the auction apparatus 100 can increase the possibility that an item will be sold in the auction which has not been held. Therefore, the auction apparatus 100 enables the content creator to raise desired funds.

In the example illustrated in FIG. 9, the auction providing unit 132 may not adjust the reserve price, but may adjust the buyout price. For example, when the addition result of "the total of the winning bid prices in the auctions which have ended at the present time" and "the total of the reserve prices in the auctions which have not been held" is less than the target price, the auction providing unit 132 may raise the buyout price in the auction which has not been held such that the addition result reaches the target price. For example, when the addition result is more than the target price, the auction providing unit 132 may reduce the buyout price in the auction which has not been held in the range in which the addition result reaches the target price. In addition, the auction providing unit 132 may adjust both the reserve price and the buyout price.

In the example illustrated in FIG. 9, when all of the auctions have ended, the auction providing unit 132 may determine whether the total of the winning bid prices in each auction reaches the target price. When the total of the winning bid prices does not reach the target price, the auction providing unit 132 may cancel all auctions. For example, in the example illustrated in FIG. 9, when the auctions corresponding to the advertising spaces A to E are concluded, but the total of the winning bid prices does not reach the target price "600000 yen", the auction providing unit 132 cancels all auctions corresponding to the advertising spaces A to E. In this case, when the winning bid amount is received from the winning bidder, the winning bid amount management unit 133 returns the winning bid amount to the winning bidder. Therefore, only when the content creator can raise desired funds, the auction apparatus 100 can conclude the auction.

In the example illustrated in FIG. 9, the periods for which the auctions are held are different from each other. However, even when all auctions are held for the same period, the auction apparatus 100 may receive the target price from the content creator. In this case, the auction apparatus 100 may perform a process which does not conclude all auctions.

When the auctions are held for the same period, but a bid is made at the buyout price, the times when the auctions end are different from each other. Therefore, even when the auctions are held for the same period, but some auctions have ended early, the auction apparatus 100 may perform a process of adjusting the reserve price or the buyout price.

The example illustrated in FIG. 9 can be applied to the modification illustrated in FIG. 8. In this case, when the plan receiving unit 131 receives new plan information and it is determined that a new auction is held, the auction providing unit 132 may perform the process of adjusting the reserve price or the buyout price.

In the first embodiment, whenever receiving billing data from the content creator, the winning bid amount management unit 133 sends the billing amount to the content creator. However, when the total of the winning bid prices reaches the target price, the winning bid amount management unit 133 may send the amount of money corresponding to the target price to the content creator, without receiving the billing data.

5-5. Display of Bidder

In the first embodiment, the auction providing unit 132 may notify information about the bidder on the auction page. Specifically, the auction providing unit 132 may display information about the bidder in the auction page. For example, the auction providing unit 132 may display the type of business or company name of the bidder who is an advertiser.

Figure 10:
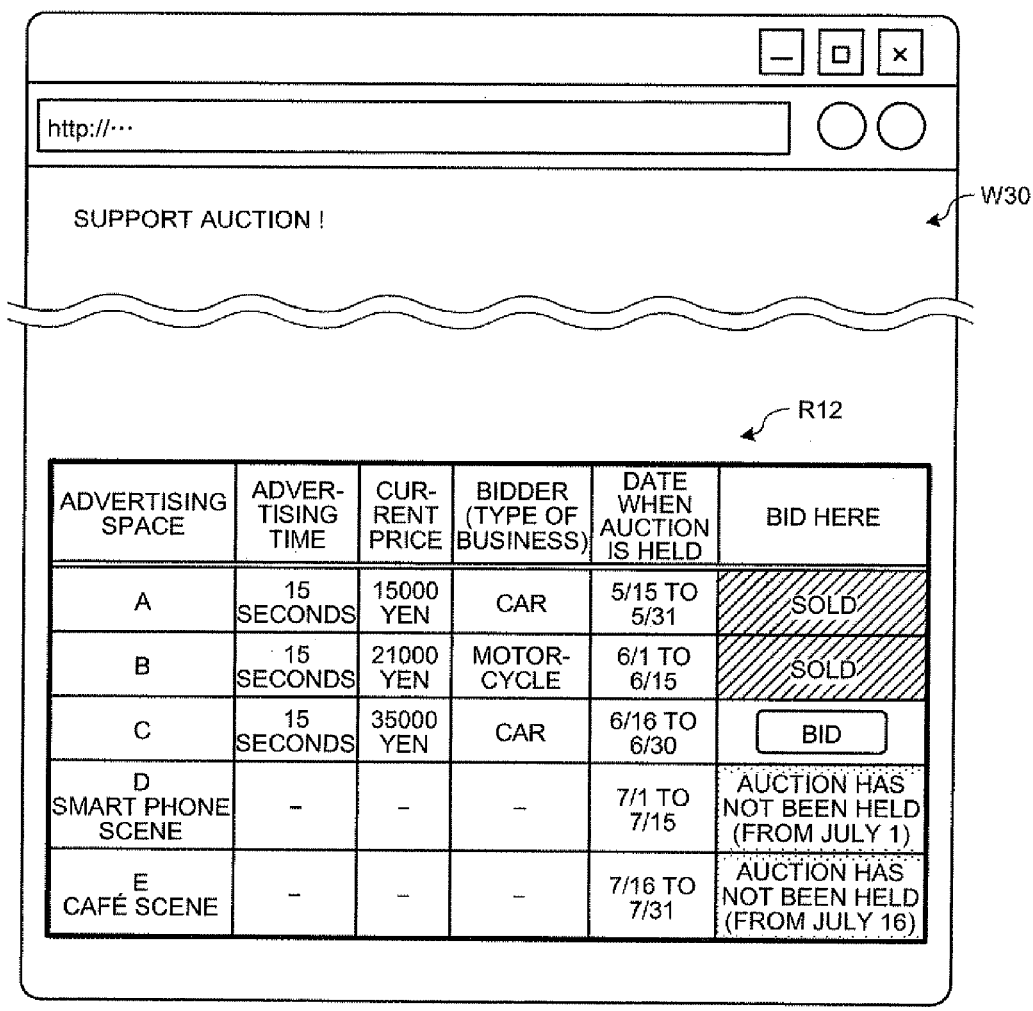
FIG. 10 is a diagram illustrating an example of an auction page according to a modification of the first embodiment.

This will be described with reference to FIG. 10. FIG. 10 is a diagram illustrating an example of an auction page according to the modification of the first embodiment. As illustrated in FIG. 10, the auction providing unit 132 inserts the type of business of the bidder in each auction into a bid display field R12 of an auction page W30. In the example illustrated in FIG. 10, the auction related to the advertising space A and the auction related to the advertising space B have ended and the auction related to the advertising space C is being held. The type of business, "car", of the winning bidder in the auction related to the advertising space A, the type of business, "motorcycle", of the winning bidder in the auction related to the advertising space B, and the type of business, "car", of the winning bidder who is the highest bidder in the auction related to the advertising space C are displayed in the auction page W30 illustrated in FIG. 10. It is assumed that the auction apparatus 100 stores various kinds of information (for example, the type of business and the company name) about the bidder who is the advertiser.

As such, the auction apparatus 100 can display information about the bidder or the winning bidder to provide reference information in bidding to the advertiser who is a bidder. For example, in the example illustrated in FIG. 10, it is considered that the winning bidder who is engaged in the "car" or "motorcycle" business determines that the content planned to be created is browsed by the user with high preference to the "car" or the "motorcycle". Therefore, for example, the advertiser who is engaged in the "travel" business determines that the user with high preference to the "car" or the "motorcycle" has high preference to the "travel" and can bid in the auction related to the advertising space C which is being held.

5-6. Bid Target

In the first embodiment, the advertising spaces are allocated to different reproduction positions in the moving image. That is, in the first embodiment, the advertising space is distinguished by the reproduction position. However, the invention is not limited thereto, but the advertising space may be distinguished by, for example, the distribution period for which advertising data is distributed or the targeting conditions used during the distribution of the advertising data.

Figure 11:
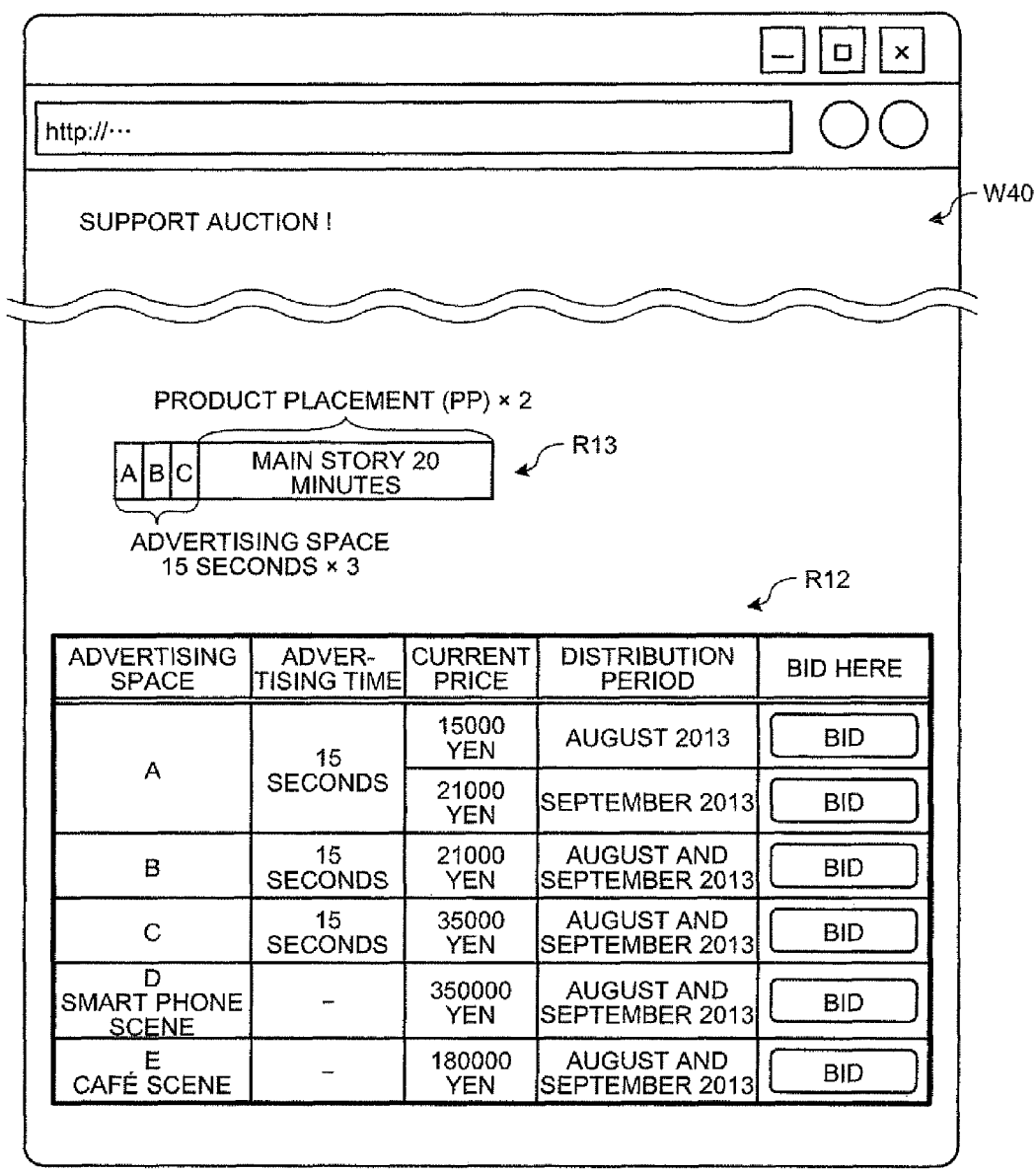
FIG. 11 is a diagram illustrating an example of an auction page according to a modification of the first embodiment.
Figure 12:
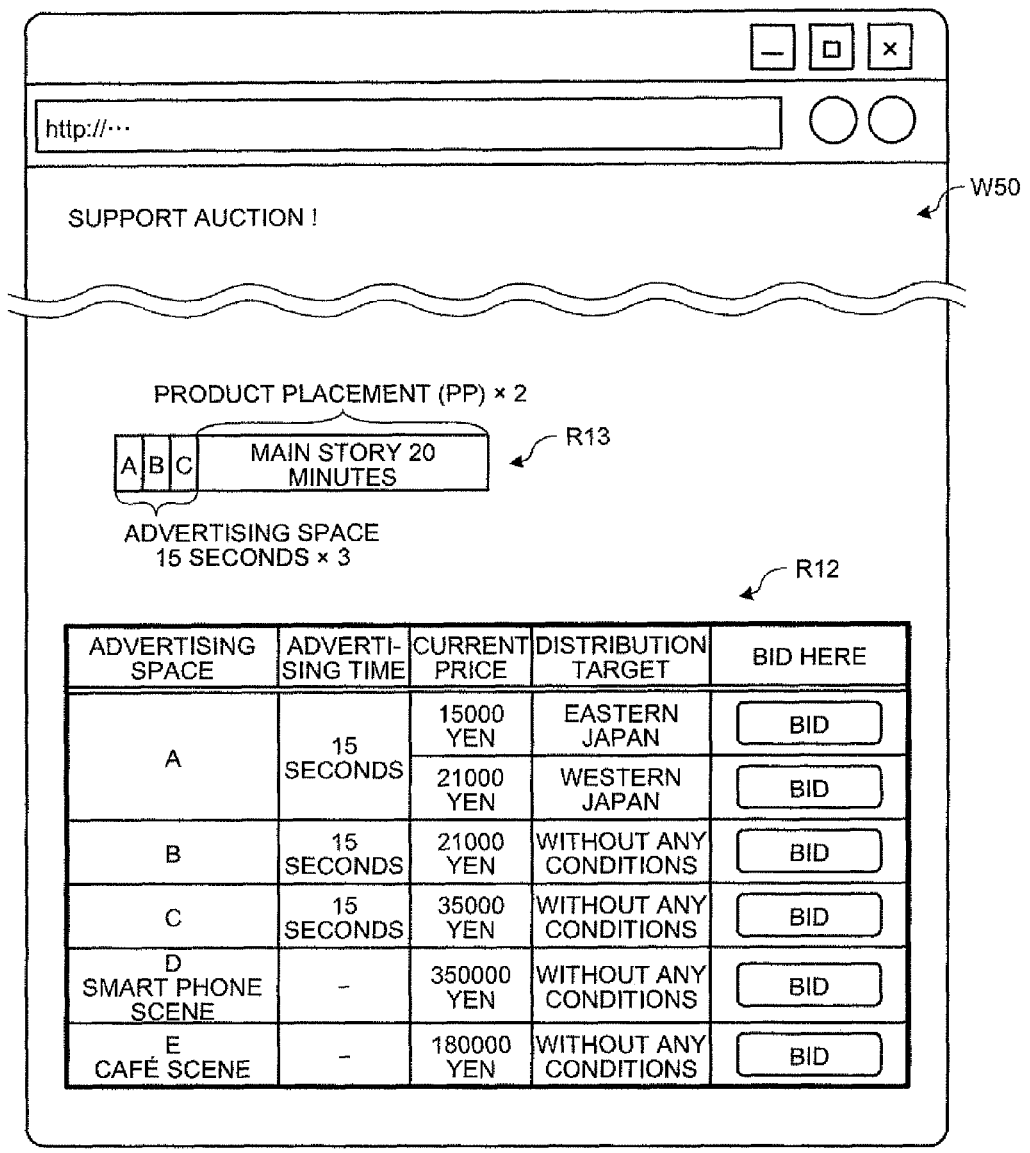
FIG. 12 is a diagram illustrating an example of an auction page according to a modification of the first embodiment.

This will be described with reference to FIGS. 11 and 12. FIGS. 11 and 12 are diagrams illustrating examples of the auction page according to the modification of the first embodiment. In the example illustrated in FIG. 11, the advertising space A which is displayed for the period from 0 second to 15 seconds from the beginning of the moving image is divided into two advertising spaces. Specifically, the advertising space A is divided into an advertising space including information indicating that advertisements are distributed on August 2013 and an advertising space including information indicating that advertisements are distributed on September 2013. In this case, the advertiser determines the bid target from the two advertising spaces A on the basis of the period for which the advertiser wants to distribute advertisements.

Next, the example illustrated in FIG. 12 will be described. It is assumed that advertisements to be distributed vary depending on the distribution destination of content. In the example illustrated in FIG. 12, the advertising space A which is displayed for the period from 0 second to 15 seconds from the beginning of the moving image is divided into an advertising space in which advertisements are distributed to the users in eastern Japan and an advertising space in which advertisements are distributed to the users in western Japan. In this case, the advertiser determines the bid target from the two advertising spaces A on the basis of the distribution of advertisements.

As such, the auction apparatus 100 may distinguish the advertising spaces set to the same reproduction position using the targeting conditions, such as the distribution period or distribution destination of advertisements. In this case, the auction apparatus 100 can increase the choices of the advertiser and improve the degree of satisfaction of the advertiser.

The auction providing unit 132 divides the advertising space as in the example illustrated in FIG. 11 or FIG. 12 on the basis of the advertising space information received from the creator terminal 10. That is, the content creator determines whether to divide the advertising space on the basis of the display period or distribution destination of advertisements.

The targeting conditions for distinguishing the advertising space are not limited to the display period or distribution destination of advertisements, but may be various kinds of user attributes, such as psychographic attributes or demographic attributes. For example, the advertising space set to the same reproduction position may be divided into an advertising space in which advertisements are distributed to the male users and an advertising space in which advertisements are distributed to the female users. For example, the advertising space set to the same reproduction position may be divided into an advertising space in which advertisements are distributed to the user with relatively high preference to a car, an advertising space in which advertisements are distributed to the user with relatively high preference to travel, and an advertising space in which advertisements are distributed to the user with relatively high preference to cosmetics.

In the examples illustrated in FIGS. 11 and 12, the generating unit 135 generates composite content for each combination of the advertising spaces. For example, in the example illustrated in FIG. 12, the generating unit 135 combines the advertising spaces A (eastern Japan), B, C, D, and E to generate composite content and combines the advertising spaces A (western Japan), B, C, D, and E to generate composite content. Then, the transmitting unit 136 transmits the two composite content items generated by the generating unit 135 to the distribution server 30.

5-7. Additional Fee

In the first embodiment, the winning bid amount management unit 133 sends the winning bid amount received from the winning bidder to the content creator. However, the invention is not limited thereto. When the number of times the distribution server 30 distributes the composite content to the user terminal 40 is greater than a predetermined value, the winning bid amount management unit 133 may charge the advertiser, which corresponds to the advertising data incorporated in the composite content, an additional fee. That is, when the number of times the composite content is browsed is greater than a predetermined value, the winning bid amount management unit 133 may charge the advertiser an additional fee. When the additional fee is received from the advertiser, the winning bid amount management unit 133 may send the received additional fee to the content creator. In this case, when the composite content is popular, the auction apparatus 100 pays the additional fee to the content creator. Therefore, it is possible to improve the creative will of the content creator. When the advertiser is charged the additional fee, the auction providing unit 132 inserts information indicating that an additional fee is likely to be charged into the auction page. For example, the auction providing unit 132 inserts a note that "when the number of times the content is browsed is greater than N, an additional fee of M yen is charged" or a note that "when the number of times the content is browsed is greater than N, an additional fee is charged depending on the number of times the content is browsed" into the auction page. Therefore, the auction apparatus 100 informs the advertiser that an additional fee is charged in advance. The notes may be set to the plan information by the content creator or it may be predetermined in the auction apparatus 100.

5-8. Fee

In the first embodiment, the auction apparatus 100 may collect a fee from the advertiser who uses the auction service. For example, when providing the auction page W10 illustrated in FIG. 5 to the advertiser, the auction apparatus 100 may collect a fee for the use of the system from the advertiser. As such, the auction apparatus 100 collects a fee when the advertiser browses the content-plan, which makes it possible to prevent the user who has no intention of participating in the auction from browsing the content-plan. For example, when the winning bidder is determined and the auction is concluded, the auction apparatus 100 may collect a fee from the advertiser who is the winning bidder. In addition, the auction apparatus 100 may collect a fee from the content creator. For example, the auction apparatus 100 may collect a fee from the content creator when the plan information or the advertising space information is received from the content creator.

6. Effect

As described above, the auction apparatus 100 according to the first embodiment includes the plan receiving unit 131 and the auction providing unit 132. The plan receiving unit 131 gradually receives the plan information indicating the content-plan from the content creator who creates the content a plurality of times. The auction providing unit 132 additionally presents the plan information which is gradually received by the plan receiving unit 131 and provides the auction service in which the bid target is the right to display advertisements in the advertising space set to the content.

Therefore, even when the content creator does not sufficiently review the content-plan, the auction apparatus 100 according to the first embodiment can hold the auction. Therefore, it is possible to implement a practical auction for the content creator who plans to create content.

When a plurality of advertising spaces are set to content, the auction providing unit 132 according to the first embodiment manages the auctions related to each advertising space so as to be associated with the plan information (corresponding to an example of the plan ID) corresponding to the content.

Therefore, the auction apparatus 100 according to the first embodiment can manage a plurality of auctions corresponding to one content-plan so as to be associated with each other. For example, the auction apparatus 100 manages each auction so as to be associated with one content-plan. Therefore, it is possible to adjust, for example, the buyout price or the reserve price, as in the above-mentioned example.

Second Embodiment

In a second embodiment, an example in which the consistency between composite content distributed to a distribution server 30 and the content-plan is verified will be described. The structure of an auction system 1 according to the second embodiment is the same as that illustrated in FIG. 2 and the description thereof will not be repeated.

1. Structure of Auction Apparatus

Figure 13:
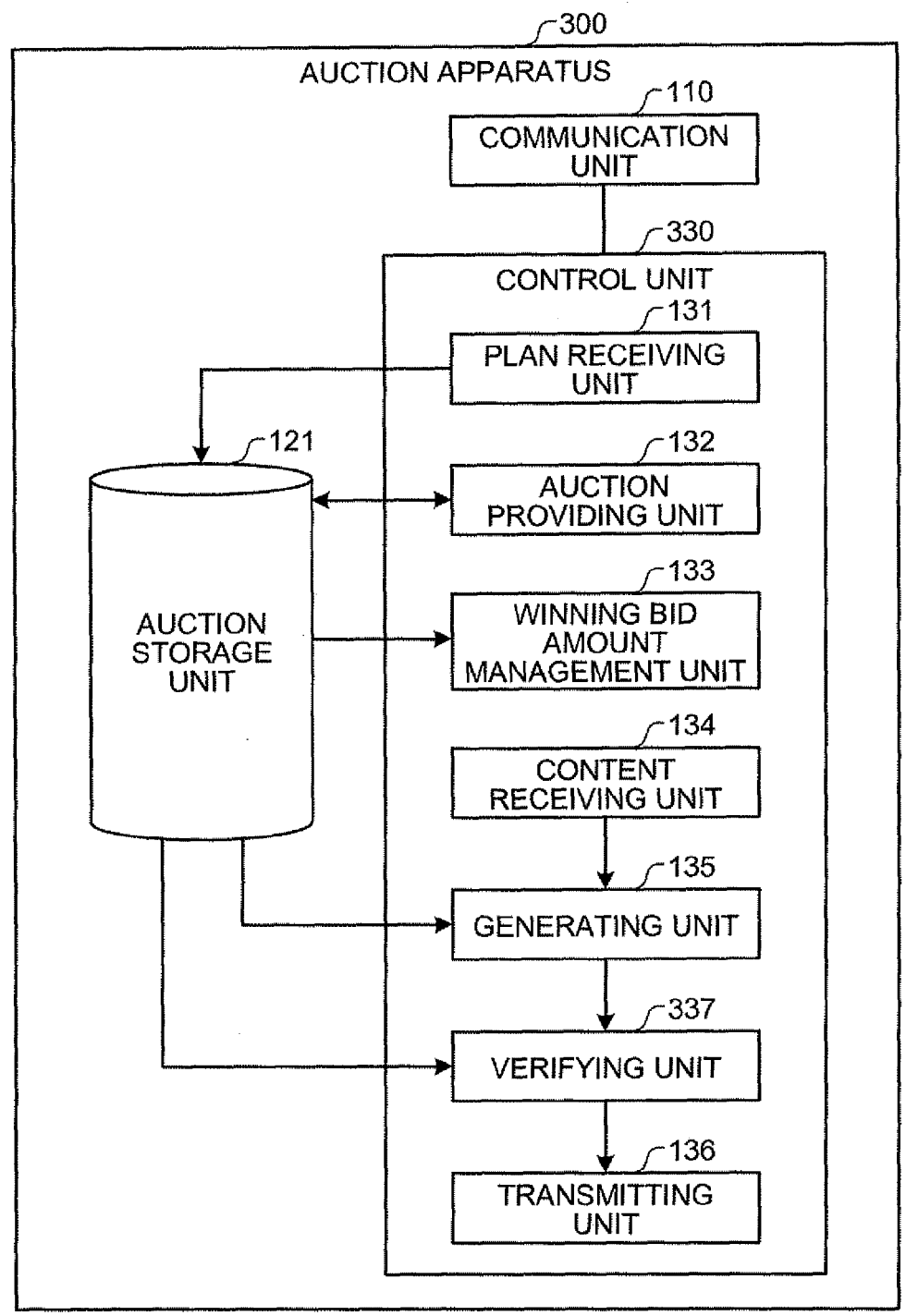
FIG. 13 is a diagram illustrating an example of the structure of an auction apparatus according to a second embodiment.

The structure of an auction apparatus 300 according to the second embodiment will be described with reference to FIG. 13. FIG. 13 is a diagram illustrating an example of the structure of the auction apparatus 300 according to the second embodiment. As illustrated in FIG. 13, a control unit 330 of the auction apparatus 300 includes a verifying unit 337.

The verifying unit 337 verifies the consistency between composite content generated by a generating unit 135 and the content-plan indicated by plan information. Specifically, when composite content is generated by the generating unit 135, the verifying unit 337 verifies whether the generated composite content is consistent with the content-plan and advertising space information stored in an auction storage unit 121.

Figure 14:
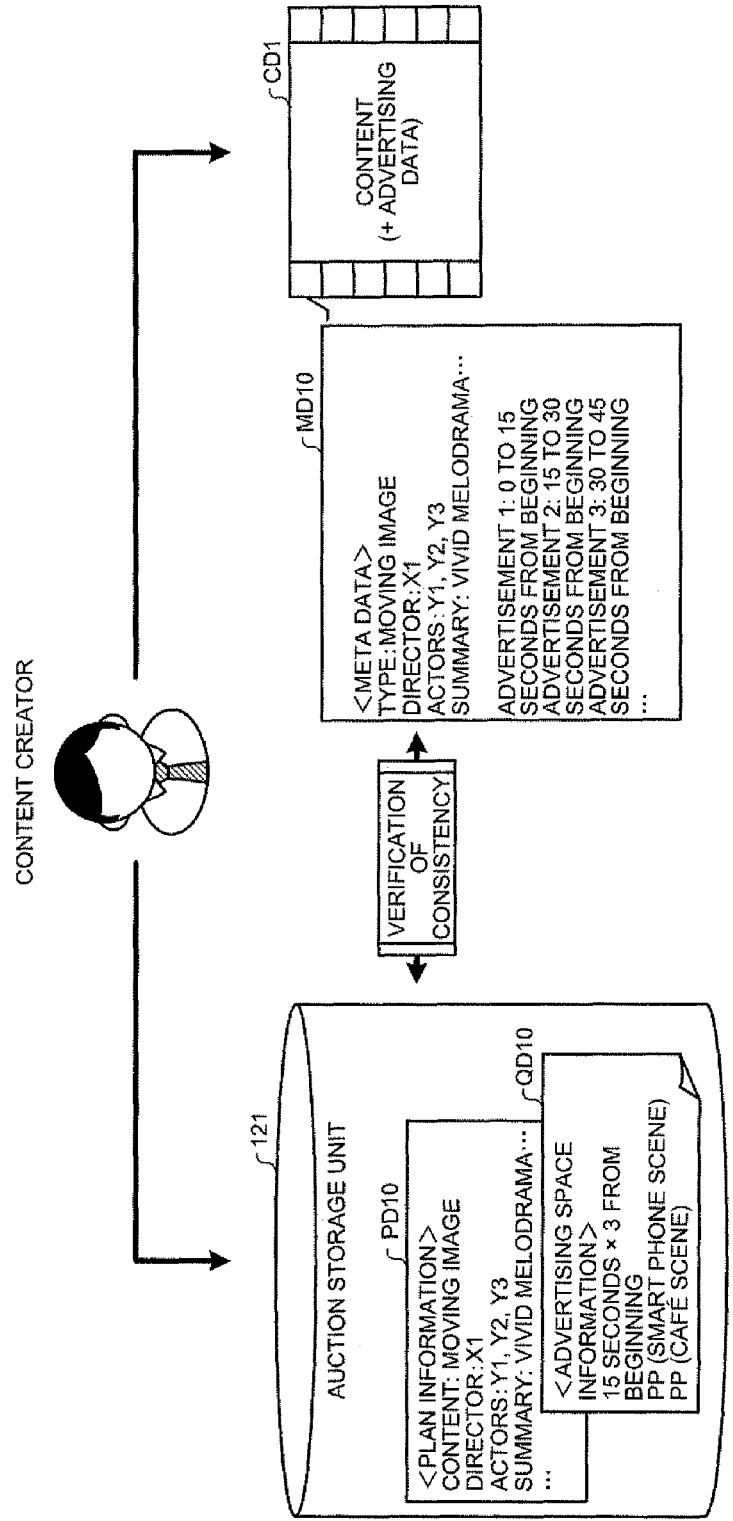
FIG. 14 is a diagram illustrating an example of a verification process performed by a verifying unit according to the second embodiment.

FIG. 14 illustrates an example of a verification process performed by the verifying unit 337 according to the second embodiment. In the example illustrated in FIG. 14, a plan receiving unit 131 receives plan information PD10 and advertising space information QD10 and stores the received information in an auction storage unit 121. The generating unit 135 incorporates advertising data received from a winning bidder into the content created by a content creator to generate composite content CD1. Meta data MD10 indicating the content of a moving image is given to the composite content CD1. In the example illustrated in FIG. 14, the meta data MD10 includes information about the type of content, a director, and actors and information about the reproduction position of an advertising space.

In this situation, the verifying unit 337 analyzes the meta data MD10 and extracts keywords corresponding to items, such as the type of content, the director, the actors, and the reproduction position of the advertising space. For example, when the meta data MD10 is described by a markup language, the verifying unit 337 can easily extract the keywords corresponding to each item from the meta data MD10. Then, the verifying unit 337 verifies whether the plan information PD10 and the advertising space information QD10 stored in the auction storage unit 121 are identical to the keywords extracted from the meta data MD10 for each item.

When the number of items in which the keywords are not identical to the information is equal to or greater than a predetermined threshold value, the verifying unit 337 determines that the composite content is not consistent with the content-plan or the advertising space information. In this case, the verifying unit 337 does not output the composite content to the transmitting unit 136, notifies a creator terminal 10 of the content creator that there is no consistency therebetween, and ends the process. When the verifying unit 337 determines that there is no consistency therebetween, the winning bid amount management unit 133 returns the winning bid amount to the winning bidder. When it is determined that there is the consistency therebetween, the verifying unit 337 outputs the composite content to the transmitting unit 136.

Examples of the item whose consistency is verified by the verifying unit 337 include the "type of content", the "content-plan (for example, the director, the actors, and the summary)", the "number of advertising spaces", the "reproduction position of an advertising space", the "reproduction time of an advertising space", and the "size of an advertising space". In addition, for example, when the plan information includes a deadline for creating the content, the verifying unit 337 verifies whether the content is created within the deadline.

The verifying unit 337 may store result information indicating whether the content which is consistent with the content-plan or the advertising space information is generated, for each content creator. The auction providing unit 132 according to the second embodiment may pay a penalty to the content creator who has created inconsistent content a number of times more than a predetermined value, on the basis of the result information stored by the verifying unit 337. For example, the auction providing unit 132 may pay a penalty for preventing the posting of the plan information and the advertising space information or a penalty for preventing the distribution server 30 from distributing the created content to the user terminal 40.

2. Effect

As described above, the auction apparatus 300 according to the second embodiment includes the verifying unit 337. The verifying unit 337 verifies the consistency between the composite content generated by the generating unit 135 and the content-plan indicated by the plan information.

Therefore, the auction apparatus 300 according to the second embodiment can determine whether the content creator creates content according to the plan. Therefore, it is possible to provide a high-reliability auction service to the advertisers.

Third Embodiment

In a third embodiment, an example of an auction service in which the bid target is a right to display advertisements in an advertising space set to content and a right to replace the advertisements displayed in the advertising space will be described.

1. Auction Process

Figure 15:
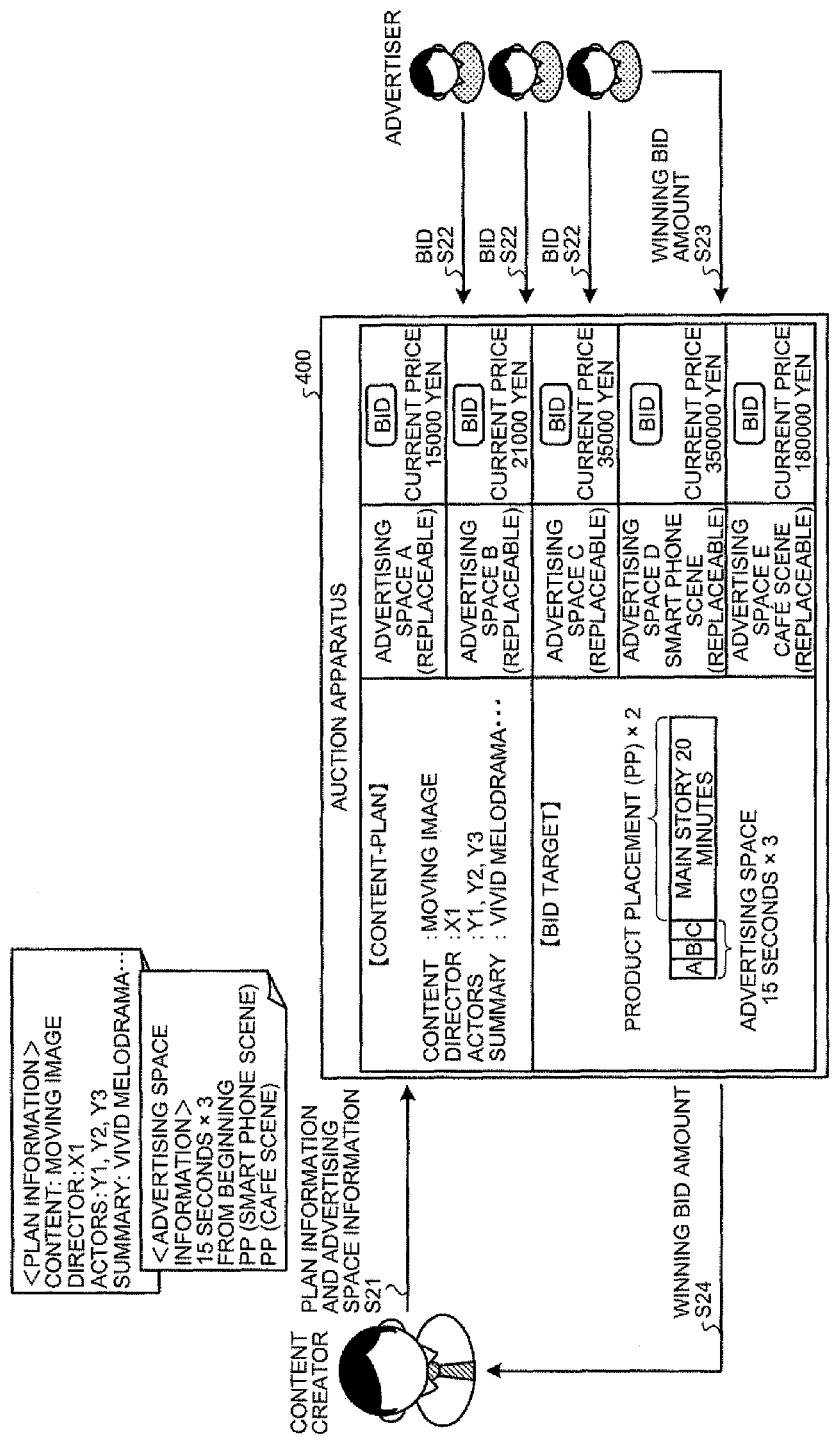
FIG. 15 is a diagram illustrating an example of an auction process according to a third embodiment.

First, an example of an auction process according to a third embodiment will be described with reference to FIG. 15. FIG. 15 is a diagram illustrating an example of the auction process according to the third embodiment. The auction process performed by an auction apparatus 400 illustrated in FIG. 15 improves the possibility that the advertisements desired by the advertiser will be displayed.

Hereinafter, a moving image is given as an example of content.

As illustrated in FIG. 15, an auction apparatus 400 receives plan information indicating the content-plan of the moving image and advertising space information about an advertising space which is set to the moving image by a content creator from the content creator who plans to create the moving image (Step S21).

Then, the auction apparatus 400 presents the plan information received from the content creator to the advertisers and provides the auction service in which the bid target is the right to display advertisements in the advertising space set to the moving image and the right to replace the advertisements displayed in the advertising space.

In the example illustrated in FIG. 15, the auction apparatus 400 opens the type, director, actors, and summary of content on the basis of the plan information and individually provides the auction services related to each advertising space on the basis of the advertising space information. Specifically, the auction apparatus 400 individually holds auctions for advertising spaces A, B, and C which are displayed in the beginning of the moving image and advertising spaces D and E which are displayed in the main story of the moving image. In addition, for example, the auction apparatus 400 according to the third embodiment displays information indicating that the advertisements are replaceable in an auction site such that the user of the auction service recognizes that the right to replace the advertisements is also a bid target.

Then, the auction apparatus 400 receives bids from the advertisers in each auction (Step S22). Then, the auction apparatus 400 determines the advertiser who bids the highest price for the period for which the auction is being held to be a winning bidder and receives the winning bid amount from the winning bidder (Step S23). Then, the auction apparatus 400 sends the winning bid amount received from the winning bidder to the content creator (Step S24).

Then, the auction apparatus 400 incorporates advertising data received from a winning bidder into the moving image created by the content creator to generate a moving image to be distributed. In addition, when new advertising data is received from the winning bidder with the right to replace the advertisements even after the moving image to be distributed is generated, the auction apparatus 400 replaces the advertising data incorporated into the moving image with the new advertising data.

As such, the auction apparatus 400 according to the third embodiment provides the auction service in which the bid targets are both the right to display advertisements and the right to replace the advertisements. Therefore, the auction apparatus 400 can display the advertisements desired by the advertiser in content, such as a moving image. Specifically, when the auction apparatus 400 according to the third embodiment is used, the advertiser who has the right to replace the advertisements can replace the old advertisements which have been input when the advertiser has successfully bid for the right with new advertisements. That is, for example, when a new item has developed, the advertiser can display advertisements corresponding to the new item in the purchased advertising space, without buying the right to display advertisements again at an auction.

2. Structure of Auction Apparatus

Figure 16:
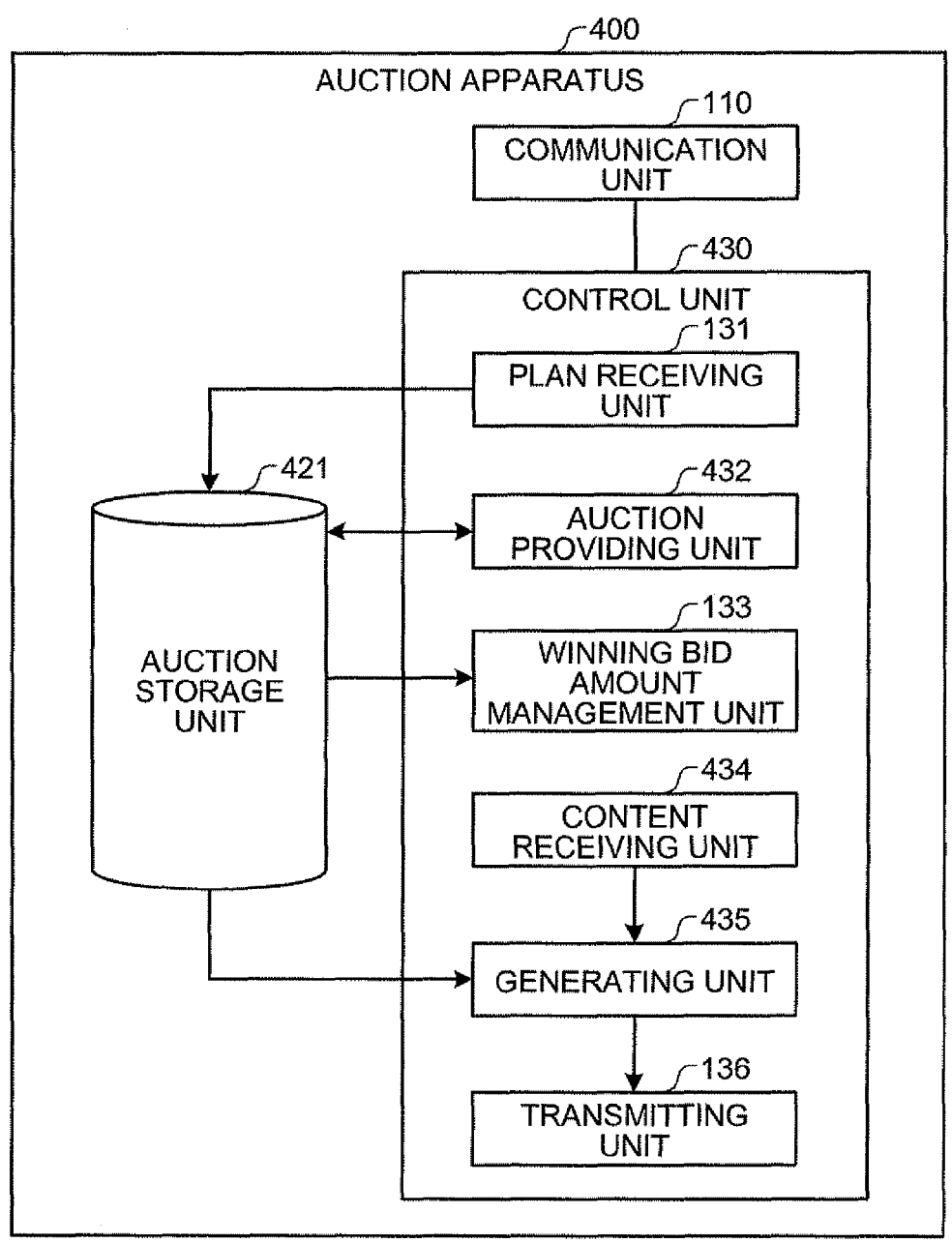
FIG. 16 is a diagram illustrating an example of the structure of an auction apparatus according to the third embodiment.

Next, the structure of the auction apparatus 400 according to the third embodiment will be described with reference to FIG. 16. FIG. 16 is a diagram illustrating an example of the structure of the auction apparatus 400 according to the third embodiment. As illustrated in FIG. 16, the auction apparatus 400 includes an auction storage unit 421 and a control unit 430.

The auction storage unit 421 stores various kinds of information used in the auction service. FIG. 17 illustrates an example of the auction storage unit 421 according to the third embodiment. In the example illustrated in FIG. 17, the auction storage unit 421 includes an item "available or unavailable replacement". The "available or unavailable replacement" indicates whether the advertisements displayed in the advertising space can be replaced or not.

That is, FIG. 17 illustrates an example in which the right to replace advertisements is a bid target in auctions related to advertising spaces A, B, and C and the right to replace advertisements is not a bid target in auctions related to advertising spaces D and E. As such, an advertising space in which advertisements can be replaced and an advertising space in which advertisements cannot be replaced are included in the same content.

As illustrated in FIG. 16, the control unit 430 includes an auction providing unit 432, a content receiving unit 434, and a generating unit 435. The auction providing unit 432 presents the plan information received by the plan receiving unit 131 to the advertiser and provides the auction service in which the bid targets are the right to display advertisements in the advertising space set to content and the right to replace the advertisements displayed in the advertising space.

Specifically, when an auction page acquisition request is received from an advertiser terminal 20, the auction providing unit 432 provides an auction page including the content-plan, which is an acquisition request target, to the advertiser terminal 20. In this case, the auction providing unit 432 inserts information indicating whether advertisements can be replaced into the auction page on the basis of the available or unavailable replacement stored in the auction storage unit 421.

Figure 18:
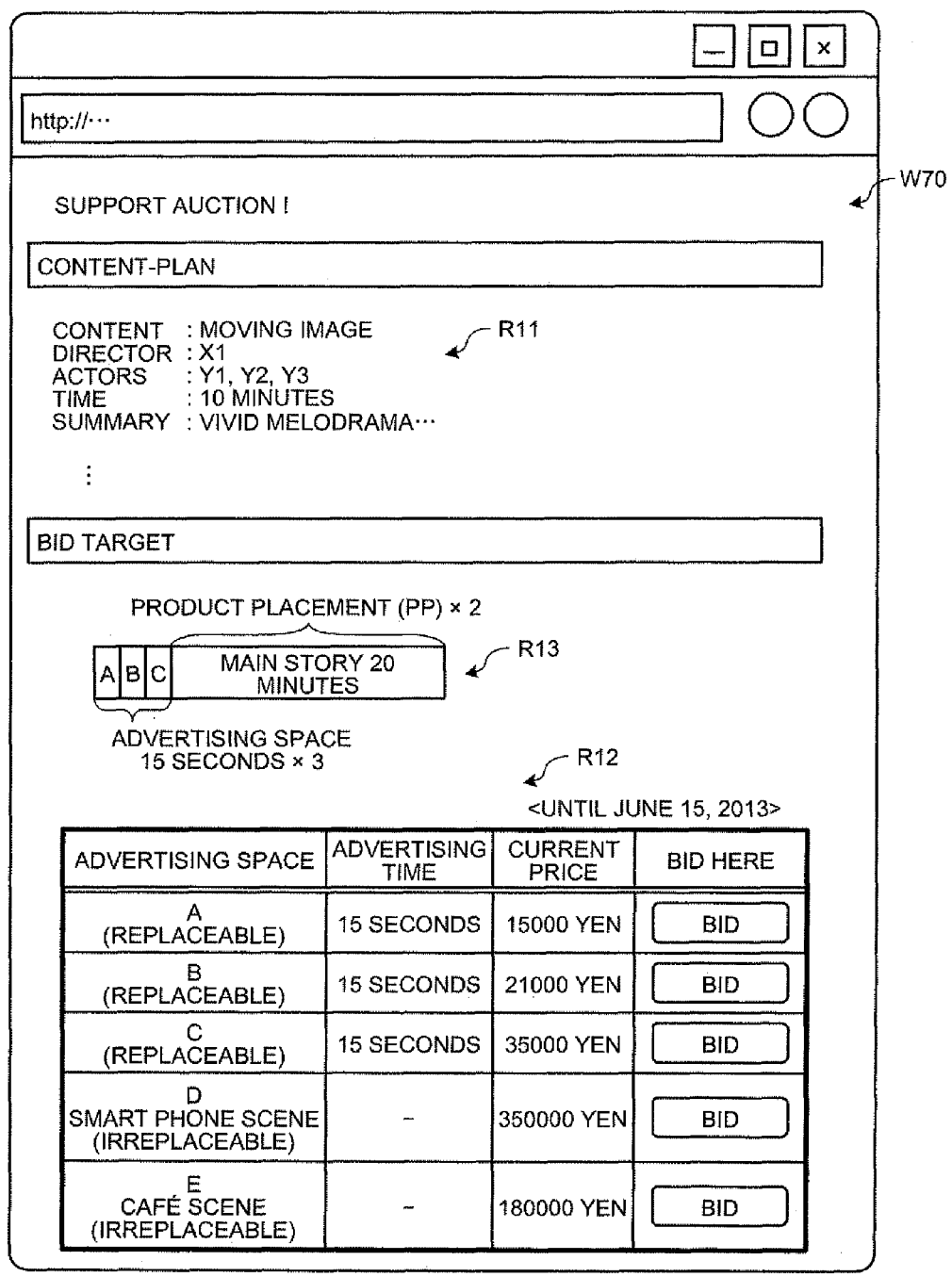
FIG. 18 is a diagram illustrating an example of an auction page generated by an auction providing unit according to the third embodiment.

FIG. 18 illustrates an example of the auction page generated by the auction providing unit 432 according to the third embodiment. FIG. 18 illustrates an example of an auction page W70 corresponding to a plan ID "P11" illustrated in FIG. 17. As in the example illustrated in FIG. 18, the auction providing unit 432 inserts information indicating whether the advertisements displayed in each advertising space can be replaced into a bid display field R12 on the basis of the item available or unavailable replacement stored in the auction storage unit 421. In the example illustrated in FIG. 18, the auction providing unit 432 inserts information indicating that the advertisements are replaceable into the fields corresponding to the advertising spaces A, B, and C. In addition, the auction providing unit 432 inserts information indicating that the advertisements are irreplaceable into the fields corresponding to the advertising spaces D and E.

In some cases, the content receiving unit 434 receives advertising data which is displayed in the same advertising space of the same content a plurality of times from the advertiser terminal 20 of the advertiser. In this case, the content receiving unit 434 outputs the advertising data which is initially received from the advertiser terminal 20 to the generating unit 435. This indicates that the advertising data has been transmitted from the advertiser when the bid has been successful.

In addition, in some cases, the content receiving unit 434 receives the second or subsequent new advertising data from the advertiser terminal 20. This indicates that advertising data for replacement has been transmitted from the advertiser who has the right to replace the advertisements. In this case, the content receiving unit 434 determines whether the advertiser who has transmitted the new advertising data has the right to replace the advertisements on the basis of the item available or unavailable replacement stored in the auction storage unit 421. When the advertiser has the right to replace the advertisements, the content receiving unit 434 outputs the new advertising data to the generating unit 435. On the other hand, when the advertiser does not have the right to replace the advertisements, the content receiving unit 434 does not output the new advertising data to the generating unit 435 and notifies the advertiser terminal 20 that the advertisements are irreplaceable.

The generating unit 435 combines the content and the advertising data received by the content receiving unit 434 to generate composite content. In addition, whenever new advertising data is input from the content receiving unit 434, the generating unit 435 according to the third embodiment incorporates the new advertising data into the content to generate new composite content.

Whenever new composite content is generated by the generating unit 435, a transmitting unit 136 transmits the new composite content to a distribution server 30. Then, when the new composite content is received from the transmitting unit 136, the distribution server 30 transmits the new composite content in which the advertisements are replaced to a user terminal 40.

An example of the process of the content receiving unit 434, the generating unit 435, and the transmitting unit 136 will be described. The content receiving unit 434 receives a replacement request including, for example, a plan ID, an auction ID, an advertiser ID, and advertising data from the advertiser terminal 20. Then, the content receiving unit 434 acquires information indicating whether replacement is available or unavailable which corresponds to the plan ID, the auction ID, and the advertiser ID included in the replacement request from the auction storage unit 421. Then, the content receiving unit 434 determines whether the advertiser who has transmitted the replacement request has a "right to replace advertisements", on the basis of the acquired information indicating whether replacement is available or unavailable. When the content receiving unit 434 determines that the advertiser has the right to replace advertisements, the generating unit 435 incorporates the advertising data included in the replacement request into the advertising space identified by the auction ID among the advertising spaces which are set to the composite content identified by the plan ID. That is, the generating unit 435 replaces the advertising data incorporated into the advertising space which is identified by the auction ID with the advertising data included in the replacement request. Then, the transmitting unit 136 transmits the composite content including the advertising data replaced by the generating unit 435 to the distribution server 30.

In the above-mentioned example, the composite content is identified by the plan ID. However, the invention is not limited thereto. For example, when content is received from the content creator, the content receiving unit 434 may transmit a content ID for identifying the received content. In this case, the content receiving unit 434 may store the content ID in the auction storage unit 421 so as to be associated with the plan ID. For example, when generating composite content, the generating unit 435 may transmit a composite content ID for identifying the generated composite content. In this case, the generating unit 435 may store the content ID in the auction storage unit 421 so as to be associated with the composite content ID.

The content receiving unit 434 may notify the winning bidder whether there is advertising data for replacement at a predetermined time. For example, when a predetermined period of time has elapsed from the reception of the last advertising data, the content receiving unit 434 notifies the winning bidder whether there is advertising data for replacement.

Figure 19:
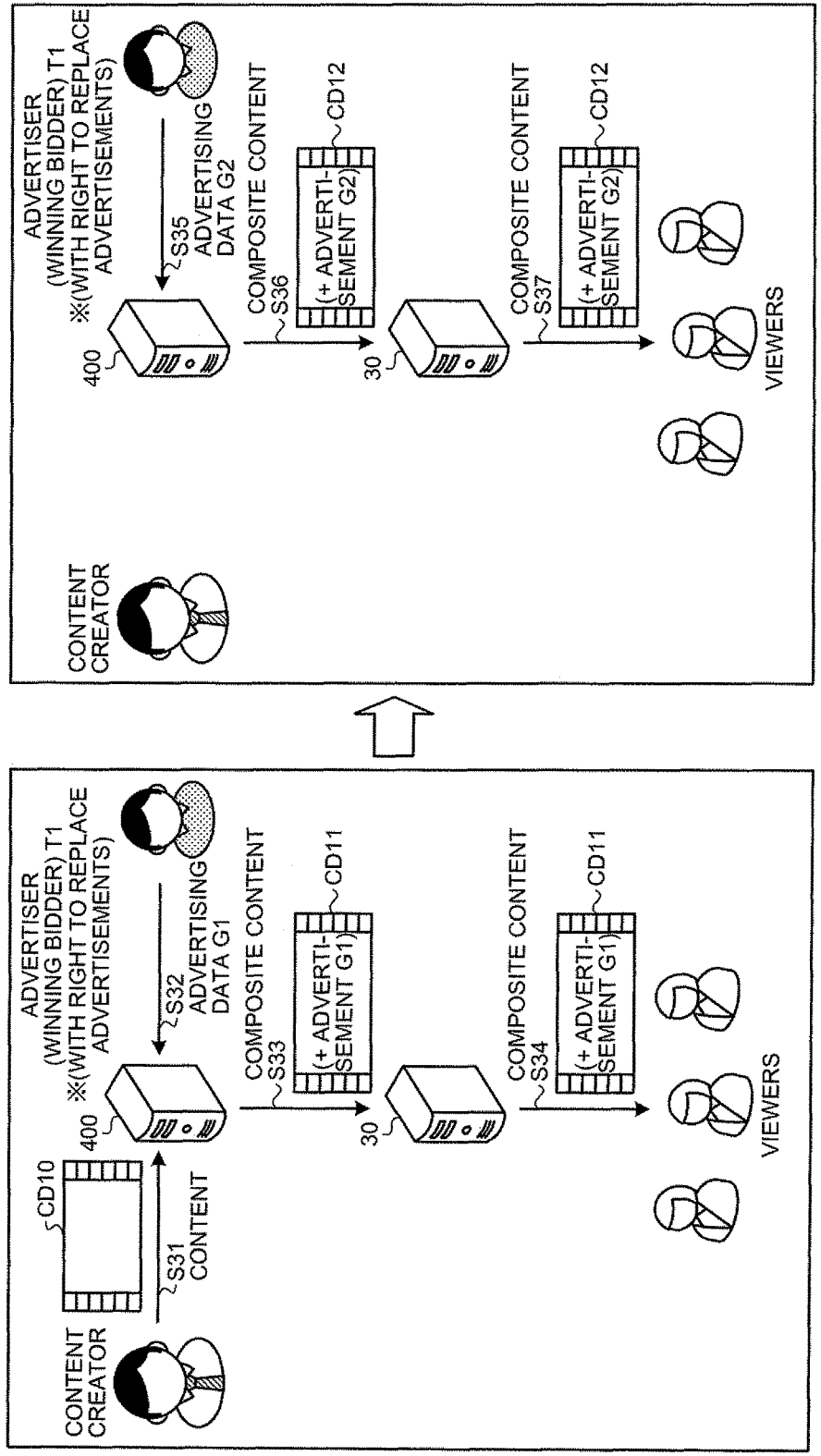
FIG. 19 is a diagram illustrating an example of a replacement process performed by the auction apparatus according to the third embodiment.

FIG. 19 illustrates an example of the replacement process performed by the auction apparatus 400 according to the third embodiment. In the example illustrated on the left side of FIG. 19, it is assumed that an advertiser T1 has successfully bid for the right to display advertisements and the right to replace advertisements. In this case, the auction apparatus 400 receives content CD10 from the content creator (Step S31) and receives advertising data G1 from the advertiser T1 (Step S32). Then, the auction apparatus 400 incorporates the advertising data G1 into the content CD10 to generate composite content CD11 and transmits the generated composite content CD11 to the distribution server 30 (Step S33). Then, the distribution server 30 distributes the composite content CD11 to a viewer using a user terminal 40 (Step S34).

Then, as illustrated on the right side of FIG. 19, it is assumed that the auction apparatus 400 receives advertising data G2 different from the advertising data G1 from the advertiser T1 (Step S35). In this case, since the advertiser T1 has the right to replace advertisements, the auction apparatus 400 incorporates the advertising data G2 into the content CD10 to generate new composite content CD12. In other words, the auction apparatus 400 replaces the advertising data G1 incorporated into the composite content CD11 with the advertising data G2. Then, the auction apparatus 400 transmits the composite content CD12 to the distribution server 30 (Step S36). Then, the distribution server 30 distributes the composite content CD12 having the advertising data G2 incorporated thereinto to the viewer (Step S37).

In the example illustrated in FIG. 19, it is assumed that the advertiser T1 has the right to display advertisements, but does not have the right to replace advertisements. In this case, when the advertising data G2 is received from the advertiser T1, the auction apparatus 400 does not incorporate the advertising data G2 into the content CD10. That is, the auction apparatus 400 does not generate the new composite content CD12. In this case, the auction apparatus 400 notifies the advertiser T1 that the advertiser T1 does not have the right to replace advertisements and ends the process.

4. Procedure of Auction Process

Figure 20:
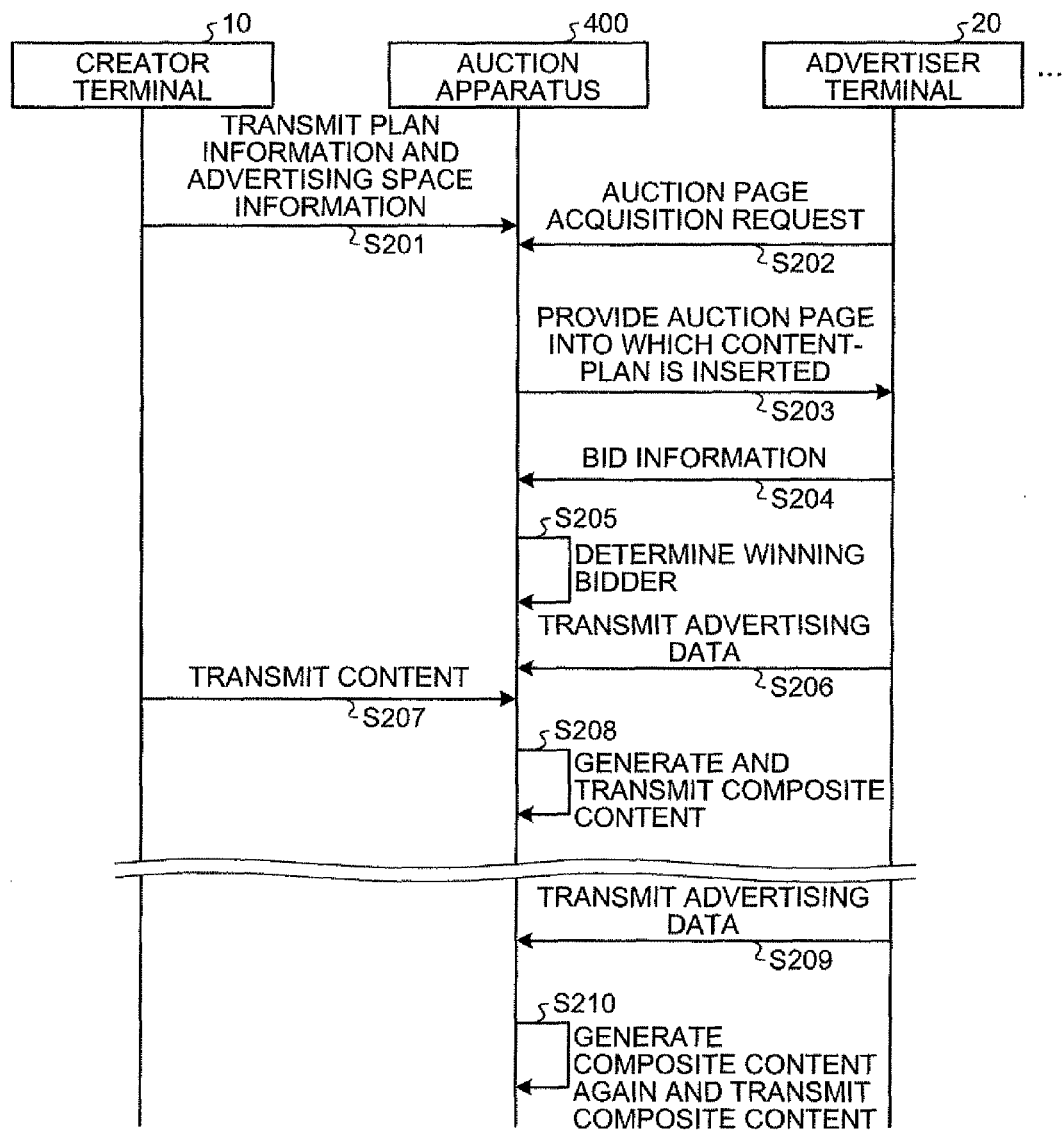
FIG. 20 is a sequence diagram illustrating the procedure of an auction process performed by an auction system according to the third embodiment.

Next, the procedure of the auction process performed by the auction system 1 according to the third embodiment will be described with reference to FIG. 20. FIG. 20 is a sequence diagram illustrating the procedure of the process performed by the auction system 1 according to the third embodiment. FIG. 20 illustrates only one advertiser terminal 20. However, in practice, there are a plurality of advertiser terminals 20.

As illustrated in FIG. 20, the content creator transmits the plan information and the advertising space information to the auction apparatus 400 using the creator terminal 10 (Step S201). In this case, the auction apparatus 400 stores the plan information and the advertising space information in the auction storage unit 421.

Then, when an auction page acquisition request is received from the advertiser terminal 20 (Step S202), the auction apparatus 400 provides an auction page into which the content-plan is inserted to the advertiser terminal 20 (Step S203). In this way, the auction apparatus 400 provides the advertiser the auction service in which the bid targets are the right to display advertisements and the right to replace advertisements. Then, the auction apparatus 400 receives bid information including a bid price from the advertiser terminal 20 through the auction page (Step S204). In this way, the auction apparatus 400 receives the bid information from a plurality of advertiser terminals 20.

Then, the auction apparatus 400 determines the winning bidder on the basis of the bid information received from the advertiser terminal 20 (Step S205). For example, the auction apparatus 400 determines the advertiser who bids the highest price at the date and time when the auction has ended to be the winning bidder. Here, it is assumed that the advertiser using the advertiser terminal 20 has successfully bid for the right to display advertisements and the right to replace advertisements. Then, the auction apparatus 400 manages the winning bid amount received from the winning bidder. Then, when the content creator charges for the cost of creation, the auction apparatus 400 subtracts the cost from the winning bid amount and sends the cost to the content creator.

The winning bidder transmits advertising data to the auction apparatus 400 using the advertiser terminal 20 (Step S206). When content has been created, the content creator transmits the content to the auction apparatus 400 using the creator terminal 10 (Step S207).

The auction apparatus 400 incorporates the advertising data received from the advertiser into the content received from the content creator to generate composite content and transmits the generated composite content to the distribution server 30 (Step S208).

Then, the winning bidder who has successfully bid for the right to replace advertisements transmits new advertising data to the auction apparatus 400 using the advertiser terminal 20 (Step S209). In this case, the auction apparatus 400 incorporates new advertising data into the content which is received from the content creator in Step S207 to generate new composite content and transmits the generated composite content to the distribution server 30 (Step S210).

4. Modifications

The third embodiment is not limited to the above-mentioned structure, but various other structures can be configured. Next, the modifications of the third embodiment will be described.

4-1. Period for which Advertisements are Replaceable

In the third embodiment, the right to replace advertisements without any conditions is a bid target. However, the auction providing unit 432 may provide the auction service in which the bid target is a right to replace the advertisements displayed in the advertising spaces for a predetermined period.

Figure 21:
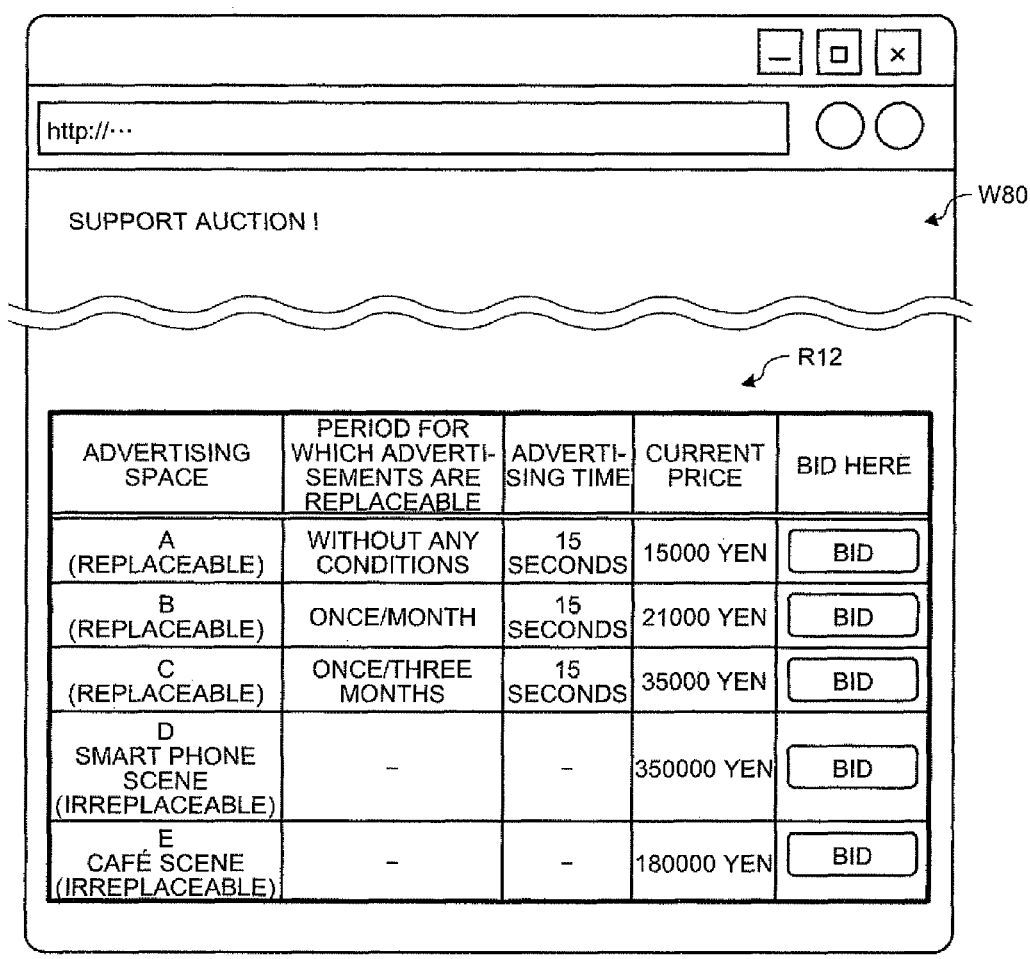
FIG. 21 is a diagram illustrating an example of an auction page according to a modification of the third embodiment.

This will be described with reference to FIG. 21. FIG. 21 is a diagram illustrating an example of an auction page according to a modification of the third embodiment. As illustrated in FIG. 21, the auction providing unit 432 inserts the period for which advertisements are replaceable into a bid display field R12 of an auction page W80. In the example illustrated in FIG. 21, a right to replace advertisements without any conditions is a bid target in the auction related to the advertising space A, a right to replace advertisements once a month is a bid target in the auction related to the advertising space B, and a right to replace advertisements once for three months is a bid target in the auction related to the advertising space C.

As such, the auction providing unit 432 provides the auction service in which the bid target is the right to replace advertisements for a designated period to increase the options of the advertiser. For example, it is considered that the auction in which advertisements can be replaced without any conditions significantly increases the winning bid price. The advertiser who frequently replaces the advertisements is willing to buy the right to replace advertisements without any conditions at an auction even when the winning bid price is high. However, some advertisers want to buy the right to replace advertisements at a low price at an auction. In this case, the advertiser bids for the right with a limited advertisement replacement period in the auction illustrated in FIG. 21. In this way, the advertiser can buy the right to replace advertisements at a low price at an auction. Therefore, the auction providing unit 432 can increase the options of the advertiser. As a result, it is possible to improve the degree of satisfaction of the advertiser.

4-2. Provision of Reference Information

In the third embodiment, the auction apparatus 400 may transmit various kinds of log information about the distribution of composite content to the user terminal 40 to the winning bidder.

Figure 22:
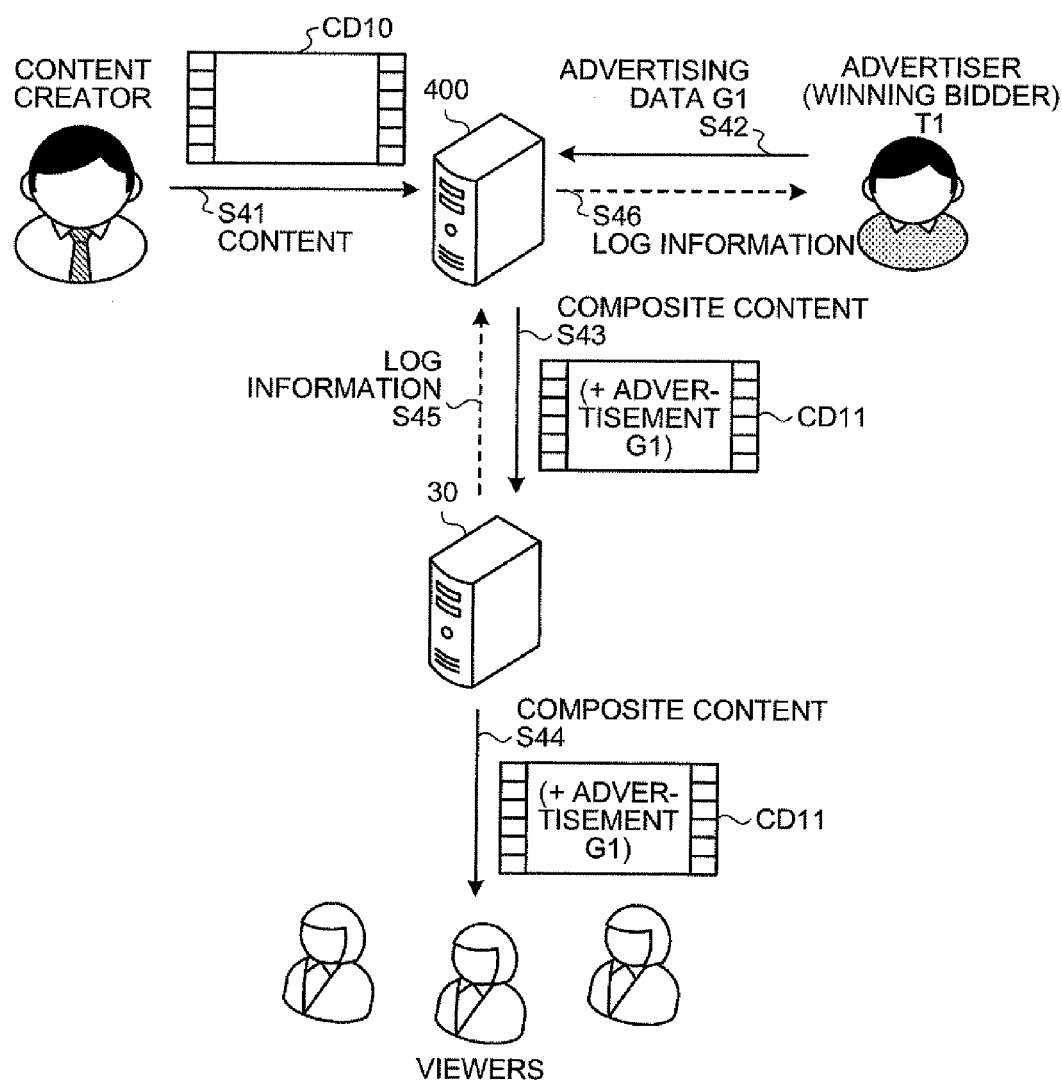
FIG. 22 is a diagram illustrating an example of an auction process according to a modification of the third embodiment.

This will be described with reference to FIG. 22. FIG. 22 is a diagram illustrating an example of an auction process according to a modification of the third embodiment. In the example illustrated in FIG. 22, it is assumed that the advertiser T1 has successfully bid for the right to display advertisements and the right to replace advertisements. In the auction process, Steps S41 to S44 are the same as Steps S31 to S34 illustrated in FIG. 19.

The distribution server 30 stores log information about a distribution process for the composite content CD11. For example, the distribution server 30 includes, as the log information, information about the user attributes (for example, psychographic attributes or demographic attributes) of the viewer, who is the distribution destination of the composite content CD11, or the place where the viewer resides. In some cases, when the composite content CD11 is distributed by streaming, the distribution server 30 stores, as the log information, information indicating whether the viewer browses the advertisements in the moving image. In general, the server which distributes content stores the log information.

The auction providing unit 432 of the auction apparatus 400 collects the log information about the distribution process from the distribution server 30 (Step S45) and transmits the collected log information to the advertiser T1 (Step S46). In this case, the auction providing unit 432 transmits, to the advertiser T1, only information which is permitted to be opened to the advertiser T1 among the log information items collected from the distribution server 30. For example, the auction providing unit 432 transmits, to the advertiser T1, only the user attributes (for example, sex and preference) which do not specify an individual except for personal information, such as the name or address of the viewer, included in the log information.

Then, the advertiser T1 can determine the necessity for replacing the advertisements or the advertisements to be replaced, with reference to the log information. For example, it is assumed that the advertiser T1 obtains information indicating that most of the viewers of the composite content CD11 are women, with reference to the log information. In this case, when the advertising data G1 is a male-oriented advertisement, the advertiser T1 can determine that there is a necessity for replacing the advertising data G1 with female-oriented advertising data. That is, the auction apparatus 400 can feed back the log information about the distribution process to the winning bidder to support the replacement of advertisements.

In the example illustrated in FIG. 22, since the winning bidder who has successfully bid for only the right to display advertisements does not need the log information, the auction apparatus 400 may transmit the log information only to the winning bidder who has bought the right to replace advertisements.

6. Effect

As described above, the auction apparatus 400 according to the third embodiment includes the plan receiving unit 131 and the auction providing unit 432. The plan receiving unit 131 receives the plan information indicating the content-plan from the content creator who create the content. The auction providing unit 432 presents the plan information received by the plan receiving unit 131 and provides the auction service in which the bid target is the right to display advertisements in the advertising space that is set to the content and the right to replace the advertisements displayed in the advertising space.

Therefore, the auction apparatus 400 according to the third embodiment can display the desired advertisements of the advertiser in content such as a moving image.

The auction providing unit 432 according to the third embodiment provides the auction service in which the bid target is the right to replace the advertisements displayed in the advertising space for a predetermined period.

Therefore, the auction apparatus 400 according to the third embodiment can increase the options of the advertiser who is a bidder.

The content receiving unit 434 according to the third embodiment receives new advertising data from the winning bidder. The generating unit 435 incorporates the new advertising data received by the content receiving unit 434 into the advertising space set to the content to generate new composite content.

Therefore, the auction apparatus 400 according to the third embodiment can reliably replace the advertising data incorporated into the content in response to a request from the winning bidder.

Fourth Embodiment

In a fourth embodiment, an example in which the entire content-plan is presented to the advertiser who agrees with the policy of prohibiting the illegal use of the content-plan.

1. Auction Process

Figure 23:
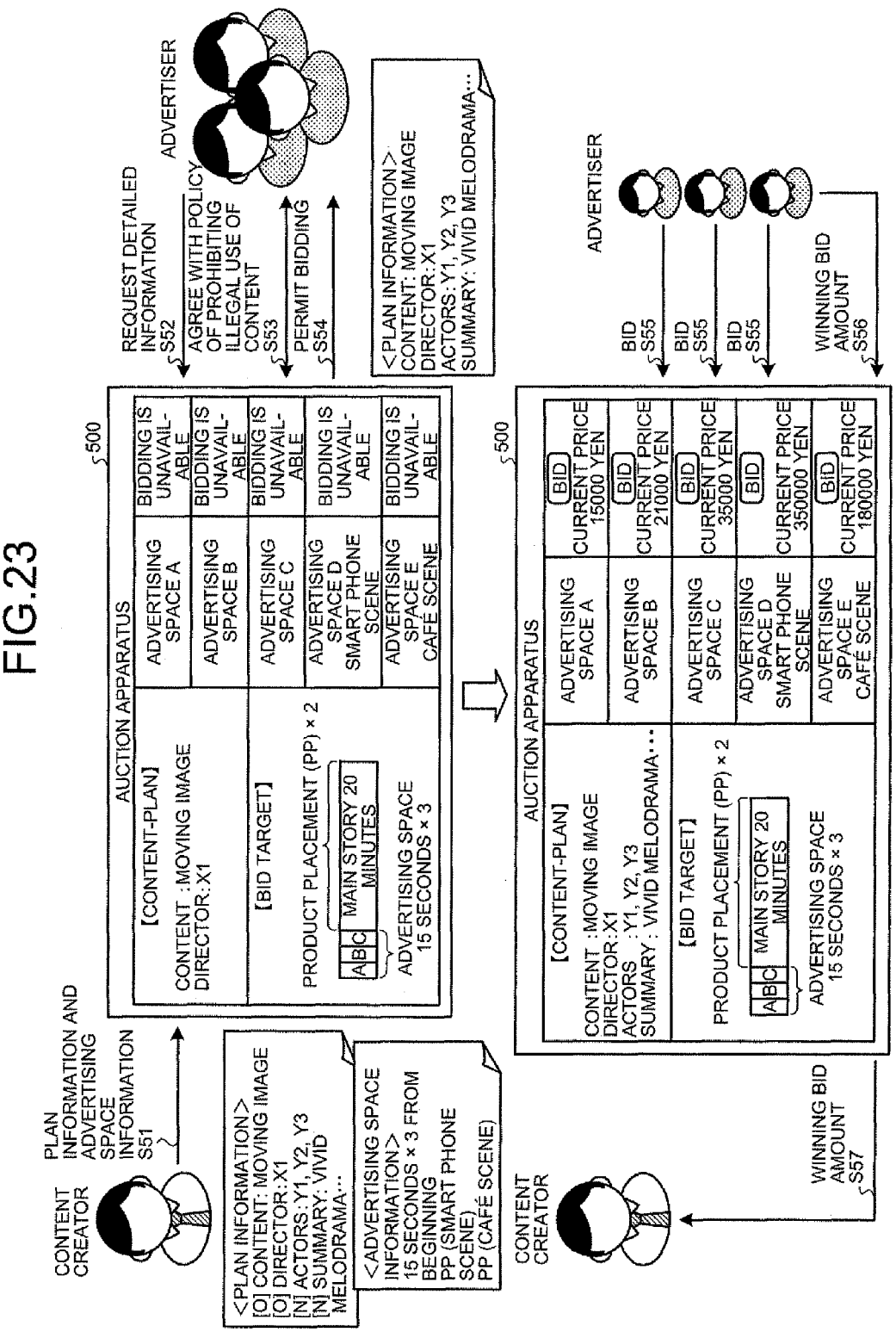
FIG. 23 is a diagram illustrating an example of an auction process according to a fourth embodiment.

First, an example of an auction process according to a fourth embodiment will be described with reference to FIG. 23. FIG. 23 is a diagram illustrating an example of the auction process according to the fourth embodiment. The auction process performed by an auction apparatus 500 illustrated in FIG. 23 prevents the illegal use of the content-plan. Hereinafter, a moving image is given as an example of content.

As illustrated on the upper side of FIG. 23, an auction apparatus 500 receives plan information indicating the content-plan of a moving image and advertising space information about an advertising space which is set to the moving image by a content creator from the content creator who plans to create the moving image (Step S51). In this case, the auction apparatus 500 receives the plan information including information which can be presented to the advertiser without any conditions.

FIG. 23 illustrates an example in which information represented by a symbol "[O]" is permitted to be presented to the advertiser without any conditions and information represented by a symbol "[N]" is not permitted to be presented to the advertiser without any conditions. That is, the type or content or the director is permitted to be opened to the public, but the actor or summary is not permitted to be opened to the public. As such, in the example illustrated in FIG. 23, the content creator sets the items which can be opened to the public.

When the plan information and the advertising space information are received, the auction apparatus 500 provides an auction service in which a right to display advertisements in the advertising space of the moving image is a bid target to the advertiser who agrees with the policy of prohibiting the illegal use of the content-plan. Specifically, in an initial stage, the auction apparatus 100 presents only a portion of the plan information to the advertiser, with bidding being unavailable. In the example illustrated in the upper part of FIG. 23, when the advertiser accesses the auction apparatus 500, the auction apparatus 500 presents the advertiser information about the type of content and the director which are permitted to be presented without any conditions among various kinds of information included in the plan information.

Then, when the advertiser who has browsed a portion of the plan information requests the detailed information of the content-plan (Step S52), the auction apparatus 500 inquires the advertiser whether to agree with the police of prohibiting the illegal use of the content-plan through, for example, a web page (Step S53). Then, the auction apparatus 500 permits the advertiser who has agreed with the police of prohibiting the illegal use of the content-plan to bid for the bid target (Step S54).

Then, as illustrated on the lower side of FIG. 23, when the advertiser who agrees with the policy of prohibiting the illegal use of the content accesses the auction apparatus 500, the auction apparatus 500 presents all plan information to the advertiser and provides the auction service in which the bid target is the right to display advertisements in the advertising space of the moving image.

Then, the auction apparatus 500 receives bids from the advertisers in each auction (Step S55). Then, the auction apparatus 500 determines the advertiser who bids the highest price for the period for which the auction is being held to be the winning bidder and receives the winning bid amount from the winning bidder (Step S56). Then, the auction apparatus 500 sends the winning bid amount received from the winning bidder to the content creator (Step S57). Then, the auction apparatus 500 incorporates the advertising data received from the winning bidder into the moving image created by the content creator to generate a moving image to be distributed.

As such, the auction apparatus 500 according to the fourth embodiment presents only a portion of the plan information and then provides an auction service in which bidding is not available. Then, the auction apparatus 500 presents all plan information to the advertisers who agree with the policy of prohibiting the illegal use of the content-plan and provides an auction service in which bidding is available. Therefore, the auction apparatus 500 presents all plan information only to the advertisers who agree with the user policy. As a result, even when the auction service for content in the planning stage is provided, it is possible to prevent the illegal use of the content-plan.

2. Structure of Auction Apparatus

Figure 24:
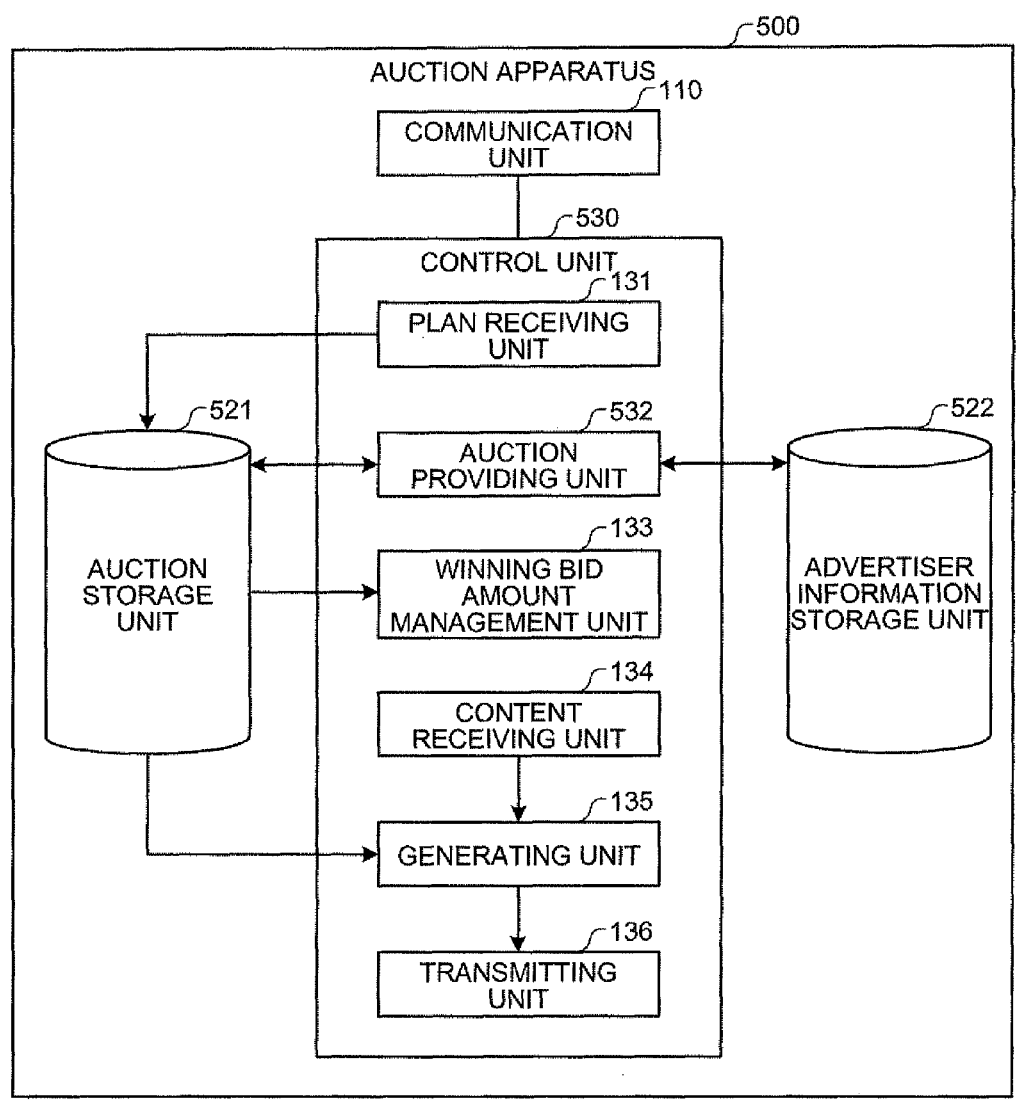
FIG. 24 is a diagram illustrating an example of the structure of an auction apparatus according to the fourth embodiment.

Next, the structure of the auction apparatus 500 according to the fourth embodiment will be described with reference to FIG. 24. FIG. 24 is a diagram illustrating an example of the structure of the auction apparatus 500 according to the fourth embodiment. As illustrated in FIG. 24, the auction apparatus 500 includes an auction storage unit 521, an advertiser information storage unit 522, and a control unit 530.

FIG. 25 illustrates an example of the auction storage unit 521 according to the fourth embodiment. In the example illustrated in FIG. 25, the auction storage unit 521 includes an item such as an "open item". The "open item" indicates an item which is permitted to be opened to the public without any conditions in the content-plan. That is, in the example illustrated in FIG. 25, the type of content and information about the director who creates content (in this example, a moving image) in the content-plan are permitted to be opened to the public without any conditions.

Figure 26:
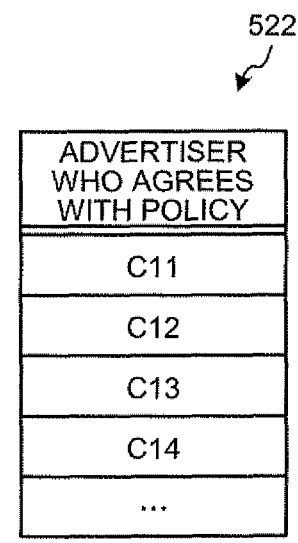
FIG. 26 is a diagram illustrating an example of an advertiser information storage unit according to the fourth embodiment.

The advertiser information storage unit 522 stores information about the advertisers who are permitted to use the auction service. FIG. 26 illustrates an example of the advertiser information storage unit 522 according to the fourth embodiment. In the example illustrated in FIG. 26, the advertiser information storage unit 522 includes an item such as an "advertiser who agrees with policy". The "advertiser who agrees with policy" indicates an advertiser ID for identifying the advertiser who agrees with the policy of prohibiting the illegal use of the content-plan, That is, in the example illustrated in FIG. 26, the advertisers identified by advertiser IDs "C11", "C12", "C13", and "C14" agree with the policy of prohibiting the illegal use of the content-plan and can use the auction service in which bidding is available.

The control unit 530 includes an auction providing unit 532. The auction providing unit 532 presents the plan information received by a plan receiving unit 131 and provides the auction service in which the bid target is the right to display advertisements in content.

Specifically, when an auction page acquisition request is received from an advertiser terminal 20 of the advertiser, the auction providing unit 532 determines whether the advertiser ID of the advertiser has been stored in the advertiser information storage unit 522. For example, the advertiser terminal 20 transmits the advertiser ID and the acquisition request. Alternatively, when a login is required to use various types of services provided by the auction apparatus 500, the login ID of the advertiser may be used as the advertiser ID.

Then, when the advertiser ID has not been stored in the advertiser information storage unit 522, the auction providing unit 532 determines that the auction page acquisition request has been received from the advertiser who has not agreed with the policy of prohibiting the illegal use of the content. In this case, the auction providing unit 532 extracts the plan information corresponding to the open item from the content-plan stored in the auction storage unit 521 and provides an auction page having the extracted plan information inserted thereinto to the advertiser terminal 20. In this case, the auction providing unit 532 provides the auction page into which the information about the advertising space is also inserted, on the basis of the advertising space information stored in the auction storage unit 521. However, the auction providing unit 532 provides the auction page in which bidding is unavailable at this point of time.

On the other hand, when the advertiser ID of the advertiser who has transmitted the acquisition request has been stored in the advertiser information storage unit 522, the auction providing unit 532 determines that the auction page acquisition request has been received from the advertiser who agrees with the policy of prohibiting the illegal use of the content. In this case, the auction providing unit 532 provides the auction page into which the content-plan stored in the auction storage unit 521 is inserted to the advertiser terminal 20. At that time, the auction providing unit 532 provides the auction page which includes information about the advertising space and in which bidding is available. The auction providing unit 532 receives bid information including a bid price from the advertiser terminal 20 through the auction page. In this case, the auction providing unit 532 stores the bid price included in the bid information in the auction storage unit 521 so as to be associated with an auction ID indicating the auction corresponding to a bid target.

Figure 27:
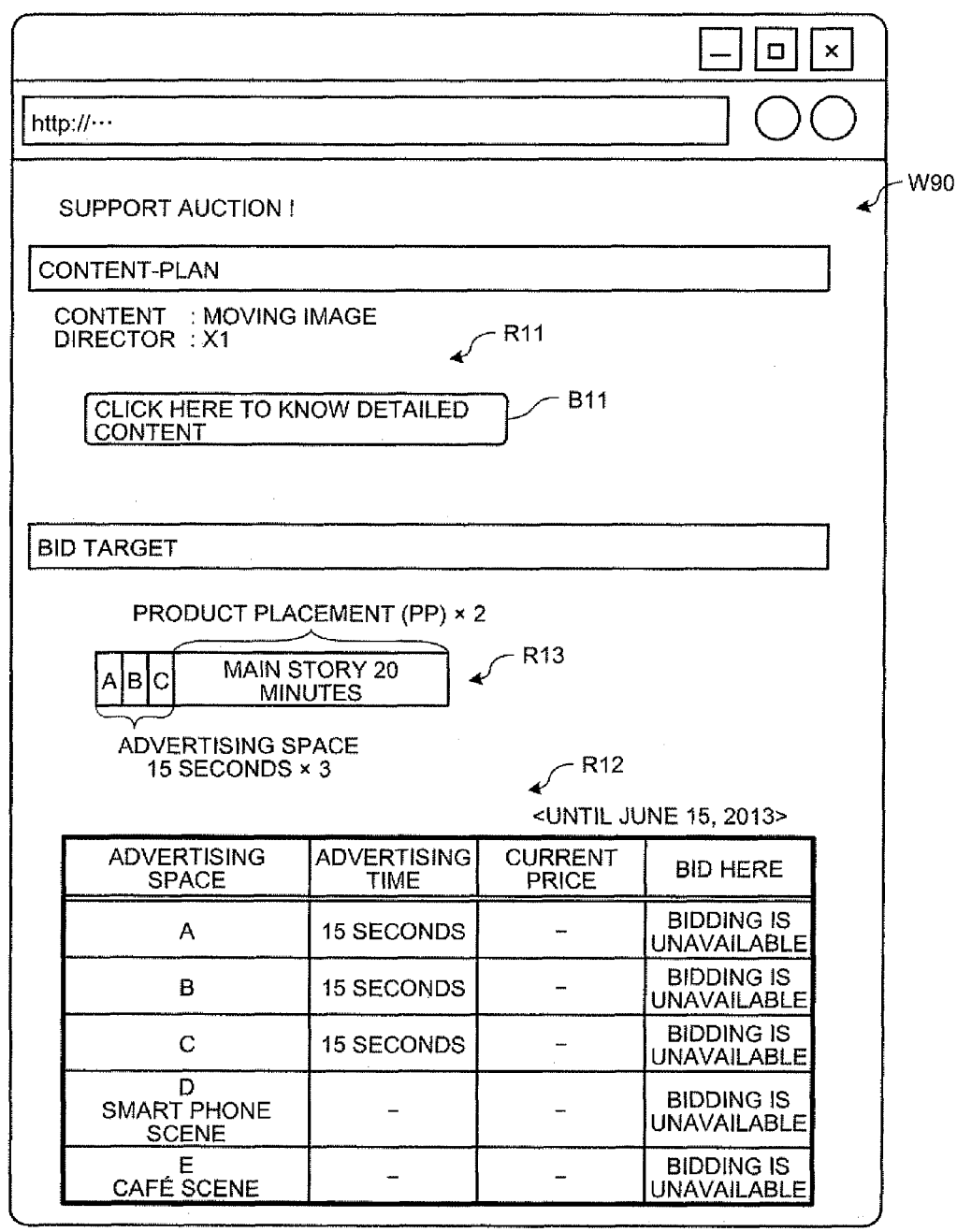
FIG. 27 is a diagram illustrating an example of an auction page generated by an auction providing unit according to the fourth embodiment.
Figure 28:
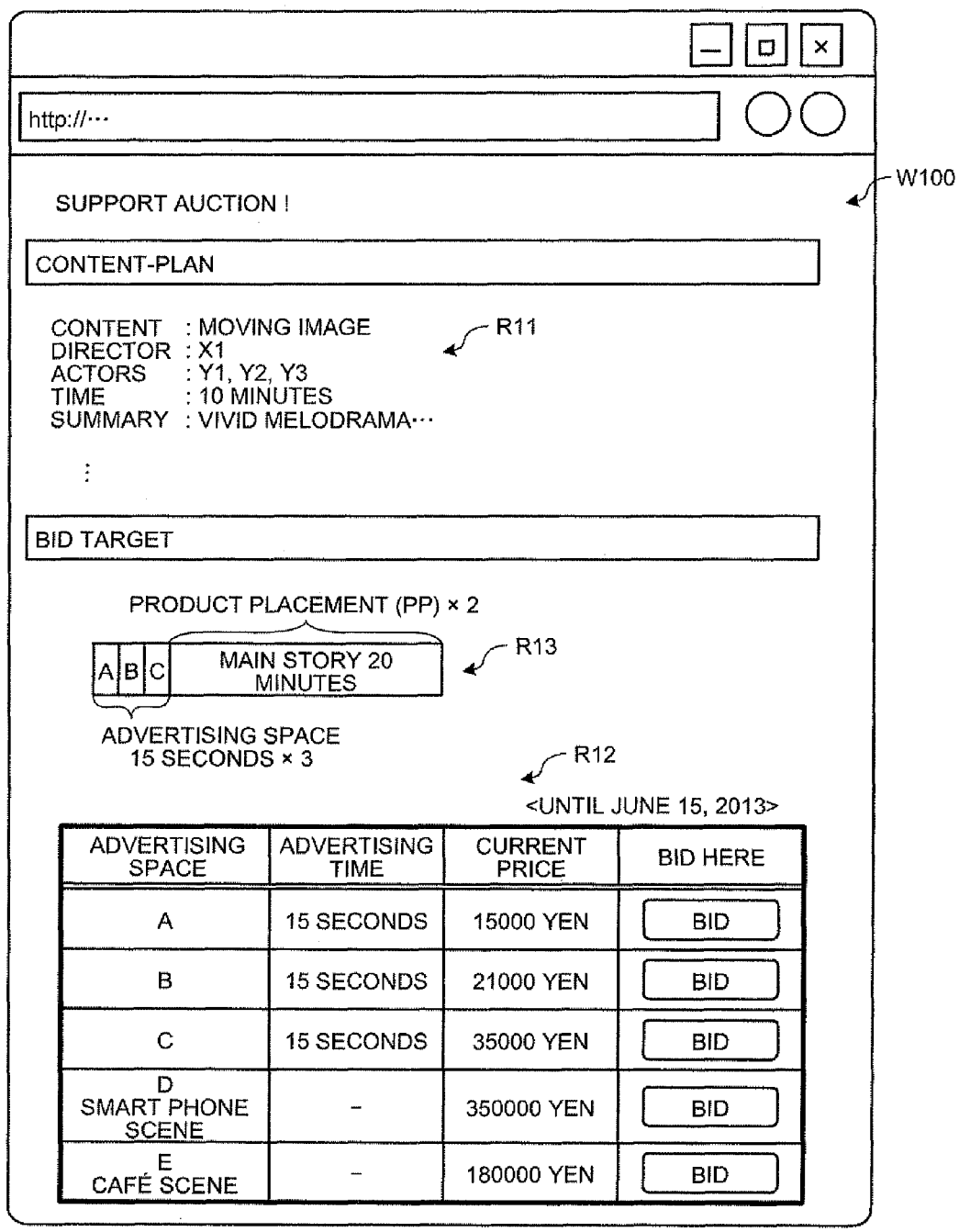
FIG. 28 is a diagram illustrating an example of the auction page generated by the auction providing unit according to the fourth embodiment.

FIGS. 27 and 28 illustrate examples of the auction page generated by the auction providing unit 532 according to the fourth embodiment. FIGS. 27 and 28 illustrate an example of an auction page corresponding to the plan ID "P11" illustrated in FIG. 25. FIG. 27 illustrates an example of an auction page W90 in which bidding is unavailable. FIG. 28 illustrates an example of an auction page W100 in which bidding is available.

As in the example illustrated in FIG. 27, when the auction page acquisition request is received from the advertiser who agrees with the policy of prohibiting the illegal use of the content, the auction providing unit 532 inserts plan information corresponding to the open item in the content-plan which is stored in the auction storage unit 521 into a plan display field R11 of an auction page W90. In addition, the auction providing unit 532 inserts a detail acquisition button B11 for acquiring the content-plan into the plan display field R11. The auction providing unit 532 inserts the advertising space information stored in the auction storage unit 521 into a bid display field R12 of the auction page W90 such that bidding is not available. In the example illustrated in FIG. 27, the auction providing unit 532 inserts information about the position of the advertising space or the time of the advertising space in the moving image, but does not insert the current bid price.

In the example illustrated in FIG. 27, when the detail acquisition button B11 is pressed, the auction providing unit 532 provides the advertiser terminal 20 a policy page for selecting whether to agree with the policy of prohibiting the illegal use of the content-plan. When an operation of agreeing with the policy is performed on the policy page, the auction providing unit 532 stores the advertiser ID of the advertiser who has performed the operation in the advertiser information storage unit 522. On the other hand, when an operation which does not agree with the policy is performed on the policy page, the auction providing unit 532 does not store the advertiser ID of the advertiser who has performed the operation in the advertiser information storage unit 522.

As in the example illustrated in FIG. 28, when the auction page acquisition request is received from the advertiser who agrees with the policy of prohibiting the illegal use of the content, the auction providing unit 532 inserts all of the content-plan which is stored in the auction storage unit 521 into the plan display field R11 of the auction page W100. In addition, the auction providing unit 532 inserts the advertising space information stored in the auction storage unit 521 into the bid display field R12 of the auction page W100 such that bidding is available.

3. Procedure of Auction Process

Figure 29:
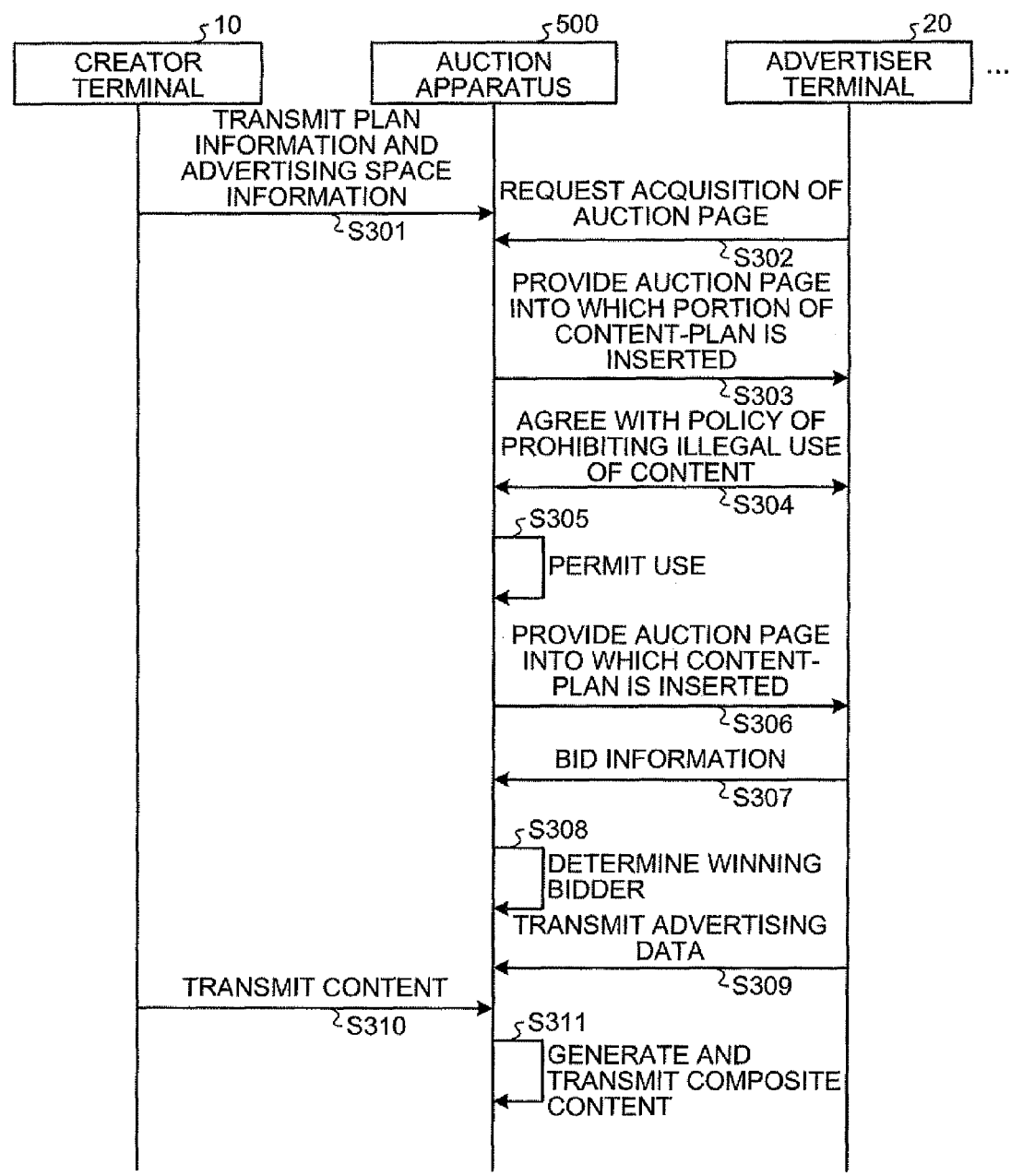
FIG. 29 is a sequence diagram illustrating the procedure of an auction process performed by an auction system according to the fourth embodiment.

Next, the procedure of the auction process performed by the auction system 1 according to the fourth embodiment will be described with reference to FIG. 29. FIG. 29 is a sequence diagram illustrating the procedure of the process performed by the auction system 1 according to the fourth embodiment. FIG. 29 illustrates only one advertiser terminal 20. However, in practice, there are a plurality of advertiser terminals 20.

As illustrated in FIG. 29, the content creator transmits the plan information and the advertising space information to the auction apparatus 500 using the creator terminal 10 (Step S301). In this case, the auction apparatus 500 stores the plan information and the advertising space information in the auction storage unit 521.

Then, when an auction page acquisition request is received from the advertiser terminal 20 (Step S302), the auction apparatus 500 provides the auction page into which some of the content-plan are inserted to the advertiser terminal 20 (Step S303). Then, the auction apparatus 500 inquires the advertiser whether to agree with the policy of prohibiting the illegal use of content (Step S304). Here, it is assumed that the advertiser agrees with the policy of prohibiting the illegal use of content. In this case, the auction apparatus 500 stores the advertiser ID of the advertiser in the advertiser information storage unit 522 to permit the advertiser to bid in the auction (Step S305).

Then, when the advertiser who has agreed with the policy of prohibiting the illegal use of content accesses the auction apparatus 500, the auction apparatus 500 provides the auction page into which all of the content-plan are inserted to the advertiser terminal 20 (Step S306). Then, the auction apparatus 500 receives the bid information including the bid price from the advertiser terminal 20 through the auction page (Step S307). In this way, the auction apparatus 500 receives the bid information from a plurality of advertiser terminals 20.

Then, the auction apparatus 500 determines the winning bidder on the basis of the bid information received from the advertiser terminals 20 (Step S308). Then, the auction apparatus 500 manages the winning bid amount received from the winning bidder. Then, when the content creator charges for the cost of production, the auction apparatus 500 subtracts the cost from the winning bid amount and sends the cost to the content creator.

The winning bidder transmits advertising data to the auction apparatus 500 using the advertiser terminal 20 (Step S309). When the content has been created, the content creator transmits the content to the auction apparatus 500 using the creator terminal 10 (Step S310).

The auction apparatus 500 incorporates the advertising data received from the advertiser into the content received from the content creator to generate composite content and transmits the generated composite content to the distribution server 30 (Step S311).

4. Modifications

The fourth embodiment is not limited to the above-mentioned structure, but various other structures can be configured. Next, the modifications of the fourth embodiment will be described.

4-1. Selection by Content Creator

In the fourth embodiment, the advertiser can bid in the auction at the time when the advertiser agrees with the policy of prohibiting the illegal use of content. However, the auction apparatus 500 may inquire the content creator whether bidding is available.

Figure 30:
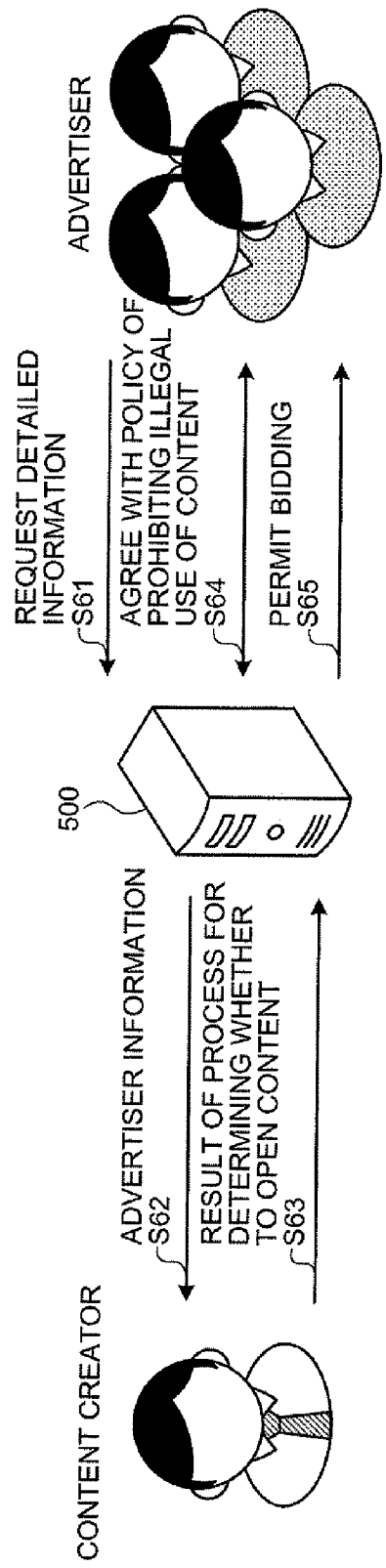
FIG. 30 is a diagram illustrating an example of an auction process according to a modification of the fourth embodiment.

This will be described with reference to FIG. 30. FIG. 30 is a diagram illustrating an example of an auction process according to a modification of the fourth embodiment. As illustrated in FIG. 30, when the advertiser requests the detailed information of the content-plan (Step S61), the auction apparatus 500 transmits advertiser information about the advertiser to the content creator (Step S62). For example, when the advertiser is a company, the auction apparatus 500 transmits, for example, the name of the company or the type of business thereof as the advertiser information. Then, the auction apparatus 500 inquires the content creator whether to open all of the content-plan to the advertiser.

Then, the content creator determines whether to open all of the content-plan to the advertiser on the basis of the advertiser information and transmits the determination result to the auction apparatus 500 (Step S63). When the content creator determines to open all of the content-plan to the advertiser, the auction apparatus 500 transmits the policy page to the advertiser. When the advertiser agrees with the policy of prohibiting the illegal use of the content-plan (Step S64), the auction apparatus 500 permits the advertiser to bid in the auction (Step S65). On the other hand, when the content creator does not permit to open all of the content-plan to the advertiser, the auction apparatus 500 does not transmit the policy page to the advertiser and does not permit the advertiser to bid in the auction.

As such, since the auction apparatus 500 opens the entire content-plan only to the advertiser which is permitted by the content creator. Therefore, it is possible to reduce the possibility of the content-plan being illegally used. In addition, the content creator can allow only the desired advertiser to participate in the auction. Therefore, it is possible to incorporate advertisements corresponding to the content-plan which is planned to be created into the content. For example, when moving image content related to a car is created, the content creator allows only the advertiser related to a car business to participate in the auction. Therefore, it is possible to incorporate advertisements corresponding to moving image content into the content and thus give unity to the moving image content.

In Step S63 of FIG. 30, the auction apparatus 500 may inquire the content creator of the items of the content-plan to be opened to the advertiser. That is, the auction apparatus 500 may select the disclosure level of the content-plan for each advertiser. Therefore, the auction apparatus 500 can provide the auction service which can select the disclosure level of the content-plan.

4-2. Intermediation Between Content Creator and Advertiser

In the fourth embodiment, the auction apparatus 500 may be configured such that the advertiser designate the desired genre of content and the content creator selects the advertiser who can participate in the auction on the basis of the desired genre.

Figure 31:
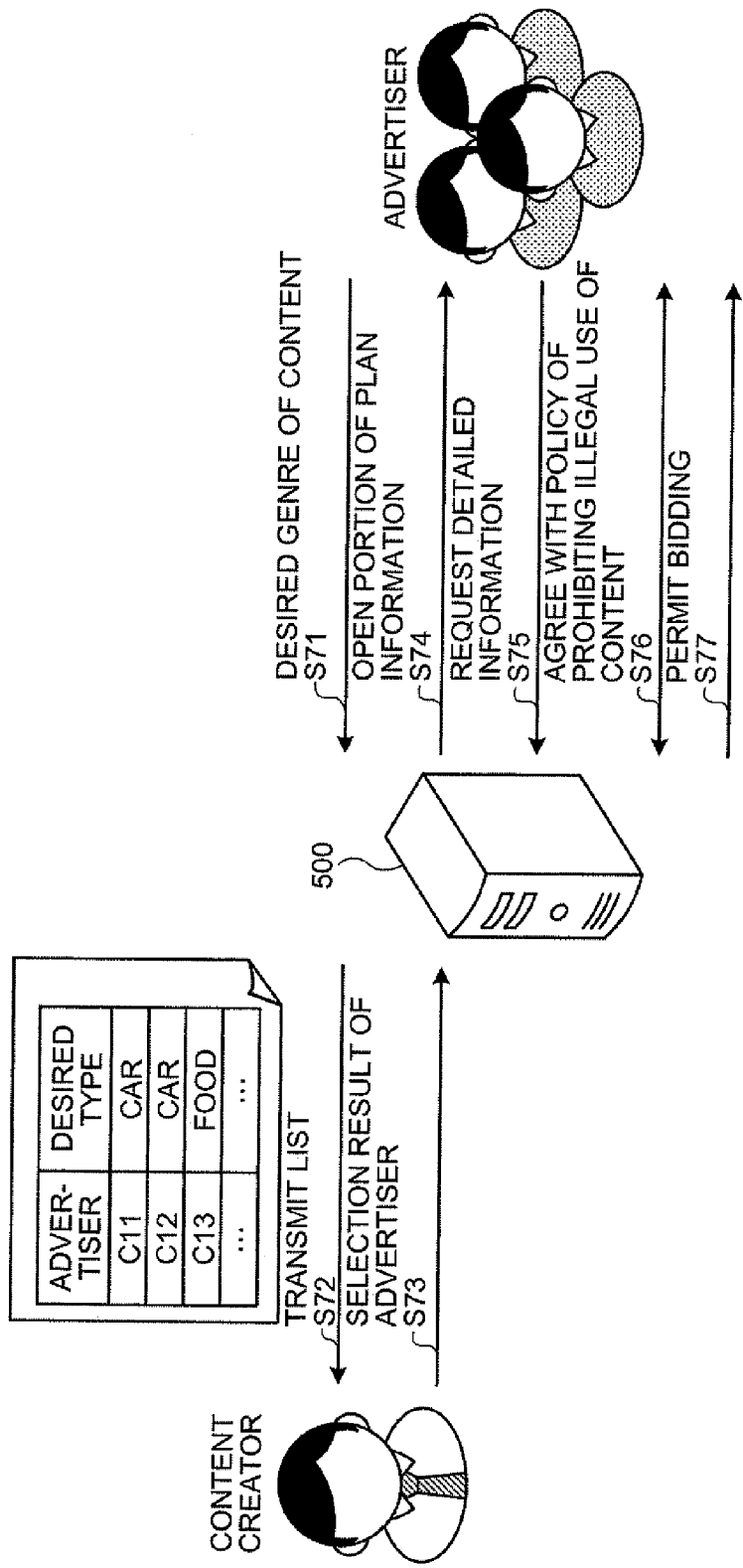
FIG. 31 is a diagram illustrating an example of an auction process according to a modification of the fourth embodiment.

This will be described with reference to FIG. 31. FIG. 31 is a diagram illustrating an example of an auction process according to a modification of the fourth embodiment. As illustrated in FIG. 31, the auction apparatus 500 receives the genre of the content in which the advertiser wants to display advertisements from the advertiser (Step S71). In this example, the auction apparatus 500 receives the desired genre from a plurality of advertisers in advance. Then, for example, when the content creator accesses the auction apparatus 500, the auction apparatus 500 transmits a list of the correspondence between the advertisers and the desired genre to the content creator (Step S72).

Then, the content creator selects one or more advertisers who can participate in the auction on the basis of the list of the correspondence and transmits the selection result to the auction apparatus 500 (Step S73). For example, the content creator selects the advertiser whose desired genre corresponds to the content-plan which is planned to be created. Then, when the advertiser selected by the content creator accesses the auction apparatus 500, the auction apparatus 500 provides the auction page W90 illustrated in FIG. 27 and opens a portion of the plan information to the advertiser (Step S74). The subsequent Steps S75 to S77 are the same as Steps S52 to S54 illustrated in FIG. 23.

When the advertiser which is not selected by the content creator accesses the auction apparatus 500, the auction apparatus 500 does not open the plan information and notifies the advertiser that the advertiser cannot participate in the auction.

As such, the auction apparatus 500 intermediates between the content creator and the advertisers and connects the content creator and the advertiser who agree with their request. Therefore, the auction apparatus 500 can improve the degree of satisfaction of both the content creator and the advertiser. In Step S72, the auction apparatus 500 may transmit a list of the advertisers corresponding to the genre of the content which is planned to be created by the content creator. In this case, the auction apparatus 500 can connect the content creator and the advertiser who agree with their request.

4-3. Subject Determining Items to be Opened

In the fourth embodiment, the plan information in which the items to be opened are set is received from the content creator. That is, in the fourth embodiment, the content creator sets the items to be opened. However, the invention is not limited thereto, but the auction apparatus 500 may determine the items to be opened. For example, the plan receiving unit 131 provides the content creator the input site for inputting the plan information or the advertising space information, as described above. In this case, the plan receiving unit 131 allows the content creator to input various kinds of information for each item related to content, such as the type of content, a director, and actors. Then, the auction providing unit 532 may use a predetermined item (for example, the type or content and a director) among various kinds of information input to the input site as the item to be opened. In this case, the plan receiving unit 131 may insert the items to be opened into the input site.

4-4. Items to be Opened

In the fourth embodiment, a portion of the content-plan is not opened to the advertiser who does not agree with the policy. However, the auction providing unit 532 may not open information about the advertising space to the advertiser who does not agree with the policy. In this case, the auction providing unit 532 may not all information (for example, the number of advertising spaces and the reproduction position) about the advertising space or it may not open a portion of information (for example, the reproduction position of the advertising space) about the advertising space. The item to be opened in the information about the advertising space may be determined by the content creator or the auction apparatus 500.

In the fourth embodiment, the auction providing unit 532 may display closed information so as to be obscured by a mosaic. In this case, the auction providing unit 532 may constantly open an item name in the content-plan to the public. For example, in the example illustrated in FIG. 28, the auction providing unit 532 may display the item names, such as "content", a "director", "actors", a "time", and a "summary", in the content-plan on the auction page and display, for example, information "moving image" corresponding to the content, information "X1" corresponding to the director, or information "Y1, Y2, and Y3" corresponding to the actors so as to be obscured by a mosaic.

4-5. Gradual

In the fourth embodiment, the plan receiving unit 131 may gradually receive the plan information. For example, the plan receiving unit 131 may receive a first plan information item which can be opened to the advertisers without any conditions and then receive a second plan information item which can be opened only to the advertiser who has agreed with the policy. Then, the auction providing unit 532 opens the first plan information item to all of the advertisers and opens the second plan information item only to the advertiser who has agreed with the policy. Therefore, the content creator can transmit a brief version of the content-plan as the first plan information items to the auction apparatus 500 and then transmit a detailed version of the content-plan as the second plan information item to the auction apparatus 500. Therefore, the auction apparatus 500 can implement a practical auction for the content creator who plans to create content.

4-6. Notification of Holding of Auction

In the fourth embodiment, the date when each auction is held may not be set. That is, the content creator may set information, such as "not set", to the auction period of the advertising space information. In this case, after the advertising space information in which "not set" is set to the auction period is received, the plan receiving unit 131 receives the advertising space information in which the detailed range of the date and time is set to the auction period at an arbitrary time. That is, the content creator may not set the auction period and may then set the detailed range of the date and time to the auction period. In this case, when the auction period is set, the auction providing unit 532 may notify the advertiser who has agreed with the policy (that is, the advertiser whose advertiser ID has been stored in the advertiser information storage unit 522) that the auction has been held.

4-7. Determination of Reliability

In the fourth embodiment, the auction apparatus 500 may store auction log information about the content creator or the advertiser who has used the auction service provided by the auction providing unit 532 in the past. For example, the auction apparatus 500 may store, as the auction log information, the creation result of content by the content creator, the money received by the advertiser, the evaluation of the content creator by the advertiser, or the evaluation of the advertiser by the content creator. The auction apparatus 500 may open the auction log information to the content creator or the advertiser. For example, the auction apparatus 500 may transmit the auction log information to the content creator, in addition to the list of the correspondence between the advertiser and the desired genre, in Step S72 of FIG. 31. Therefore, the content creator can select the advertiser with a good reputation on the basis of the auction log information. In addition, for example, the auction apparatus 500 may transmit the auction log information to the advertiser to designate a specific content creator. In this way, the auction apparatus 500 can connect the content creator and the advertiser who agree with their request.

4-8. Right to Bid

In the fourth embodiment, only the advertiser who has agreed with the policy of prohibiting the illegal use of content can bid in the auction. However, the auction apparatus 500 may allow the advertiser who does not agreed with the policy of prohibiting the illegal use of content to bid in the auction, with only a portion of the content-plan opened to the public. For example, when the advertiser who does not agreed with the policy of prohibiting the illegal use of content accesses the auction apparatus 500, the auction apparatus 500 may provide an auction page into which only a portion of the content of an advertisement is inserted and in which bidding is available. The auction apparatus 500 makes it easy for a large number of advertisers to participate in the auction and can increase the number of bidders.

4-9. Policy

In the fourth embodiment, the policy of prohibiting the illegal use of the content-plan is given as an example. However, the policy is not limited thereto. For example, the auction apparatus 500 may open all of the content-plan to the advertiser who has agreed with the policy of prohibiting the leakage of the content-plan, in addition to the policy of prohibiting the illegal use of the content-plan.

5. Effect

As described above, the auction apparatus 500 according to the fourth embodiment includes the plan receiving unit 131 and the auction providing unit 532. The plan receiving unit 131 receives the plan information indicating the content-plan from the content creator who creates the content. The auction providing unit 532 opens a portion of the plan information received by the plan receiving unit 131 and opens the other plan information in response to a request from the advertiser who has browsed a portion of the plan information. Then, the auction providing unit 532 provides the auction service in which the bid target is the right to display advertisements in the advertising space set to the content.

Therefore, even when the auction service for the content which is planned to be created is provided, the auction apparatus 500 according to the fourth embodiment can prevent the content-plan from being illegally used.

Other Embodiments

Various structures other than the structures according to the above-described embodiments may be configured. Hereinafter, other embodiments will be described. Next, other embodiments will be described using the auction apparatus 100 as an example, but the following other embodiments may be applied to the auction apparatuses 200, 300, 400, and 500.

1. Confirmation of Composite Content

In the above-described embodiments, when the composite content is generated, the auction apparatus 100 may make the content creator or the advertiser confirm the content of the composite content item.

Figure 32:
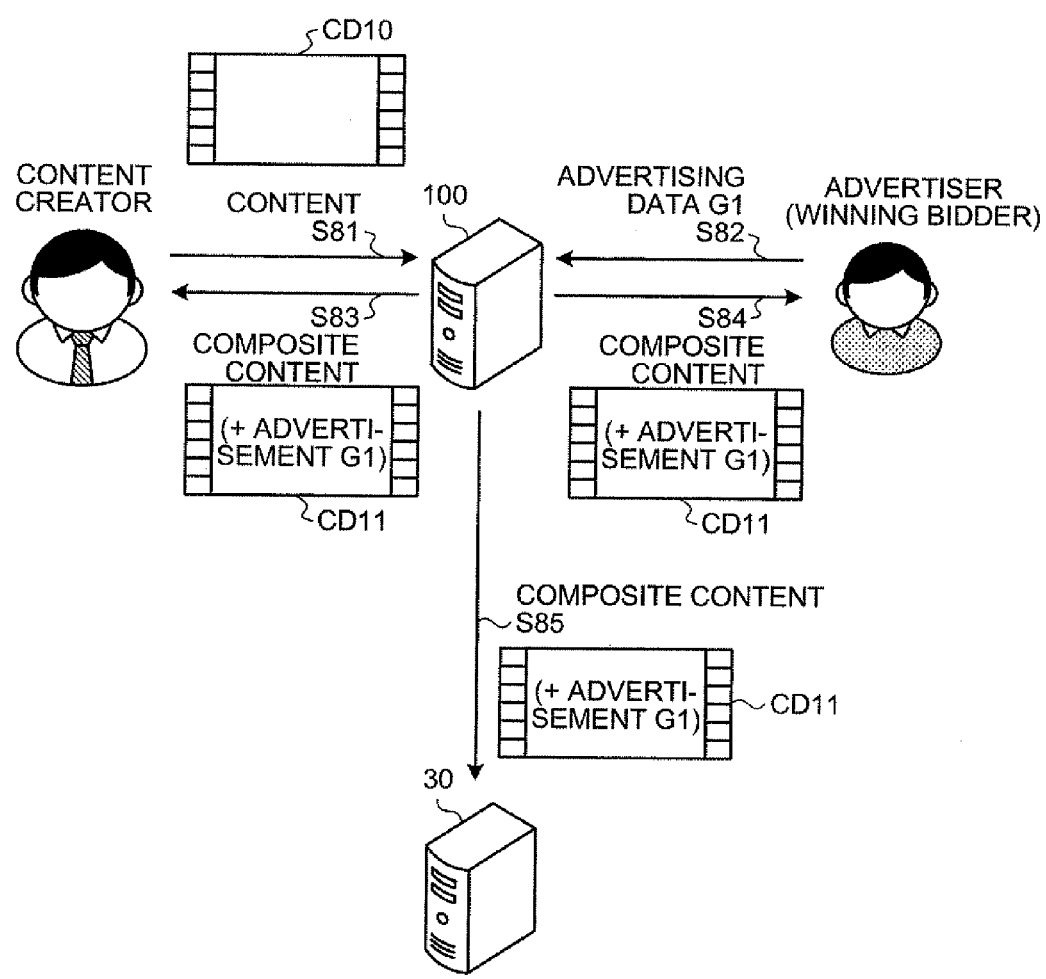
FIG. 32 is a diagram illustrating an example of an auction process according to another embodiment.

This will be described with reference to FIG. 32. FIG. 32 is a diagram illustrating an example of an auction process according to another embodiment. In the example illustrated in FIG. 32, the auction apparatus 100 receives content CD10 from the content creator (Step S81) and receives advertising data G1 from the advertiser (Step S82). Then, the auction apparatus 100 incorporates the advertising data G1 into the content CD10 to generate composite content CD11.

The transmitting unit 136 of the auction apparatus 100 transmits the composite content CD11 to the content creator and the advertiser before transmitting the composite content CD11 to the distribution server 30 (Steps S83 and S84). In this way, the transmitting unit 136 inquires the content creator and the advertiser whether there is a problem on the composite content CD11. Then, when a response indicating that there is no problem in the composite content CD11 is received from the content creator and the advertiser, the transmitting unit 136 transmits the composite content CD11 to the distribution server 30 (Step S85).

As such, the auction apparatus 100 makes the content creator and the winning bidder confirm the composite content, which makes it possible to prevent the unintended composite content of the content creator and the winning bidder from being distributed to the user terminal 40. Specifically, since advertising data is incorporated into the composite content generated by the auction apparatus 100, the composite content is not identical to the content created by the content creator. Therefore, for example, advertising data which damages the image of the content is likely to be incorporated into the composite content. In addition, since the advertiser participates in the auction in the planning stage, the advertiser buys the right to display advertisements at an auction, without checking the content created by the content creator. Therefore, advertising data is likely to be incorporated into the content which damages the image of the advertiser. In the example illustrated in FIG. 32, the auction apparatus 100 makes the content creator and the winning bidder confirm the composite content. Therefore, it is possible to prevent the distribution of the composite content which damages the image of the content creator or the winning bidder.

In the example illustrated in FIG. 32, the auction apparatus 100 may transmit the composite content only to one of the content creator and the winning bidder. When the example illustrated in FIG. 32 is applied to the fourth embodiment, the generating unit 435 generates new composite content whenever new advertising data is received from the advertiser. Therefore, the transmitting unit 136 transmits the generated new composite content to the content creator and the advertiser whenever the generating unit 435 generates new composite content.

In the example illustrated in FIG. 32, the auction apparatus 100 may provide an editing site capable of incorporating advertising data into content to the content creator and the winning bidder. In addition, the editing site may generate composite content in response to the operation of the content creator or the winning bidder, and reproduce and edit the generated composite content. The editing site may display the content-plan stored in the auction storage unit 121. In this case, the advertiser can actually incorporate his or her advertising data into the content created by the content creator and check the entire impression of the composite content or the impression of the advertising data. Then, the advertiser can confirm the composite content and re-create advertising data corresponding to the content of a content item. As such, when the auction apparatus 100 provides the editing site, it is possible to improve the advertising effect of advertising data or the quality of composite content.

In the above-described embodiments, the plan receiving unit 131 may receive the plan information from the content creator a plurality of times. For example, when the actor of the moving image is changed due to a sudden illness, the plan receiving unit 131 may receive new plan information including information indicating that the actor has been changed. In this case, when the content-plan which is opened to the public is changed by the second or subsequent plan information received by the plan receiving unit 131, the auction providing unit 132 inquires the bidders or the winning bidder in the auction whether to invalidate the auction. When an instruction to invalidate the auction is received as a response from the bidder (for example, the highest bidder) or the winning bidder, the auction providing unit 132 invalidates the auction and holds an auction for the content of a new plan again. In this case, the auction providing unit 132 may invalidate all auctions related to the content or it may invalidate only the auction which is required to be invalidated by the bidder or the winning bidder.

2. Distribution of Use Fee

In the above-described embodiments, when the composite content is distributed as charged content to the user terminal 40, the use fee from the user of the user terminal 40 may be distributed to the content creator. That is, profits from the distribution of content by the distributor of the composite content may be shared by the content creator.

Figure 33:
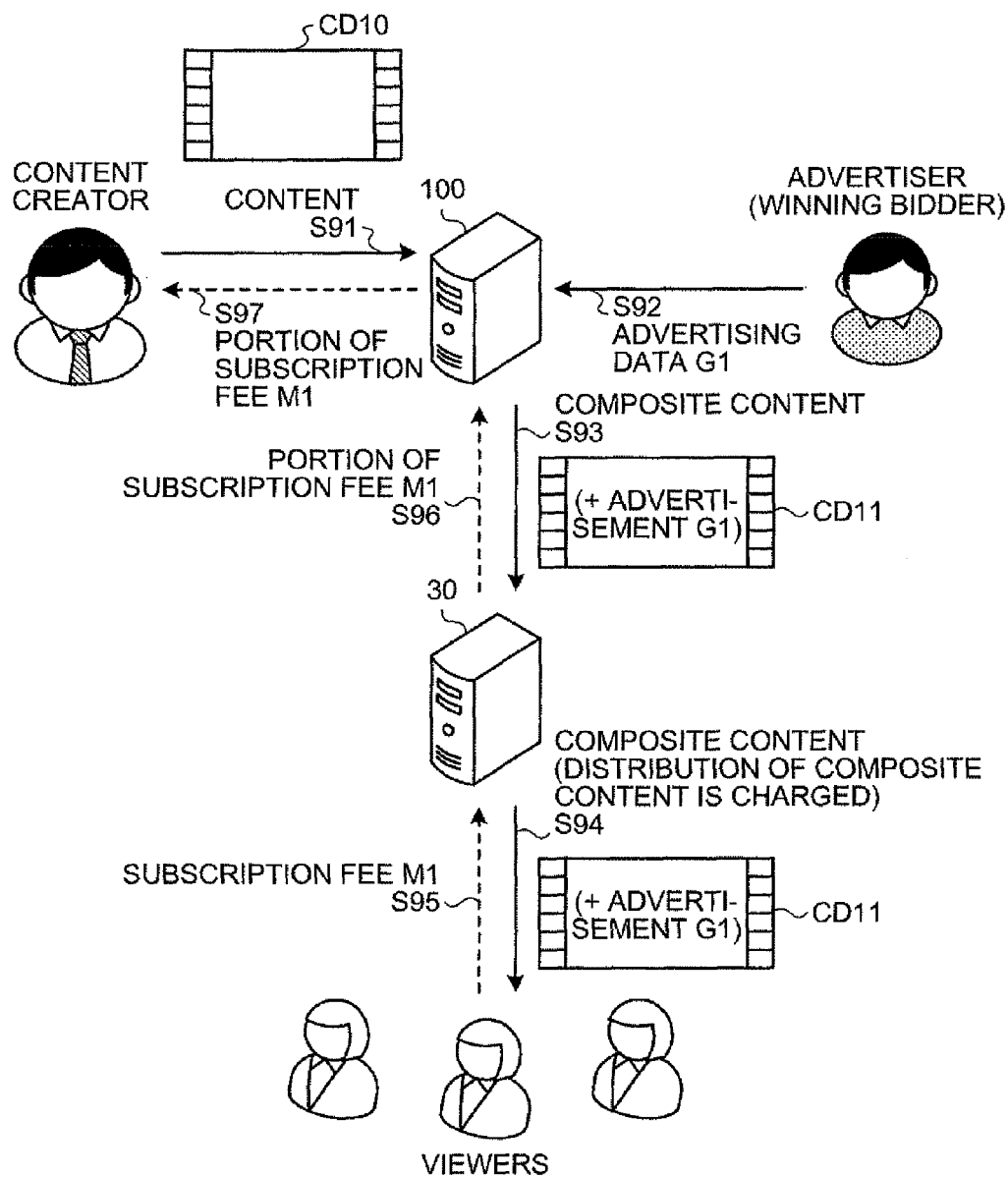
FIG. 33 is a diagram illustrating an example of an auction process according to another embodiment.

This will be described with reference to FIG. 33. FIG. 33 is a diagram illustrating an example of an auction process according to another embodiment. In the example illustrated in FIG. 33, the auction apparatus 100 receives content CD10 from the content creator (Step S91) and receives advertising data G1 from the advertiser (Step S92). Then, the auction apparatus 100 incorporates the advertising data G1 into the content CD10 to generate composite content CD11 and transmits the generated composite content CD11 to the distribution server 30 (Step S93).

The distribution server 30 distributes the composite content CD11 as charged content to the viewer (Step S94). Then, the distribution server 30 (or the operator of the distribution server 30) obtains a subscription fee M1 from the viewer whenever the composite content CD11 is distributed (Step S95). In this case, the distribution server 30 transmits a portion of the subscription fee M1 to the auction apparatus 100 (Step S96). Then, the winning bid amount management unit 133 of the auction apparatus 100 sends a portion of the subscription fee M1 obtained from the distribution server 30 to the content creator (Step S97).

As such, the auction apparatus 100 sends a portion of the profits made from the distribution of the composite content as charged content. Therefore, it is possible to improve the creative will of the content creator. Specifically, as the popularity of the content created by the content creator increases, profits from the viewer increase and the fee distributed to the content creator increases. As a result, it is possible to improve the creative will of the content creator.

In the example illustrated in FIG. 33, the auction apparatus 100 may distribute a portion of the profits to the content creator only when the fee for the use of the composite content increases.

3. Distribution of Advertisement Rates

In the above-described embodiments, when a web page including composite content and advertisements is distributed to the user terminal 40, the advertisement rates obtained from the distribution of the advertisements may be distributed to the content creator. That is, advertising revenues from the distribution of the web page by the distributor of the composite content may be shared by the content creator.

Figure 34:
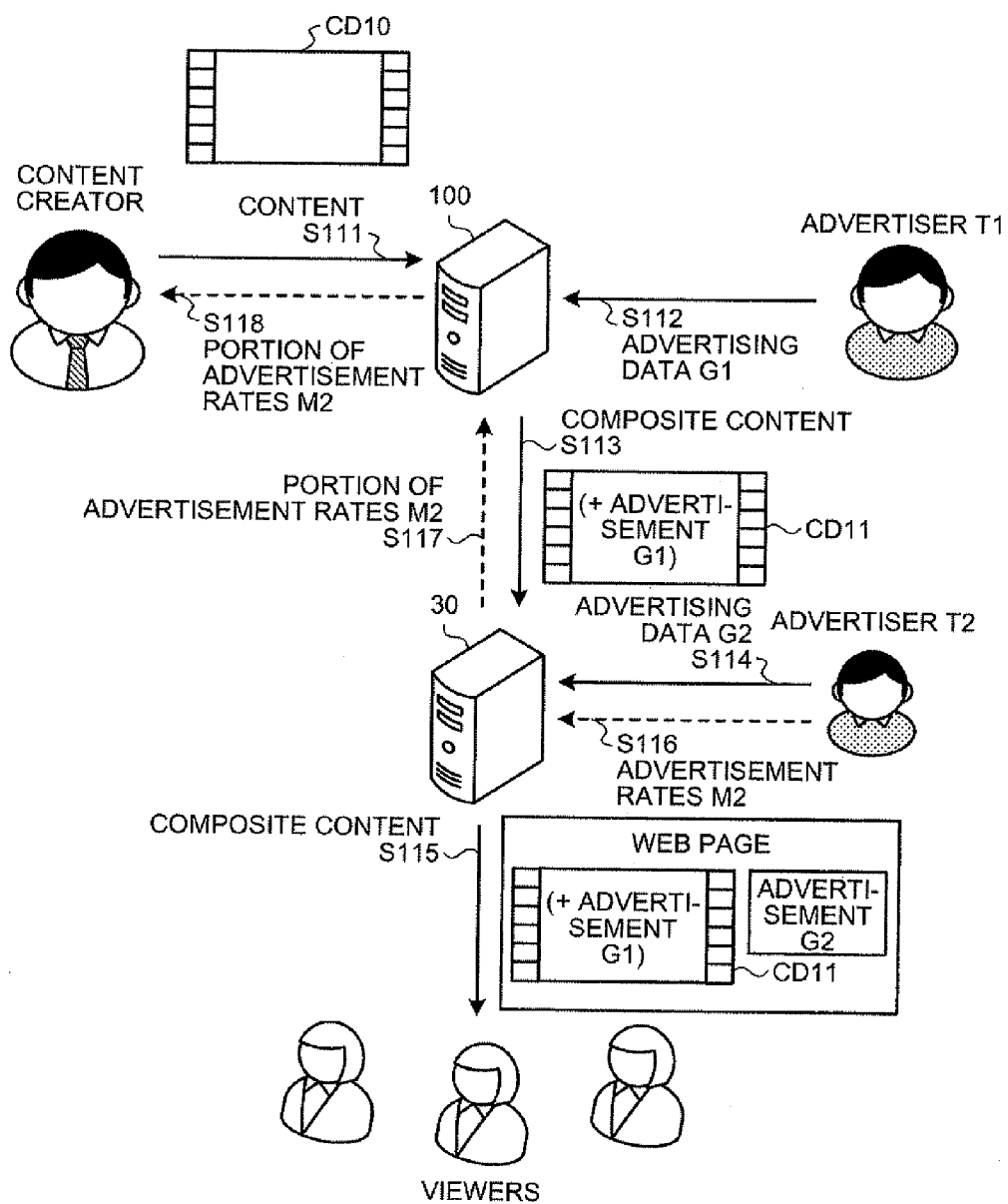
FIG. 34 is a diagram illustrating an example of an auction process according to another embodiment.

This will be described with reference to FIG. 34. FIG. 34 is a diagram illustrating an example of an auction process according to another embodiment. In the example illustrated in FIG. 34, it is assumed that an advertiser T1 has successfully bid for the right to display advertisements. The auction apparatus 100 receives content CD10 from the content creator (Step S111) and receives advertising data G1 from the advertiser T1 (Step S112). Then, the auction apparatus 100 transmits composite content CD11 to the distribution server 30 (Step S113).

The distribution server 30 receives advertising data G2 from an advertiser T2 (Step S114) and distributes a web page including the composite content CD11 and the advertising data G2 to the viewer (Step S115). Then, the distribution server 30 (or, for example, the operator of the distribution server 30) obtains advertisement rates M2 as a charge for the distribution of the advertising data G2 or a charge corresponding to the clicking of the advertising data G2 by the viewer from the advertiser T2 (Step S116). In this case, the distribution server 30 transmits a portion of the advertisement rates M2 to the auction apparatus 100 (Step S117).

Then, the winning bid amount management unit 133 of the auction apparatus 100 sends a portion of the advertisement rates M2 obtained from the distribution server 30 to the content creator (Step S118).

As such, the auction apparatus 100 distributes a portion of the advertising revenues earned by the distributor who distributes the composite content and advertisements to the content creator. Therefore, it is possible to improve the creative will of the content creator. Specifically, as the popularity of the content created by the content creator increases, the advertising revenues earned from the advertiser T2 increase and the profits distributed to the content creator increase. As a result, it is possible to improve the creative will of the content creator. In the example illustrated in FIG. 34, the auction apparatus 100 sends a portion of the advertisement rates M2 to the content creator. However, the distribution server 30 may send a portion of the advertisement rates M2 to the content creator.

4. Right to Participate in Creation of Content

In the above-described embodiments, the auction providing unit 132 may provide the auction service in which the bid target is the right to display advertisements in the advertising space and the right to participate in the creation of content. Specifically, in general, the advertiser wants to incorporate advertising data into the content which is popular with the viewers or the content corresponding to his or her own image. Therefore, in some cases, when the advertiser has successfully bid the right to display advertisements, the advertiser wants to exchange opinions on the creation of content with the content creator. The auction providing unit 132 provides the auction service in which the bid target is the right to participate in the creation of content. Therefore, the advertiser who has successfully bid the right to participate in the creation of content can exchange opinions with the content creator such that content corresponding to his or her own image is generated. In addition, the content creator can reflect the opinions of the advertiser to the content to improve the value of the content. When the right to participate in the creation of content is sold at an auction, the bid price is expected to rise significantly. Therefore, the auction apparatus 100 can improve the possibility of the content creator raising desired funds.

The auction providing unit 132 may provide a platform for exchanging opinions between the content creator and the winning bidder. For example, the auction providing unit 132 may provide a telephone communication platform or a telephone conference platform through a dedicated line. In addition, the auction providing unit 132 may record the sound or image of conversational content and provide the recorded content to a dedicated site where the viewer can view the content. An evidence for confirming whether the content creator creates content according to the content-plan or an evidence for checking whether the advertiser makes an unreasonable demand for the content creator remains. That is, the auction apparatus 100 can provide the safe auction service to both the content creator and the advertiser. As a result, it is possible to improve the use of the auction service.

The content creator may arbitrarily select whether to set the right to participate in the creation of content to a bid target. In addition, the auction providing unit 132 may set the buyout price or the reserve price in the auction in which both the right to display advertisements in the advertising space and the right to participate in the creation of content are bid targets to be higher than that in the auction in which only the right to participate in the creation of content is a bid target.

5. Number of Input Advertising Data Items

In the above-described embodiments, the advertiser may transmit a plurality of advertising data items to the auction apparatus 100. In this case, the generating unit 135 of the auction apparatus 100 generates a plurality of composite content patterns corresponding to the number of advertising data items transmitted from the advertiser. For example, when the advertiser transmits advertising data items G11 and G12, the generating unit 135 generates composite content into which the advertising data G11 is incorporated and composite content into which the advertising data G12 is incorporated. Then, the transmitting unit 136 transmits the plurality of composite content patterns generated by the generating unit 135 to the distribution server 30. In this case, the distribution server 30 appropriately changes the composite content to be distributed among the plurality of composite content items. For example, the distribution server 30 distributes different composite content items to the user terminal 40 whenever the composite content is distributed a predetermined number of times.

In the above-mentioned example, the advertiser may transmit keywords for each advertising data to the auction apparatus 100. When a plurality of composite content patterns are generated, the generating unit 135 gives the keywords corresponding to the advertising data incorporated into the composite content to the corresponding composite content. In this case, the distribution server 30 can perform targeting distribution for the composite content using the keywords given to the composite content. For example, the distribution server 30 distributes the composite content to which keywords corresponding to the user attributes of the user, who is a distribution destination, are given. Therefore, the auction apparatus 100 can improve the advertising effect of the advertising data incorporated into the composite content.

6. Bid Aspects

In the above-described embodiments, the auction apparatus 100 may bid for the genre of content. Specifically, as in the example illustrated in FIG. 5, the auction providing unit 132 may bid for content genre "melodrama", "school drama", "sports", and "documentary", in addition to the advertising space. When the winning bidder for the genre of content is determined, the generating unit 135 incorporates the advertising data of the winning bidder into content corresponding to the genre to generate composite content.

7. Type of Content

In the above-described embodiments, the moving image is mainly given as an example of the content. However, the type of content is not limited to the moving image. Examples of the content may include applications, such as games, electronic books, and web pages, such as weblogs. For example, when the content creator plans to create games, electronic books, or professional web pages, the content creator can use the above-mentioned auction service.

Figure 35:
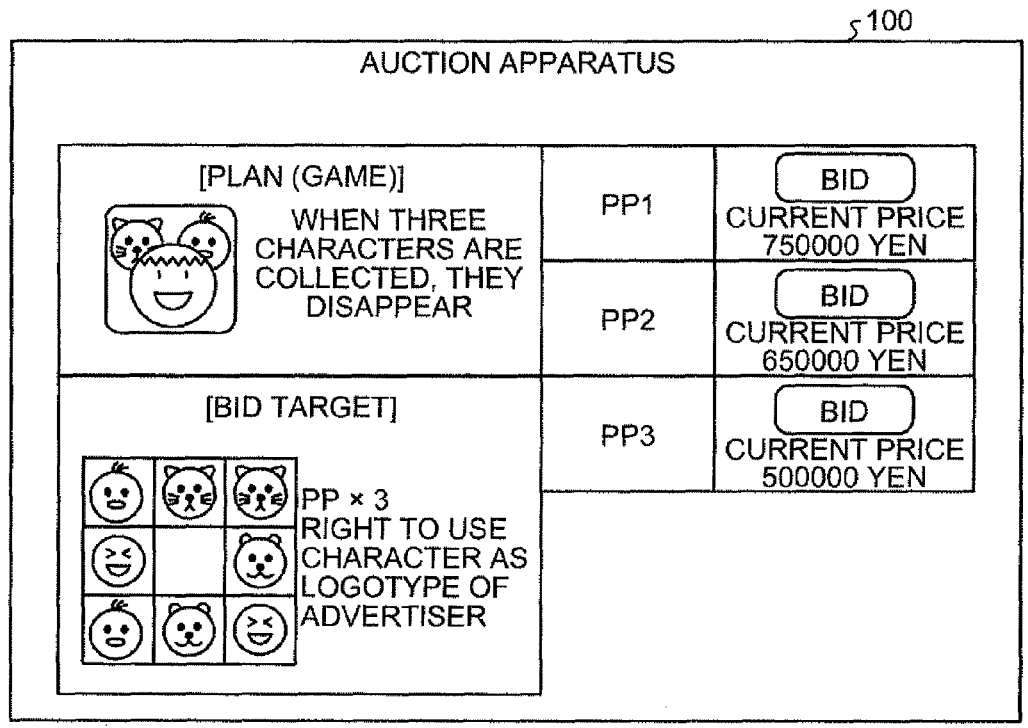
FIG. 35 is a diagram illustrating an example of content according to another embodiment.

FIG. 35 illustrates an example of content according to another embodiment. FIG. 35 illustrates an example in which content is a game. In the example illustrated in FIG. 35, the content creator plans to create a game using character icons. The content creator sets three icons among plural types of icons as advertising spaces. As such, the above-mentioned auction service can also be applied to content, such as a game.

8. Program

Figure 36:
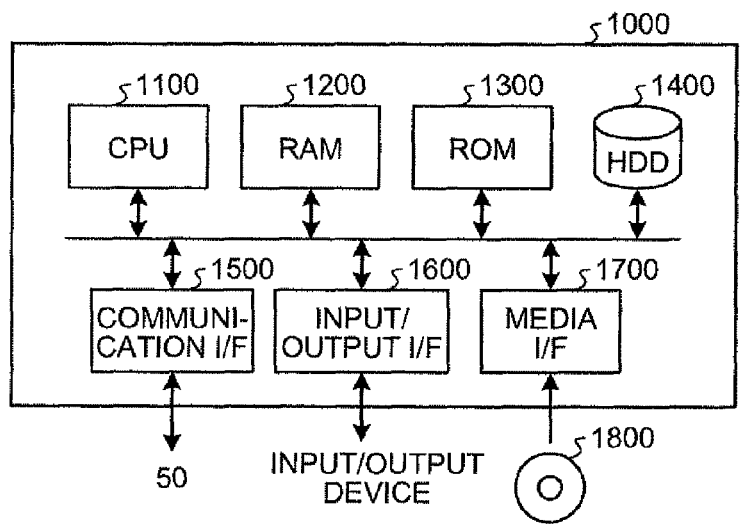
FIG. 36 is a diagram illustrating an example of the hardware configuration of a computer which implements the functions of the auction apparatus.

The auction apparatuses 100, 200, 300, 400, and 500 according to the above-described embodiments are implemented by, for example, a computer 1000 having the structure illustrated in FIG. 36. Next, the description will be made using the auction apparatus 100 as an example.

FIG. 36 is a diagram illustrating an example of the hardware configuration of the computer 1000 which implements the functions of the auction apparatus 100. The computer 1000 includes a CPU 1100, a RAM 1200, a ROM 1300, an HDD 1400, a communication interface (I/F) 1500, an input/output interface (I/F) 1600, and a media interface (I/F) 1700.

The CPU 1100 operates on the basis of the programs stored in the ROM 1300 or the HDD 1400 and controls each unit. The ROM 1300 stores, for example, a boot program which is executed by the CPU 1100 when the computer 1000 starts up or programs depending on the hardware of the computer 1000.

The HDD 1400 stores, for example, the programs executed by the CPU 1100 and data used by the programs. The communication interface 1500 receives data from other apparatus through a communication network 50 and transmits the data to the CPU 1100. Alternatively, the communication interface 1500 transmits data generated by the CPU 1100 to other apparatuses through the communication network 50.

The CPU 1100 controls an output device, such as a display or a printer, and an input device, such as a keyboard or a mouse, through the input/output interface 1600. The CPU 1100 acquires data from the input device through the input/output interface 1600. In addition, the CPU 1100 outputs the generated data to the output device through the input/output interface 1600.

The media interface 1700 reads a program or data stored in a recording medium 1800 and provides the read program or data to the CPU 1100 through the RAM 1200. The CPU 1100 loads the program from the recording medium 1800 to the RAM 1200 through the media interface 1700 and executes the loaded program. Examples of the recording medium 1800 include an optical recording medium, such as a digital versatile disc (DVD) or a phase change rewritable disk (PD), a magneto-optical recording medium, such as a magneto-optical disk (MO), a tape medium, a magnetic recording medium, and a semiconductor memory.

For example, when the computer 1000 functions as the auction apparatus 100 according to the first embodiment, the CPU 1100 of the computer 1000 executes the program loaded onto the RAM 1200 to implement the functions of the control unit 130. The HDD 1400 stores the data of the auction storage unit 121. The CPU 1100 of the computer 1000 reads the programs from the recording medium 1800 and executes the program. However, as another example, the CPU 1100 may acquire the programs from other apparatuses through the communication network 50.

9. Others

Among the processes according to the above-described embodiments, some or all of the processes which are automatically performed may be manually performed, or some or all of the processes which are manually performed may be automatically performed by a known method. In addition, information including the procedure, the detailed names, and various kinds of data or parameters described in the above-mentioned document or drawings can be arbitrarily changed except in a case in which it is specified.

For example, various kinds of information illustrated in the drawings are limited to the illustrated information. For example, in the above-described embodiments, a plurality of advertising spaces are set to one content item. However, one advertising space may be set to one content item.

In the above-described embodiments, the content creator sets the reproduction position or reproduction time of the advertising space in the content. However, for example, the auction apparatus 100 may receive only the plan information from the content creator and may not receive the advertising space information. In this case, the auction apparatus 100 may set, for example, a predetermined reproduction position or reproduction time of the advertising space in the content.

According to an embodiment of the invention, it is possible to implement a practical auction for the content creator who plans to create content.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An auction apparatus communicating with a content creator terminal, advertiser terminals, user terminals, and a distribution terminal through a communication network, the auction apparatus comprising:
   a memory storing plan information including advertisement space information available to be auctioned; and
   a processor operatively coupled with the memory, the processor being programmed to:
      receive a first plan information indicating a partial content plan from the content creator, and store the first plan information as the stored plan information;
      provide an auction service to the advertiser terminals through the communication network based on the first plan information in order to auction advertisement space, the auction service allowing the advertisers to bid on a right to display an advertisement in a plurality of advertisement spaces that are set in the content;
      gradually receive additional plan information, which is different from the first plan information, indicating additional portions of the content plan from the content creator;
      in response to receiving additional plan information, determine whether to perform another auction corresponding to at least one of the plurality of advertisement spaces that has not been auctioned based on the received additional plan information;
      distribute the received additional plan information to the advertiser terminals through the communication network;
      when the auction service ends, receive: (i) content corresponding to both the first plan information and the additional plan information from the content creator, and (ii) advertising data from a winning advertiser, that has won the right to display an advertisement in the auction service;
      generate composite content having meta data indicating contents of the received content by incorporating the received advertising data into the advertisement space that is set to the received content, the meta data corresponding to at least one of: a temporal position of the plurality of advertisements spaces, a reproduction time of the plurality of advertisements spaces, a display size of each of the plurality of advertisements spaces, and a location of the plurality of advertisements spaces within the composite content;
      analyze the mea data and extract keywords, the keywords each corresponding to items representing the contents of the received content;
      verify whether a number of items in which keywords are not identical to both the first plan information and the additional plan information is equal to or greater than a predetermined threshold value;
      when the number of items in which keywords are not identical to both the first plan information and the additional plan information is equal to or greater than the predetermined threshold value, determine that the composite content is not consistent with both the first plan information and the additional plan information; and
      when the number of items in which keywords are not identical to both the first plan information and the additional plan information is less than the predetermined threshold value, distribute the generated composite content to the distribution terminal for viewing on the user terminals, whereby the auction service is performed based on only the partial content plan from the content creator such that the content creator only creates and transmits the partial plan, and then creates and transmits the additional plan information after receiving the bid from the at least one advertiser.

2. The auction apparatus according to claim 1, wherein the processor is programmed to:
   receive advertising space information relating to the advertising space set to the content from the content creator; and
   provide the auction service based on the received advertising space information.

3. The auction apparatus according to claim 2, wherein the processor is programmed to provide the auction service based on the received advertising space information which is initially received, when the advertisement space information relating to the content is received a plurality of times.

4. The auction apparatus according to claim 2, wherein the processor is programmed to provide the auction service based on the received advertising space information until a first bid is made in the auction service.

5. The auction apparatus according to claim 2, wherein the processor is programmed to receive new advertising space information based on a bidder or a winning bidder permitting reception of the advertising space information in the auction service.

6. The auction apparatus according to claim 2, wherein the processor is programmed to:
   determine, when new plan information is sent, whether the new plan information includes information supplementing current plan information, which is the already-received plan information; and
   receive new plan information which supplements the current plan information.

7. The auction apparatus according to claim 1, wherein, when a plurality of advertising spaces are set to the content, the processor is programmed to manage auctions related to each advertising space by associating with the plan information corresponding to the content.

8. The auction apparatus according to claim 1, wherein, when a plurality of advertising spaces are set to the content, the processor is programmed to provide the auction service in which the auction is held for a period that is set for each auction related to each advertising space.

9. The auction apparatus according to claim 7, wherein the processor is programmed to:

receive advertising space information including a target amount of a winning bid price; and adjust a reserve price or a buyout price of the auction based on the winning bid price of the auction which has ended among the auctions corresponding to the plurality of advertising spaces and the received target amount.

10. The auction apparatus according to claim 9, wherein, when a total of the winning bid prices of the auctions corresponding to the plurality of advertising spaces does not reach the received target amount, the processor is programmed to invalidate each auction.

11. The auction apparatus according to claim 1, wherein the processor is programmed to transmit the generated composite content to at least one of the advertiser and the content creator before the composite content is distributed to the user terminals.

12. The auction apparatus according to claim 1, wherein the processor is programmed to notify of a type of business of a bidder who bids for the bid target or a winning bidder who successfully bids for the bid target in the auction service.

13. The auction apparatus according to claim 1, wherein the processor is programmed to provide the auction service in which the bid target is the right to display an advertisement in the advertising space and a right to participate in the creation of the content.

14. The auction apparatus according to claim 1, wherein the processor is programmed to:

manage a winning bid amount received from a winning bidder who successfully bids for the right to display the advertisement in the auction service; and send a portion of or the entire winning bid amount to the content creator when the content creator charges for creating the content.

15. The auction apparatus according to claim 14, wherein the processor is programmed to send a surplus of the winning bid amount to the content creator after the content creator creates the content.

16. The auction apparatus according to claim 1, wherein the processor is programmed to provide the auction service in which the bid target is the right to display the advertisement in the advertising space and a right to replace the advertisement displayed in the advertising space.

17. The auction apparatus according to claim 1, wherein the processor is programmed to:

present a portion of the received plan information;

present information, which includes other plan information other than the portion of the plan information at least, in response to a request from an advertiser who has browsed the portion of the plan information; and provide the auction service.

18. An auction method that is performed by a computer, the auction method comprising:

receiving, by the computer, a first plan information indicating a partial content plan from a content creator, and storing the first plan information;

providing, by the computer, an auction service to advertiser terminals through a communication network based on the first plan information in order to auction advertisement space, the auction service allowing advertisers to bid on a right to display an advertisement in a plurality of advertisement spaces that are set in content;

gradually receiving, by the computer, additional plan information, which is different from the first plan information, indicating additional portions of the content plan from the content creator;

in response to receiving additional plan information, determining, by the computer, whether to perform another auction corresponding to at least one of the plurality of advertisement spaces that has not been auctioned based on the received additional plan information;

distributing, by the computer, the received additional plan information to the advertiser terminals through the communication network;

when the auction service ends, receiving by the computer: (i) content corresponding to both the first plan information and the additional plan information from the content creator, and (ii) advertising data from a winning advertiser that has won the right to display an advertisement in the auction service;

generating, by the computer, composite content having meta data indicating contents of the received content by incorporating the received advertising data into the advertisement space that is set to the received content, the meta data corresponding to at least one of: a temporal position of the plurality of advertisements spaces, a reproduction time of the plurality of advertisements spaces, a display site of each of the plurality of advertisements spaces, and a location of the plurality of advertisements spaces within the composite content;

analyzing, by the computer, the meta data, and extract keywords, the keywords each corresponding to items representing the contents of the received content;

verifying, by the computer, whether a number of items in which keywords are not identical to both the first plan information and the additional plan information is equal to or greater than a predetermined threshold value;

when the number of items in which keywords are not identical to both the first plan information and the additional plan information is equal to or greater than the predetermined threshold value, determining, by the computer, that the composite content is not consistent with both the first plan information and the additional plan information; and when the number of items in which keywords are not identical to both the first plan information and the additional plan information is less than the predetermined threshold value, distributing, by the computer, the generated composite content to a distribution terminal for viewing on user terminals, whereby the auction service is performed based on only the partial content plan from the content creator such that the content creator only creates and transmits the partial plan, and then creates and transmits the additional plan information after receiving the bid from the at least one advertiser.

19. A non-transitory computer-readable storage medium with an executable program stored thereon, wherein the program instructs a computer to perform:

receiving a first plan information indicating a partial content plan from a content creator, and storing the first plan information;

providing an auction service to advertiser terminals through a communication network based on the first plan information in order to auction advertisement space, the auction service allowing advertisers to bid on a right to display an advertisement in a plurality of advertisement spaces that are set in content;

gradually receiving additional plan information, which is different from the first plan information, indicating additional portions of the content plan from the content creator;

in response to receiving additional plan information, determining whether to perform another auction corresponding to at least one of the plurality of advertisement spaces that has not been auctioned based on the received additional plan information;

distributing the received additional plan information to the advertiser terminals through the communication network;

when the auction service ends, receiving: (i) content corresponding to both the first plan information and the additional plan information from the content creator, and advertising data from a winning advertiser that has won the right to display an advertisement in the auction service;

generating composite content having meta data indicating contents of the received content by incorporating the received advertising data into the advertisement space that is set to the received content, the meta data corresponding to at least one of: a temporal position of the plurality of advertisements spaces, a reproduction time of the plurality of advertisements spaces, a display size of each of the plurality of advertisements spaces, and a location of the plurality of advertisements spaces within the composite content;

analyzing the meta data and extract keywords, the keywords each corresponding to items representing the contents of the received content;

verifying whether a number of items in which keywords are not identical to both the first plan information and the additional plan information is equal to or greater than a predetermined threshold value;

when the number of items in which keywords are not identical to both the first plan information and the additional plan information is equal to or greater than the predetermined threshold value, determining that the composite content is not consistent with both the first plan information and the additional plan information; and when the number of items in which keywords are not identical to both the first plan information and the additional plan information is less than the predetermined threshold value, distributing the generated composite content to a distribution terminal for viewing on user terminals, whereby the auction service is performed based on only the partial content plan from the content creator such that the content creator only creates and transmits the partial plan, and then creates and transmits the additional plan information after receiving the bid from the at least one advertiser.

* * * * *